United States Patent
Smith et al.

(10) Patent No.: US 10,872,636 B2
(45) Date of Patent: *Dec. 22, 2020

(54) SYSTEMS AND METHODS FOR INCIDENT RECORDING

(71) Applicant: Axon Enterprise, Inc., Scottsdale, AZ (US)

(72) Inventors: Patrick W. Smith, Scottsdale, AZ (US); Nache D. Shekarri, Cave Creek, AZ (US); Jasjit S. Dhillon, Santa Barbara, CA (US); Milan Cerovic, Scottsdale, AZ (US); Roger Clay Winn, Jr., Cave Creek, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,845

(22) Filed: Sep. 23, 2019

(65) Prior Publication Data

US 2020/0020356 A1 Jan. 16, 2020

Related U.S. Application Data

(63) Continuation of application No. 16/377,766, filed on Apr. 8, 2019, now Pat. No. 10,446,183, which is a (Continued)

(51) Int. Cl.
*G11B 19/18* (2006.01)
*G06Q 10/10* (2012.01)
(Continued)

(52) U.S. Cl.
CPC ........... *G11B 19/18* (2013.01); *G06Q 10/087* (2013.01); *G06Q 10/10* (2013.01); *G06Q 50/16* (2013.01);
(Continued)

(58) Field of Classification Search
CPC ...... G11B 19/18; H04N 5/772; G06Q 10/087; G06Q 10/10; G06Q 50/16; G06Q 50/18; G06Q 50/26

See application file for complete search history.

(56) References Cited

U.S. PATENT DOCUMENTS 4,089,195 A 5/1978 Lai
4,425,586 A 1/1984 Miller
(Continued)

FOREIGN PATENT DOCUMENTS

EP 0985899 A1 3/2000
EP 1187476 A1 3/2002
(Continued)

OTHER PUBLICATIONS

"Advanced Taser M26 Operating Manual", Taser International, Inc., MMU0008, Revision B, Mar. 1, 2007.
(Continued)

*Primary Examiner* — Arpan P. Savla
*Assistant Examiner* — Haimei Jiang
(74) *Attorney, Agent, or Firm* — Banner & Witcoff, Ltd.

(57) ABSTRACT

An incident recorder records original and supplemental incident information using a simplified user interface. A lead incident recorder may request any of several support tasks be accepted by other subsystems configured to Follow. Tactical support tasks may be requested. Communication support tasks may be requested. Collection support tasks may be requested. Collection support tasks may include directives for operation of an incident recorder.

20 Claims, 14 Drawing Sheets

Related U.S. Application Data continuation of application No. 14/842,140, filed on Sep. 1, 2015, now Pat. No. 10,269,384, which is a continuation of application No. 12/418,540, filed on Apr. 3, 2009, now Pat. No. 10,354,689.

(60) Provisional application No. 61/158,732, filed on Mar. 9, 2009, provisional application No. 61/042,751, filed on Apr. 6, 2008.

(51) Int. Cl.
| | | |
|---|---|---|
| *G06Q 50/16* | (2012.01) | |
| *G06Q 50/26* | (2012.01) | |
| *G06Q 10/08* | (2012.01) | |
| *G06Q 50/18* | (2012.01) | |
| *H04N 5/77* | (2006.01) | |

(52) U.S. Cl.
CPC ............ *G06Q 50/18* (2013.01); *G06Q 50/26* (2013.01); *H04N 5/772* (2013.01)

(56) References Cited

U.S. PATENT DOCUMENTS

| | | | |
|---|---|---|---|
| 4,516,157 A | 5/1985 | Campbell | |
| 4,811,775 A | 3/1989 | Sun | |
| 4,837,561 A | 6/1989 | Tucker | |
| 4,943,885 A | 7/1990 | Willoughby et al. | |
| 5,149,972 A | 9/1992 | Fay et al. | |
| 5,398,220 A | 3/1995 | Barker | |
| 5,473,729 A | 12/1995 | Bryant et al. | |
| 5,477,511 A | 12/1995 | Englehardt | |
| 5,537,771 A | 7/1996 | Martin | |
| 5,583,571 A | 12/1996 | Friedland | |
| 5,589,901 A | 12/1996 | Means | |
| 5,594,498 A | 1/1997 | Fraley | |
| 5,603,180 A | 2/1997 | Houze | |
| RE35,658 E | 11/1997 | Jeppesen | |
| 5,687,279 A | 11/1997 | Matthews | |
| 5,764,769 A | 6/1998 | Bennett et al. | |
| 5,777,616 A * | 7/1998 | Bates .................. | G06F 3/0486 |
| | | | 715/837 |
| 5,806,072 A * | 9/1998 | Kuba .................. | H04N 1/2112 |
| 5,841,622 A | 11/1998 | McNulty, Jr. | |
| 5,886,739 A | 3/1999 | Winningstad | |
| 5,936,183 A | 8/1999 | McNulty, Sr. | |
| 5,962,806 A | 10/1999 | Coakley et al. | |
| 5,999,698 A | 12/1999 | Nakai et al. | |
| 6,028,627 A | 2/2000 | Helmsderfer | |
| 6,131,121 A * | 10/2000 | Mattaway .................. | H04L 1/0083 |
| | | | 709/227 |
| 6,154,676 A | 11/2000 | Levine | |
| 6,154,771 A | 11/2000 | Rangan et al. | |
| 6,163,338 A | 12/2000 | Johnson et al. | |
| 6,237,461 B1 | 5/2001 | Poole | |
| 6,292,213 B1 | 9/2001 | Jones | |
| 6,408,905 B1 | 6/2002 | Lee | |
| 6,429,769 B1 | 8/2002 | Fulgueira | |
| 6,538,623 B1 | 3/2003 | Pamian et al. | |
| 6,546,119 B2 | 4/2003 | Ciolli et al. | |
| 6,563,532 B1 | 5/2003 | Strub et al. | |
| 6,587,046 B2 | 7/2003 | Joao | |
| 6,614,408 B1 | 9/2003 | Mann | |
| 6,630,884 B1 | 10/2003 | Shanmugham | |
| 6,697,103 B1 | 2/2004 | Fernandez et al. | |
| 6,717,737 B1 | 4/2004 | Haglund | |
| 6,760,916 B2 * | 7/2004 | Holtz .................. | G06Q 30/06 |
| | | | 348/E5.022 |
| 6,798,928 B2 | 9/2004 | Iida et al. | |
| 6,823,621 B2 | 11/2004 | Gotfried | |
| 6,825,875 B1 | 11/2004 | Strub et al. | |
| 6,833,787 B1 | 12/2004 | Levi | |
| 6,856,238 B2 | 2/2005 | Wootton et al. | |
| 6,931,201 B2 | 8/2005 | Obrador | |
| 6,933,851 B2 | 8/2005 | Hahne et al. | |
| 6,952,695 B1 | 10/2005 | Trinks et al. | |
| 6,961,586 B2 | 11/2005 | Barbosa et al. | |
| 6,970,183 B1 * | 11/2005 | Monroe .................. | G08B 7/062 |
| | | | 348/143 |
| 7,000,439 B2 | 2/2006 | DiDomenico | |
| 7,035,091 B2 | 4/2006 | Le et al. | |
| 7,057,872 B2 | 6/2006 | Smith et al. | |
| 7,117,075 B1 * | 10/2006 | Larschan .................. | G07C 5/085 |
| | | | 701/29.6 |
| 7,143,434 B1 | 11/2006 | Paek et al. | |
| 7,158,167 B1 | 1/2007 | Yerazunis et al. | |
| 7,168,804 B2 | 1/2007 | Velazquez | |
| 7,190,882 B2 | 3/2007 | Gammenthaler | |
| 7,193,645 B1 | 3/2007 | Aagaard et al. | |
| 7,236,684 B2 * | 6/2007 | Kawakami .................. | G11B 20/10 |
| | | | 386/278 |
| 7,237,262 B2 | 6/2007 | Lahti et al. | |
| 7,257,774 B2 | 8/2007 | Denoue et al. | |
| 7,269,335 B2 | 9/2007 | Okamoto et al. | |
| 7,313,759 B2 | 12/2007 | Sinisi | |
| 7,421,024 B2 | 9/2008 | Castillo | |
| 7,456,875 B2 | 11/2008 | Kashiwa | |
| 7,460,149 B1 * | 12/2008 | Donovan .................. | G11B 27/105 |
| | | | 348/143 |
| 7,480,382 B2 | 1/2009 | Dunbar et al. | |
| 7,483,485 B2 | 1/2009 | Winningstad et al. | |
| 7,486,081 B2 | 2/2009 | Kalokitis et al. | |
| 7,489,853 B2 | 2/2009 | Takahashi | |
| 7,496,140 B2 | 2/2009 | Winningstad et al. | |
| 7,519,271 B2 | 4/2009 | Strub et al. | |
| 7,593,034 B2 | 9/2009 | DeKeyser | |
| 7,735,104 B2 | 6/2010 | Dow et al. | |
| 7,750,936 B2 | 7/2010 | Provinsal et al. | |
| 7,821,766 B2 | 10/2010 | Brundula | |
| 7,924,323 B2 | 4/2011 | Walker et al. | |
| 8,081,214 B2 | 12/2011 | Vanman et al. | |
| 8,131,691 B1 * | 3/2012 | Nagaralu .................. | G06F 16/13 |
| | | | 707/696 |
| 8,285,121 B2 | 10/2012 | Kulas | |
| 8,310,540 B2 | 11/2012 | DeKeyser | |
| 8,488,151 B2 | 7/2013 | Saito | |
| 8,520,069 B2 | 8/2013 | Haler | |
| 8,599,277 B2 | 12/2013 | Fleming | |
| 8,692,882 B2 | 4/2014 | DeKeyser | |
| 8,837,901 B2 | 9/2014 | Shekarri et al. | |
| 8,928,752 B2 | 1/2015 | DeKeyser | |
| 9,019,431 B2 | 4/2015 | Phillips et al. | |
| 9,485,471 B2 | 11/2016 | DeKeyser | |
| 9,712,730 B2 | 7/2017 | Phillips et al. | |
| 9,912,914 B2 | 3/2018 | DeKeyser | |
| 2002/0005895 A1 * | 1/2002 | Freeman .................. | H04N 5/772 |
| | | | 348/143 |
| 2002/0012134 A1 | 1/2002 | Calaway | |
| 2002/0163579 A1 | 11/2002 | Patel et al. | |
| 2003/0007079 A1 | 1/2003 | Sisselman | |
| 2003/0081121 A1 | 5/2003 | Kirmuss | |
| 2003/0081127 A1 | 5/2003 | Kirmuss | |
| 2003/0081934 A1 | 5/2003 | Kirmuss | |
| 2003/0112347 A1 * | 6/2003 | Wyman .................. | H04N 5/772 |
| | | | 348/231.99 |
| 2003/0151663 A1 | 8/2003 | Lorenzetti et al. | |
| 2004/0022523 A1 | 2/2004 | Duerr et al. | |
| 2004/0136578 A1 | 7/2004 | Sieracki et al. | |
| 2004/0146272 A1 | 7/2004 | Kessel et al. | |
| 2004/0155963 A1 | 8/2004 | Kondo et al. | |
| 2004/0156616 A1 * | 8/2004 | Strub .................. | G11B 27/3027 |
| | | | 386/224 |
| 2004/0164896 A1 | 8/2004 | Evans | |
| 2004/0179815 A1 * | 9/2004 | DaSilva .................. | H04N 21/4147 |
| | | | 386/293 |
| 2004/0252193 A1 * | 12/2004 | Higgins .................. | G08G 1/042 |
| | | | 348/149 |
| 2004/0263661 A1 * | 12/2004 | Okisu .................. | H04N 1/32101 |
| | | | 348/333.02 |
| 2005/0115387 A1 | 6/2005 | Smith et al. | |
| 2005/0131830 A1 * | 6/2005 | Juarez .................. | G06Q 40/025 |
| | | | 705/51 |

(56) References Cited

U.S. PATENT DOCUMENTS

| | | |
|---|---|---|
| 2005/0136949 A1 | 6/2005 | Barnes |
| 2005/0177861 A1 | 8/2005 | Ma et al. |
| 2005/0179539 A1 | 8/2005 | Hill et al. |
| 2005/0195293 A1* | 9/2005 | Kobayashi .......... H04N 5/23293 348/231.99 |
| 2005/0200750 A1 | 9/2005 | Ollila |
| 2005/0210523 A1 | 9/2005 | Parnell et al. |
| 2005/0243171 A1* | 11/2005 | Ross, Sr. .......... G08B 13/19645 348/148 |
| 2005/0259151 A1 | 11/2005 | Hamilton et al. |
| 2006/0004582 A1 | 1/2006 | Claudatos et al. |
| 2006/0007308 A1 | 1/2006 | Ide et al. |
| 2006/0007893 A1* | 1/2006 | Kaplan ................ H04M 19/04 370/335 |
| 2006/0012683 A9* | 1/2006 | Lao ..................... H04N 5/765 348/207.99 |
| 2006/0037061 A1 | 2/2006 | Ishihara et al. |
| 2006/0038678 A1 | 2/2006 | Avneri |
| 2006/0064384 A1 | 3/2006 | Mehrotra et al. |
| 2006/0077256 A1 | 4/2006 | Silvemail et al. |
| 2006/0086032 A1 | 4/2006 | Valencic et al. |
| 2006/0139454 A1 | 6/2006 | Trapani |
| 2006/0165160 A1 | 7/2006 | Winningstad et al. |
| 2006/0176369 A1 | 8/2006 | Meritt |
| 2006/0200701 A1* | 9/2006 | Callender .......... G06F 11/3636 714/38.11 |
| 2006/0206911 A1 | 9/2006 | Kim et al. |
| 2006/0242418 A1 | 10/2006 | Willamowski et al. |
| 2006/0244613 A1 | 11/2006 | Myers |
| 2006/0256498 A1 | 11/2006 | Smith et al. |
| 2007/0006154 A1 | 1/2007 | Yang et al. |
| 2007/0070574 A1 | 3/2007 | Nerheim et al. |
| 2007/0094478 A1 | 4/2007 | Plondke et al. |
| 2007/0109427 A1* | 5/2007 | Satoh ................ H04N 1/00408 348/231.2 |
| 2007/0143102 A1* | 6/2007 | Yamada ............ H04M 3/4938 704/200 |
| 2007/0150138 A1* | 6/2007 | Plante ................ H04N 21/4435 701/33.4 |
| 2007/0183115 A1 | 8/2007 | Myers |
| 2007/0198954 A1 | 8/2007 | Dinn |
| 2007/0201815 A1 | 8/2007 | Griffin |
| 2007/0217761 A1* | 9/2007 | Chen .................. H04N 9/79 386/228 |
| 2007/0256008 A1 | 11/2007 | Bedingfield |
| 2007/0290830 A1* | 12/2007 | Gurley ............... G08B 13/1968 340/506 |
| 2007/0294258 A1 | 12/2007 | Caldwell et al. |
| 2007/0297786 A1 | 12/2007 | Pozniansky et al. |
| 2008/0013717 A1* | 1/2008 | Brown ............... H04W 12/0013 380/30 |
| 2008/0030580 A1 | 2/2008 | Kashiwa et al. |
| 2008/0062265 A1 | 3/2008 | Ivers |
| 2008/0100705 A1 | 5/2008 | Kister et al. |
| 2008/0111666 A1 | 5/2008 | Plante et al. |
| 2008/0113783 A1 | 5/2008 | Czyzewski et al. |
| 2008/0117295 A1 | 5/2008 | Ebrahimi et al. |
| 2008/0119235 A1 | 5/2008 | Nielsen et al. |
| 2008/0120345 A1* | 5/2008 | Duncombe ............ G11B 27/11 |
| 2008/0122736 A1 | 5/2008 | Ronzani et al. |
| 2008/0170130 A1 | 7/2008 | Ollila et al. |
| 2008/0180537 A1* | 7/2008 | Weinberg ............ H04N 5/2256 348/211.99 |
| 2008/0199145 A1 | 8/2008 | Morimoto et al. |
| 2008/0252485 A1 | 10/2008 | Lagassey |
| 2008/0275915 A1 | 11/2008 | Dunbar et al. |
| 2008/0278582 A1* | 11/2008 | Chung .................. H04N 7/18 348/159 |
| 2008/0281592 A1* | 11/2008 | McKoen ............. G06F 40/169 704/235 |
| 2009/0002491 A1 | 1/2009 | Haler |
| 2009/0016217 A1 | 1/2009 | Kashyap |
| 2009/0024266 A1* | 1/2009 | Bertness ............ B60L 50/10 701/22 |
| 2009/0027499 A1 | 1/2009 | Nicholl |
| 2009/0031006 A1 | 1/2009 | Johnson |
| 2009/0094520 A1* | 4/2009 | Kulas ................ G06F 16/7867 715/723 |
| 2009/0141129 A1 | 6/2009 | Dischinger |
| 2009/0144624 A1 | 6/2009 | Barnes, Jr. |
| 2009/0157736 A1* | 6/2009 | Benitez ............... G06F 16/489 |
| 2009/0189981 A1 | 7/2009 | Siann et al. |
| 2009/0193298 A1 | 7/2009 | Mukherjee |
| 2009/0195655 A1* | 8/2009 | Pandey ............. G08B 13/19647 348/158 |
| 2009/0221248 A1* | 9/2009 | Ellis .................. H04H 60/27 455/132 |
| 2009/0251311 A1 | 10/2009 | Smith et al. |
| 2009/0251533 A1 | 10/2009 | Smith et al. |
| 2009/0251545 A1 | 10/2009 | Shekarri et al. |
| 2009/0273682 A1 | 11/2009 | Shekarri et al. |
| 2009/0276708 A1 | 11/2009 | Smith et al. |
| 2009/0322874 A1* | 12/2009 | Knutson ............. G08B 13/196 348/143 |
| 2009/0324203 A1 | 12/2009 | Wiklof |
| 2010/0060747 A1 | 3/2010 | Woodman |
| 2010/0146393 A1 | 6/2010 | Land et al. |
| 2010/0172624 A1* | 7/2010 | Watts ................ H04N 5/77 386/278 |
| 2010/0287473 A1 | 11/2010 | Recesso et al. |
| 2011/0007139 A1* | 1/2011 | Brunetti ............. G08B 13/19669 348/51 |
| 2011/0018998 A1 | 1/2011 | Guzik |
| 2011/0043631 A1 | 2/2011 | Marman et al. |
| 2011/0098924 A1 | 4/2011 | Balardeta et al. |
| 2011/0134243 A1 | 6/2011 | Siann et al. |
| 2013/0336634 A1 | 12/2013 | Vanman et al. |
| 2014/0011428 A1* | 1/2014 | Barthold ............ A63H 17/26 446/268 |

FOREIGN PATENT DOCUMENTS

| | | |
|---|---|---|
| EP | 1062598 B1 | 10/2003 |
| EP | 1605222 A1 | 12/2005 |
| GB | 2250156 A | 5/1992 |
| GB | 2295065 A | 5/1996 |
| JP | H07192396 A | 7/1995 |
| KR | 20000037802 A | 7/2000 |
| WO | 1996026600 A1 | 8/1996 |
| WO | 1996027864 A1 | 9/1996 |
| WO | 2002013522 A2 | 2/2002 |
| WO | 2004068855 A1 | 8/2004 |
| WO | 2006086196 A2 | 8/2006 |
| WO | 2012037139 A2 | 3/2012 |

OTHER PUBLICATIONS

"Advanced Taser M26 Series Electronic Control Device Specification", Taser International, Inc., Nov. 7, 2007.
"Taser X26E Series Electronic Control Device Specification", Taser International, Inc., Nov. 6, 2007.
"X26E Operating Manual", Taser International, Inc., MMU0004, Revision B, Mar. 1, 2007.
May 25, 2011—U.S. Office Action—U.S. Appl. No. 12/418,540.
Nov. 8, 2011—U.S. Office Action—U.S. Appl. No. 12/418,540.
May 17, 2012—U.S. Office Action—U.S. Appl. No. 12/418,540.
Nov. 20, 2014—U.S. Office Action—U.S. Appl. No. 12/418,540.
Sep. 4, 2015—U.S. Office Action—U.S. Appl. No. 12/418,540.
Jul. 28, 2016—U.S. Office Action—U.S. Appl. No. 12/418,540.
Aug. 7, 2017—U.S. Office Action—U.S. Appl. No. 12/418,540.
Jul. 13, 2017—(IN) Examination Report—App. 2349/MUMNP/2010.
Mar. 15, 2017—U.S. Office Action—U.S. Appl. No. 12/418,540.
Dec. 3, 2018—U.S. Office Action—U.S. Appl. No. 12/418,540.
May 4, 2018—U.S. Office Action—U.S. Appl. No. 12/418,540.
Oct. 1, 2018—U.S. Patent Trial and Appeal Board Decision, Case PGR2018-00052 (in which Applicant cited U.S. Patent Pub. 2009/0276708 as invalidating the claims of U.S. Pat. No. 9,712,730).
Oct. 4, 2018—U.S. Response to Office Action—U.S. Appl. No. 12/418,540.

(56) References Cited

OTHER PUBLICATIONS

Sep. 7, 2018—U.S. Office Action—U.S. Appl. No. 14/842,140.
Marantz, Model PMD570 User Guide, Apr. 2004, Marantz America, LLC., p. 20, downloaded from http://us.marantz.com/us/Support/Pages/Manuals.aspx on Nov. 5, 2011.
Virata, John, Pinnacle Video Transfer, Transfer your video to iPod or PSP without a computer, Jan. 17, 2008, Pinnacle Systems, downloaded from http://www.pinnaclesys.com/PublicSite/us/PinnacleLife/Content/Reviews/video+to+ipod.h on Nov. 4, 2011.

* cited by examiner

SYSTEMS AND METHODS FOR INCIDENT RECORDING

CROSS-REFERENCE TO RELATED APPLICATIONS

This application is a continuation of U.S. patent application Ser. No. 16/377,766, which is a continuation of U.S. patent application Ser. No. 14/842,140, now U.S. Pat. No. 10,269,384, which is a continuation of U.S. patent application Ser. No. 12/418,540, now U.S. Pat. No. 10,354,689, which claims benefit of priority under U.S.C. § 119(e) of both U.S. Provisional Application No. 61/042,751, filed Apr. 6, 2008 and U.S. Provisional Application No. 61/158,732, filed Mar. 9, 2009, all of the aforementioned are incorporated herein by reference.

BACKGROUND

An incident refers to human or animal activities and to a period of time while these activities take place. Incidents include, for example, formation of agreements, transactions, negotiations, discussions, ceremonies, meetings, medical procedures, sporting events, crimes, attempted crimes, disagreements, assaults, conflicts, discoveries, research, investigations, and surveillance. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons. Incidents include information valuable for risk management, insurance, claims, achievements, sports records, news reporting, and entertainment.

Information (e.g., data, audio, visual, location, environmental) gathered about an incident may describe the incident. Information may include facts about the activities of the incident, consequences of the incident, time of the incident, location of the incident, and identity of humans, animals, or objects related to the incident. Information about an incident may form a report of an incident (also called an incident report). Information about the incident may be gathered before, during, or after an incident.

Information about an incident may aid others to determine the identity of the human or animal that performed the activities of the incident, whether activities were properly performed, property affected, human or animal injured; identity of witnesses, identity of a victims; responding law enforcement and medical personnel; and anyone contributing to the achievement or loss; extent of the loss or the injury; any change in property; change in the value of property; and a change in an object, person, plant, or animal.

Information about an incident may be used to establish responsibility for the consequences of an incident. For example, whether or not the facts of the incident require payment under an insurance policy may be determined on the basis of a information about the incident. When a weapon is used in an incident, responsibility for a loss or injury may in part be based on whether the weapon is used within the guidelines of a law enforcement agency, guidelines set forth by a manufacturer of the weapon, or policies and reasonable behavior or negligence as determined by local customs, courts, and educational/training institutions.

A report of an incident in many cases may be used as evidence of facts regarding the incident. Evidence may be needed for proof of performance under an agreement, resolution of a failure to perform under an agreement, credit for an achievement, proof of damage, injury, crime, or loss, or for enforcement of customs, rules, regulations, laws, judicial orders, or directives from superiors such as employers, partners, custodians, guardians, relatives, officials, or higher ranking officers.

Validation of the information of an incident report includes verifying the accuracy and completeness of the information of an incident. Validation of an incident may establish a foundation (e.g., legal foundation) and provide corroboration for the facts of an incident. Validation may provide foundation and corroboration sufficient for an incident report and the information therein to be used as evidence in a court.

Accurate and complete reporting of the facts surrounding an incident has great social, economic, and judicial importance. Incident reporting as practiced in the prior art has limitations that adversely affect accuracy and completeness. Increased accuracy and greater completeness of incident reports are needed and are provided by systems and methods according to the present invention.

BRIEF DESCRIPTION OF THE DRAWING

Embodiments of the present invention will be described with reference to the drawing, wherein like designations denote like elements, and.

DETAILED DESCRIPTION

Figure 1:
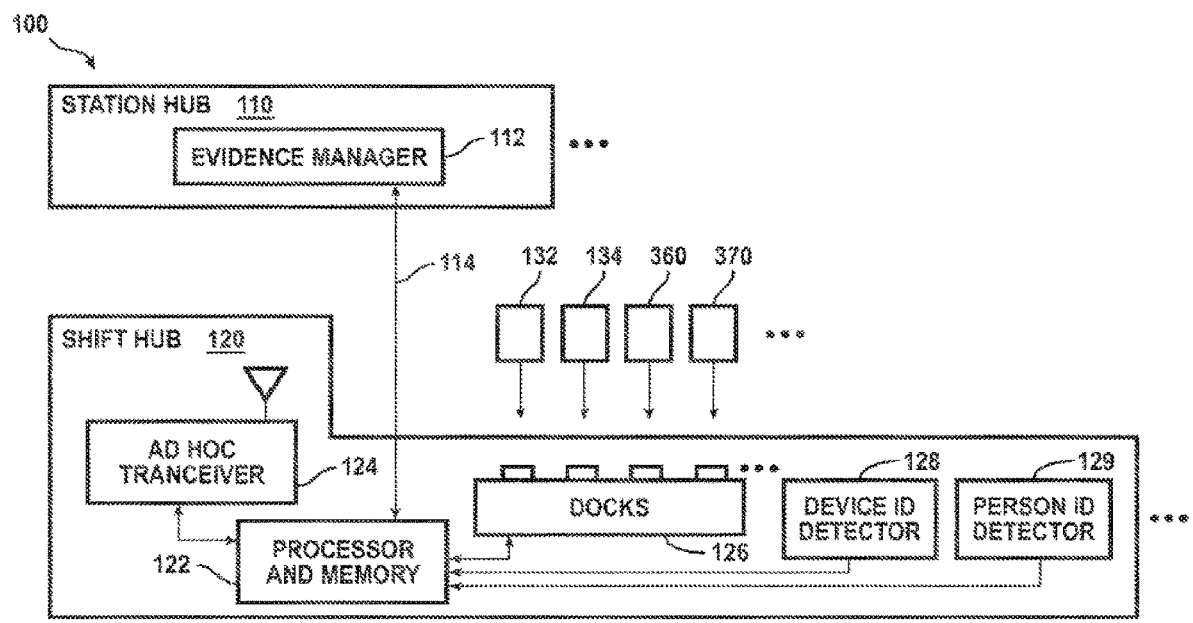
FIG. 1 is a functional block diagram of a secondary subsystem of a system for collecting and managing information about incidents, according to various aspects of the present invention.

Disclosed herein is a recorder for use by a human operator at an incident includes a head set and a hand set. The head set mounts to turn with the operator's head. The head set includes a camera oriented away from the operator, a first microphone oriented away from the operator, and a second microphone for picking up the operator's voice. The hand set is generally for hand-held operation. The hand set includes binary controls, a pointing control, a display and a circuit. The display shows legends for the binary controls and play back of recorded video from the camera. The circuit stores a sequence of containers containing the recorded audio and video. During playback, the circuit responds to an operation of the binary controls to freeze a container of video. The circuit then adds further audio, video, or graphics. The graphics may be a form with a location specified by the operator via use of the pointing control.

Also disclosed herein is an incident recorder records still photographs, video, and/or audio in response to a user interface. The user interface includes an event control and a privacy control. The recorder has at least three operating modes, including two modes of recording and at least one mode for no recording. In response to the application of primary power, the recorder operates in a pre-event recording mode. In response to the user operating the event control, the recorder changes from the pre-event recording mode to the event recording mode. In response to the user operating the privacy control, the recorder enters the privacy mode to turn off recording.

An incident report, as discussed herein, is a report of information about an incident. An incident report may include information gathered, recorded, documented, explained, classified, described, and/or supplemented. An incident report may be formed before, during, or after an incident.

An incident report in a preferred implementation is intended to be admissible as evidence in a court. For example, an incident report may consist entirely of information stored and communicated in one or more suitable electronic formats.

According to various aspects of the present invention, an incident report may include a combination of information, also referred to as incident information, including audio, photographs, video, forms, text, graphics, scans, and electronic documents (e.g., email, word processing, spreadsheets, graphical models, photographs, equipment configuration data, equipment operation event logs).

Scans include for example scanned paper documents (e.g., tickets, titles, driver's licenses, vehicle registrations, insurance cards, bills of lading, manifests), scanned bar codes (e.g., on products, badges, driver's licenses, hospital reports, receipts), scanned magnetic stripes (e.g., bank cards, driver's licenses), scanned magnetic media (e.g. tapes, disks), scanned optical media (e.g., CDs, DVDs), and scanned glyphs (e.g., on documents, products, badges, driver's licenses).

Incident information may be recorded (e.g., audio, video) to document an incident at the time of occurrence. Recording incident information captures at least some of the information about the incident. Recording further protects against loss of information, for example, by physical loss or by faulty human memory.

After the first incident information is recorded (e.g., an original incident report) and available for review, a derivative incident report based on the incident information may be developed. A derivative incident report (also called a revision) includes the original incident information (i.e., unchanged) plus supplemental information. Supplemental information may be added to the original information to enhance an understanding of the original incident information or the incident. Supplemental information may provide additional description of the incident. Supplemental information may be formed through selecting, adding, annotating, supplementing, organizing, classifying, emphasizing, and editing, any of which being referred to herein as revising, original incident information or additional information gathered after the incident. The result of revising is herein called a revision. A revision includes original incident information combined with supplemental information.

A primary subsystem, according to various aspects of the present invention, captures original information and supplemental information to form a revision. Adding supplemental information to original incident information is important because the originally information may not fully capture what was seen, heard, or sensed by the author-operator or clarify any ambiguities in the originally information.

To improve the accuracy of incident reports and to avoid any loss of information due to lapse of time and diminution of human memory, systems and methods of the present invention provide the author-operator a capability for capturing original information, reviewing, supplementing, and classifying while at or near the incident and/or near the time the incident occurred.

In other words, systems and methods according to various aspects of the present invention may employ structures and operations that facilitate gathering, reviewing, supplementing, and/or classifying recorded information where the supplemental and/or classification information is generally recorded at a time soon after the initial incident recording is made. Furthermore, a primary subsystem according to various aspects of the present invention enables revisions to be made at the location of the incident prior to leaving the location. Making a revision that is spatially or temporally proximate to the incident provides a more complete and accurate incident report. Supplemental information provided by the author-operator may result from an analysis of the original incident information. The author-operator may describe in supplemental information and classifications what was seen, heard, or understood by the author-operator.

Systems for collecting and managing information about incidents, according to various aspects of the present invention, include primary and secondary subsystems. Primary subsystems are generally used at the time and place of the incident. Secondary subsystems generally are not used at the time and place of the incident. Primary and secondary subsystems cooperate to collect and manage information.

A primary subsystem, according to various aspects of the present invention, may capture (e.g., record) original incident information that forms the basis for an incident report. A person that operates a primary subsystem may be referred to as a user, an author, an author-operator, or simply an operator. A primary subsystem may facilitate any of the following actions performed by the author-operator in any suitable order: capturing original incident information, timely reviewing original incident information, timely gathering supplemental information, timely classifying incident information whether original or supplemental, and timely preparing one or more revisions.

A secondary subsystem may include any computer system (e.g., personal computer, server, network of servers) that receives data from one or more primary subsystems and stores, manipulates, or reports the data, for example, as evidence. A secondary subsystem may receive data as an incident report. A secondary subsystem may store, select, decompose, classify, sort, combine, compare, analyze, adjust, organize, display in accordance a classification of the information, and/or control access to incident reports. A secondary subsystem may comprise a hierarchy of components.

A secondary subsystem may include an evidence manager. A user of an evidence manager may obtain summaries of numerous incident reports using database query and reporting technologies and may view the results on a workstation. Submission of an incident report to a secondary subsystem may occur according to a predefined workflow. Any conventional workflow management technologies (hardware, software) may be used to receive, complete, validate, and authorize use of the incident report. These functions may be accomplished by different individuals along a workflow. Incident reports of the same incident, but taken from different perspectives (e.g., different primary subsystems), may be managed in converging workflows that produce a combined incident report as a new version.

An incident information, in whole or in part, may be presented to a user on a primary subsystem that includes a display or on a workstation of a secondary subsystem.

While reviewing incident information, whether original or supplemental, an author-operator may record supplemental information or classify previously recorded information (e.g., original, revisions). An operator of a primary subsystem may review, using the primary subsystem, original information or supplemental information to classify any portion of the information as belonging to a category.

A category is a descriptor or label that identifies a common aspect among members assigned to the category. Associating a member to a category (or a category to a member) is herein referred to as classifying where a member is a quantity of information recorded or to be recorded. A member may be identified by selecting any one or more portions of an incident report. Selection and classification may be according to operator input and/or performed according to predefined selection and classification criteria. Categories may be alternative (e.g., each from a suitable list) or hierarchical (e.g., subcategories) for further classifying incident information. Generally categories are predefined so that one or more categories or groups of categories may be suggested to the operator for classification. Predefined categories describe information expected to be part of an incident report or revision. In addition, categories may be user defined using any user interface technology discussed herein. User defined categories may classify unusual or unexpected information. A category may be implemented by a storage and/or transmission technology (e.g., classified information is encrypted or distributed according to a key or plan linked to one or more categories).

Categories for use with law enforcement incident reports may denote an incident type (e.g., traffic stop, burglary, patrol); an expected incident outcome (e.g., warned, ticketed, arrested); an expected piece of information (e.g., location, recording of reading the suspect rights); one or more expected types of information that facilitate handling according to various policies (e.g., unintended recording, recording outside of a mission, recording of unethical or illegal behavior of a co-worker or associate, recording containing information that should be kept secret to avoid a risk of political, legal, social, economic, religious, psychological, or physical consequences).

Categories may determine how information is stored, communicated, and/or accessed on primary and/or secondary subsystems. Classified information, according to one or more categories associated therewith, may be encrypted using particular keys, stored using a particular technology, transmitted only according to particular policies and protocols, and/or subject to access or display only according to particular policies and protocols. For example, information classified as personal-confidential may include information unrelated to an incident that was inadvertently recorded.

Categories may identify information that reveals victim identity, politically sensitive information, information proprietary to the primary subsystem operator, witness identity, innocent bystander identity, informant identity, behavior (of a co-worker, celebrity, public figure) that may merit discipline, behavior unbecoming an official, information protected by trade secret or copyright law, information related to national security. Classification facilitates handling such information according to suitable policies beginning with the original recording and revisions.

A category selected for private information may be used to determine the level of authority required to receive, locate, identify, access, and/or display the information on a primary or secondary subsystem. For example, an operator of a primary subsystem may classify a portion of an incident report as behavior that may merit discipline. Consequently, the existence and/or review of that portion of the incident report may be blocked to individuals not providing suitable credentials. Necessary credentials may belong only to a supervisor or a member of a disciplinary committee. Other staff employees may have little access and the public may have no access to such information.

Categories (or the effects of classification) are preferably integral to an incident report and its revisions. An information manager of a secondary subsystem may process information about incidents according to the classification by the author-operator and/or classification by another person who created a revision.

As discussed herein, original and supplemental recording of information may be accomplished with any suitable conventional recording technology or conventional combination of sensing, detecting, formatting, communicating, and recording technologies.

Supplementing occurs when a first presentation of audio or video content, herein also referred to as a movie, whether original or previously recorded supplemental information, plays for a duration during which an operator may indicate an instance in time for adding a second presentation that provides supplemental information or classifies the information (e.g., beginning or ending of selected information to be classified).

The second presentation may be of any duration and may include information from the first presentation (e.g., an excerpt) or supplemental information from another source. The second presentation may be limited to a still photograph with no audio (e.g., a frame from the video of the first presentation), a short loop of one or a few moments (e.g., a scene, one or more frames of video from the first presentation). In the second presentation, the operator's supplemented information may emphasize or describe an audio occurrence (e.g., a gunshot, a few words, a noise) or a visual occurrence (e.g., a glance, a facial expression) of the first presentation.

In a preferred implementation, a record of an incident is stored, reviewed, revised, and communicated in accordance with "Coding of Moving Pictures and Audio", an ISO/IEC standard, known as MPEG-4. Information in MPEG-4 format is contained in containers, defined by the format. Information recalled from an MPEG-4 containers may be used to compose scenes, movies, descriptions, supplemental information, and classification as discussed herein. Metadata describing a container may identify whether or not one or more categories (possibly further identifying which categories) have been associated with the content of the container.

Primary subsystems may perform any one or more of the following functions in any suitable combination: detecting for collecting information, recording information (e.g., original, supplemental), forming a revision, selecting information for classification, classifying information, communicating among components identified to the same operator (herein also called a personal primary subsystem), storing the identity of the operator, communicating between a primary subsystem and a secondary subsystem, storing addresses for communication, receiving software and data from a secondary subsystem, and transmitting status, data, an incident report, or a revision to a secondary subsystem.

A primary subsystem may be packaged in several units (e.g., products individually sold or handled) (herein called components) that cooperate by wired or wireless links to participate in performing the set of functions of the primary subsystem. A component may perform some functions without communication with other components of the primary subsystem.

A primary subsystem may include a detector, a recorder, and a user interface for reviewing and managing incident information (e.g., preparing supplemental information, selecting, classifying). A detector may detect any ambient condition: video, audio, ambient information (e.g., temperature, amount of light), or scanned information. A video detector may include a video camera oriented by the author-operator for recording whatever is in the field of view of the author-operator.

A primary subsystem may format detected information for recording or communicating recorded information. Preferably, detected information, whether original or supplemental, is formatted according to a format of the type known as MPEG-4. A classification may apply to the information of an entire MPEG-4 container or any portion of a container. Containers may be arranged in hierarchy for applying a classification of a parent container to all its children. A classification for one MPEG-4 container may apply to all subsequent (e.g., playback) MPEG-4 containers until reaching an MPEG-4 container having a different classification.

A recorder may store detected or revised information. A recorder may store information as MPEG-4 containers. An original incident report and related revisions may be stored serially or in hierarchy using any conventional recording and storing technologies.

A user interface may facilitate gathering original and supplemental information, forming an incident report, reviewing original and supplemental information, selecting information for classification, classifying information, and preparing revisions.

A user interface may include a display and controls. A display of a handset may be implemented using conventional touch screen technologies. A display may provide touch screen legends (e.g., icons) for manual selection by a user. A user interface may be implemented using conventional interactive-voice-response (IVR) technologies (e.g., the user interface recites an audio script with prompts (e.g., true/false, multiple-choice) to elicit a response from the user. A user may respond to an IVR script, for example, by speaking into a microphone of the user interface, selecting a legend on a touch screen display, or operating a control.

A user interface may further include controls to start, stop, or toggle functions of the primary subsystem (e.g., start if stopped, stop if started). User operated controls may be positioned on one or more components of the primary subsystem. A primary subsystem having controls on more than one component (e.g., handset, hub) that perform the same function may respond to operation of either or both controls. Operation of a control may result in a presentation of multiple-choice legends on the display for selection by the user. Functions performed by operation of a control may include start recording, stop recording, toggle recording on/off, toggle display on/off, and mark selection, review, or revision. The primary subsystem is said to be in a privacy mode (or performing a privacy function) when it is not recording.

Methods, according to various aspects of the present invention, increase the likelihood that an incident report is complete, accurate, corroborated, verifiable, accessible, integrated with other sources of information, and reliably stored (e.g., for use as evidence). These functions and advantages may be obtained by virtue of the variety of elements of an incident report (e.g., sounds, movies, forms, text, graphics, documents, scans) and the capability of revising a scene based on any or all of these by the author-operator of the primary subsystem.

Revisions may improve the emphasis or clarity of an incident report. Video images may be cropped, panned, and/or zoomed. Movies may be clipped. Photographs may be cropped and/or scaled. Audio streams may be clipped. Printed information may be amended or partially rewritten for clarity. Supplemental information may be provided by the author-operator regarding the original recording. All of these revisions may occur at the primary subsystem by operation of a user interface. The time (e.g., time of day, date) of making a revision may also be recorded. The original recordings are preferably retained. The revisions preferably form a new version of the incident report.

For example, a system for collecting and managing evidence may include any number of station hubs (e.g., secondary subsystems) coupled by a network to any number of shift hubs (e.g., secondary subsystems). A station hub provides secure operation of a manager of information about incidents (e.g., an evidence manager). A network supports data and inter-process communication. Any conventional protocol may be used (e.g., an internet or intranet protocol stack). A shift hub provides data transfer from a primary subsystem (e.g., incident reports and revisions), recharging of rechargeable batteries, and/or data transfer to the primary subsystem (e.g., software upgrades, information regarding tactical tasks, evidence collection tasks, communication tasks).

For example, a system for collecting and managing information about incidents 100 of FIG. 1 includes station hub 110 coupled by network 114 to shift hub 120. Station hub 110 hosts evidence manager 112 (e.g., a database manager adapted in a conventional manner for managing evidence). Hosting includes a conventional secure computing environment (e.g., physical security, communication security, access controls, encryption, personnel authentication). Network 114 provides secure communication between any number of station hubs 110 and shift hubs 120. Shift hub 120 includes a processor 122, an ad hoc transceiver 124 for wireless communication with any suitable number of primary subsystems equipped for wireless data transfer, docks 126 for wired connection to any suitable number of primary subsystems, a device identification detector 128, and a person identification detector 129.

Processor 122 via ad hoc transceiver 124 and docks 126 may poll primary subsystems or components that are within range for maintaining wireless ad hoc communication based on one or more suitable communication channels (e.g., conventional IR, radio, or wireless network channels) and using one or more suitable communication protocols (e.g., conventional IEEE 802). Such a network is "ad hoc" because candidates of the network may enter and members of the network may exit (e.g., moved by humans) the zone of communication without advance notice to processor 122. Processor 122 detects entry and exit of a primary subsystem and component from the ad hoc network and maintains the ad hoc network with as many members as practical for the capability of processor 122.

A device identification detector detects an identification of a component of a primary subsystem or of an entire primary subsystem (e.g., a personal primary subsystem). For example, on check-in to shift hub 120 (e.g., via docking or local ad hoc communication), device identification detector 128 identifies the components or a primary systems and associates the detected identities to the incident reports transferred from the components or primary subsystems to shift hub 120. Identification and association provides evidence validation (e.g., custody, control). On checkout from shift hub 120 (e.g., via undocking or removal from local ad hoc communication), device identification detector 128 identifies components to the primary subsystems (e.g., in the same or another component) so that incident reports are recorded in association with that component's identification, again for purposes of evidence validation.

A person identification detector detects an identity of a person associated or to be associated with a primary subsystem. For example, on check-in of a primary subsystem to shift hub 120, the person that plugs components of the primary subsystem into docks 126 may be identified by person identification detector 129 for association to the incident reports transferred from the primary subsystem for purposes of evidence validation. On checkout of a primary subsystem from shift hub 120 (e.g., removal from docks 126), the person that removes components of the primary subsystem may be identified to the primary subsystem so that incident reports are recorded in association with that person's identification, again for purposes of evidence validation.

Docks 126 accept, by plug-in to a wired network, any suitable number of primary subsystems or components thereof. Docks may also provide a location (e.g., a bin) within range of ad hoc transceiver 124 for communication between processor 122 via transceiver 124 and any number of primary subsystems or components thereof placed at the location (e.g., in the bin). The location may be suitable for detecting device identification by device identification detector 128. For example, handsets 132 and 134 may be plugged into docks 126. Headsets 222 and 232, personal hubs 224 and 234 may be located in a bin (not shown) for scanning or programming by device identification detector 128.

Docks 126 locate and link for communication components and primary subsystems for data transfer to secondary subsystem 110 as coordinated by processor 122 and evidence manager 112. Data transfer may include original and supplemental information, incident reports, classification within incident reports, and usage logs. If other components of primary subsystems are nearby but not plugged into docks 126, data transfer may occur via ad hoc transceiver 124 as controlled by processor 122 for communication with those other components and primary subsystems capable of wireless communication.

Figure 2:
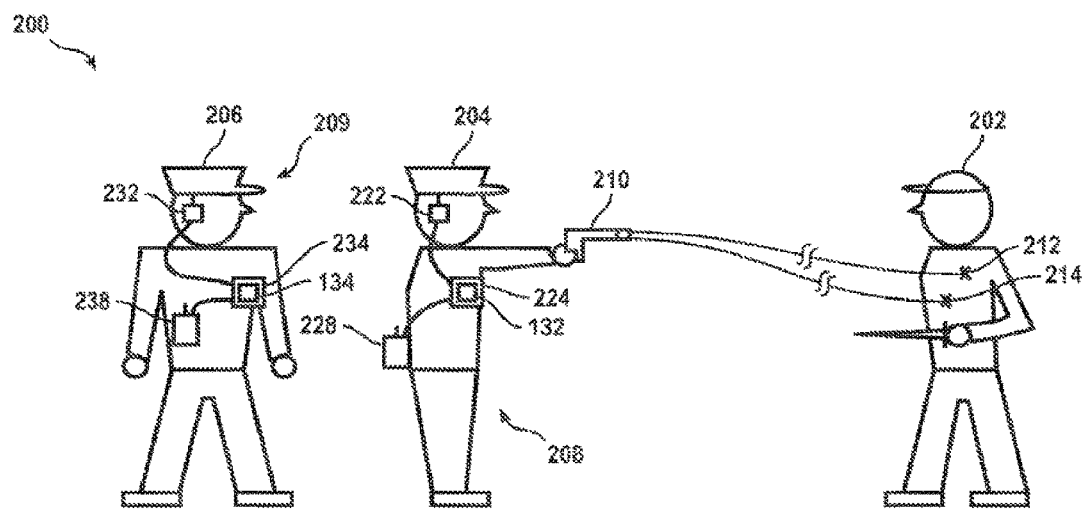
FIG. 2 is a pictorial representation of a hypothetical incident involving two law enforcement officers apprehending a suspect while each officer is operating a respective primary subsystem of a system for collecting and managing information about incidents, according to various aspects of the present invention.

A hypothetical incident and application of systems and methods according to various aspects of the present invention is illustrated in FIG. 2. FIG. 2 pictorially represents a hypothetical incident involving two law enforcement officers 206 and 204 apprehending a suspect 202 while each officer operates a respective primary subsystem, herein called a system for incident recording 208 and 209 (herein also called an incident recorder), according to various aspects of the present invention.

Officer 204 operates an electronic control device 210 (e.g., a TASER International model M26 or X26 device) that deploys two wire-tethered electrodes and hits suspect 202 at contact points 212 and 214. Current generated by the electronic control device flows through the wires, electrodes, and tissue of the suspect to cause involuntary muscle contractions, halting locomotion by the suspect and facilitating arrest of the suspect. Incident recorder 208 worn by officer 204 records a movie (e.g., original audio and video information) during the confrontation. System for incident recording 209 worn by officer 206 also records a movie during the confrontation from a different point of view.

In this example, systems 208 and 209 are identical. Each system includes a headset 222 (232), personal hub 224 (234), handset 132 (134), and on-duty transceiver 228 (238). Each headset 222 (232) includes a camera and microphone oriented away from the officer toward the field of view of the officer's eyes. Soon after suspect 202 is arrested (e.g., hand cuffed, shackled, confined), officer 204 (206) may independently review the movie that was recorded and add supplemental information and classifications to any portions of the movie.

Reviewing is accomplished by watching previously recorded information on the display of the handset. Adding a quantity of supplemental information (e.g., adding a description) is accomplished, among other things, by identifying a scene, and adding audio (e.g., talking about the scene into a microphone of the headset or personal hub), adding video (e.g., removing the camera from the headset and orienting it toward anything of interest), or adding graphical information (e.g., describing in a standardized way where on the body of the suspect contact points 212 and 214 occurred).

Classifying is accomplished by reviewing previously recorded information (e.g., original, supplemental, revision) selecting recorded information (or designating information to be recorded) and associating one or more categories (e.g., subject matter) to the selected information. A classification may apply to any portion of a movie. Recorded information may have one, several, or no classifications.

Figure 3:
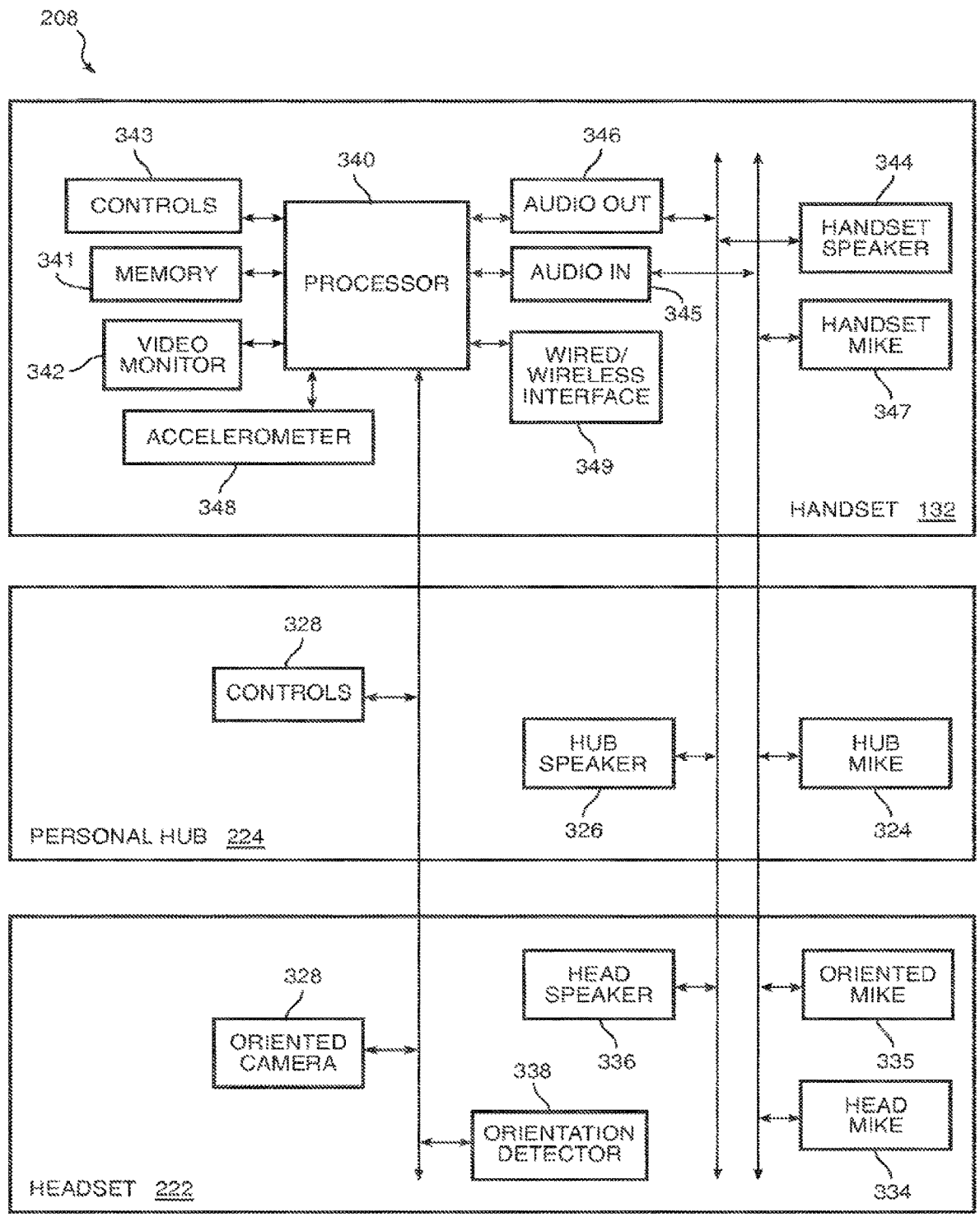
FIG. 3 is a functional block diagram of an implementation of one of the primary subsystems, herein referred to as an incident recorder, of FIGS. 1 and 2.

In an implementation, a system for incident recording 208 of FIG. 3 includes handset 132, personal hub 224, and headset 222. Handset 132 includes processor 340, memory 341, video monitor 342, controls 343, handset speaker 344, audio in circuit 345, audio out circuit 346, handset mike 347, accelerometer 348, and wired/wireless interface 349. Personal hub 224 includes hub mike 324, hub speaker 326, and controls 328. Headset 222 includes head mike 334, oriented mike 335, head speaker 336, oriented camera 337, and orientation detector 338.

In another implementation, incident recorder 208 or 209 includes headset 500, personal hub 600 and handset 700. Headset 500 includes oriented camera 510, oriented mike 520, head mike 530, head speaker 540, orientation detector 550, and conductor 560. Personal hub 600 includes hub mike 620, volume 624, hub speaker 626, event switch 630, privacy switch 640, privacy indicator 642, conductor 560, and conductor 612. Handset 700 includes power switch 720, handset speaker 722, volume 724, handset mike 726, display 730, picture-in-picture 732 portion of display 730, legends 740, event switch 750, privacy switch 760, privacy indicator 762, display toggle switch 770, and conductor 612.

The functions and functional cooperation of the components of the incident recorder are discussed below.

A handset, according to various aspects of the present invention, provides a display and provides controls sized and positioned for operation by a user's fingers or thumbs. A handset operates to record original incident information. A handset operates to review original incident information and to record supplemental incident information. A handset operates to classify original and supplemental incident information. A handset may receive information from another component of the incident recorder (e.g., hub, headset) for recording by the handset. A handset may communicate an incident report to other portions of an incident recorder or to a secondary subsystem.

For example, handset 132 (700) receives from personal hub 224 (600) or headset 222 (500) signals that convey audio or video information. Handset 132 stores the audio and video information in MPEG-4 format in memory 341. In another implementation, personal hub 224 (600) is omitted and handset 132 (700) cooperates directly with headset 222 (500) through a wired interface to convey audio and video signals and to record the signals. In another implementation, headset 222 (500) is omitted and handset 132 includes a microphone and speaker for use by the author-operator of the handset and an oriented microphone (not shown) and oriented camera (not shown) that are oriented by the author-operator of the handset.

A personal hub, according to various aspects of the present invention, couples one or more of a headset and a handset. A personal hub may include a wired interface or a wireless interface to a headset or a headset. A personal hub may include controls for operation by a user's fingers or thumbs. Some controls of a personal hub may perform operate functions similar to the controls of a handset. While a personal hub is coupled to a handset, the controls on either the handset or the personal hub may be used to operate the handset.

For example, personal hub 224 (600) provides a wired interface to headset 222 (500) and handset 132 (700). An operation of event switch 630 or privacy switch 640 operates on handset 700 to perform the same functions as an operation of event switch 750 or privacy switch 760.

A primary subsystem may be implemented without a personal hub where, for example, a user interface of the handset is sufficient for intended operations of the primary subsystem.

A headset is adapted to couple to a head of an author-operator. A headset, according to various aspects of the present invention, supports visual and audio detectors. A headset may have a predetermined orientation on an author-operator's head. A detector may be oriented with respect to the headset and thus be oriented with respect to the author-operator's head. An oriented detector may include any device for detecting physical phenomena that is oriented (e.g., positioned) along a same general direction as a sense (e.g., sight, hearing) of the author-operator.

A headset may include, as an oriented detector, a microphone for detecting sound. The microphone may be oriented in a direction of hearing of the author-operator. A headset may include, as an oriented detector, a camera for detecting radiant energy in any suitable channel or spectrum in a direction of sight of the author-operator.

A headset may include a source of radiant energy (e.g., laser, light, EM pulse) and a detector for detecting radiant energy from the source that is reflected towards the headset. A headset may include a laser for identifying a reference location or for use as a designator for orienting a data source or targeting weapons.

For example, headset 222 (500) is worn on the head of a human operator. Headset 222 (500) includes oriented microphone 335 (520) and oriented camera 337 (510) for continuously detecting audio and visual (or infrared) information from the direction facing the operator. Because handset 222 (500) is attached to the operator's head, the orientation of microphone 335 (520) and oriented camera 337 (510) retains its orientation in the direction facing the operator as the operator turns his or her head to face a different direction. Headset 222 (500) further includes microphone 334 (530) and speaker 336 (540) located proximate to the mouth and ear respectively of the human operator for receiving descriptive information from the author-operator and for providing a review of recorded information.

A processor includes any circuitry or subsystem that performs a stored program. A processor may include a dedicated digital signal processor, a microcontroller, a microprocessor, an application specific integrated circuit, logic circuitry, MEMS device, signal conditioning circuitry, communication circuitry, a computer, a radio, a network appliance, combinations thereof in any quantity suitable for accomplishing one or more stored programs.

For example, processor 340 includes a digital signal processor for digitizing audio signals, a microcontroller for supporting video display and user interface controls, and a microcomputer with an operating system and application software for performing all other functions of handset 132 (700). In another implementation, greater signal processing throughput is supported with additional parallel processing circuits and technologies.

A memory includes any semiconductor, magnetic, optical technology, or combination thereof for storing information. All or a portion of memory may be on removable media removed from handset 132 (700) for transferring data out of handset 132 (700) or for introducing data into handset 132 (700) (e.g., software upgrade, replacement information for any information described with reference to FIG. 4). For example, memory 341, stores information as described with reference to FIG. 4 using non-removable semiconductor technology. A portion of memory 341 may be maintained in nonvolatile memory to avoid data loss in the event of failure or removal of battery power to handset 132 (700).

A video monitor provides a display of video information (e.g., a movie). A video monitor may present legends for controls of a user interface. A video monitor may present video information as it is being originally recorded and recorded information for review. A video monitor may present supplemental video information. A video monitor may include a processor or circuitry for supporting the display. A video monitor may employ any display technology suitable for the environment in which handset 132 (700) is used. In an implementation, video monitor 342 includes a conventional LCD display that presents video in shades of green for visibility outdoors. In another implementation, video monitor 342, or a monitor in addition to video monitor 342, is included in headset 222 (500) and the correlation of legends on the display with controls of the user interface does not require the trained user to view his or her hands when operating the controls. In another implementation, video monitor 342 includes a touch-screen display (730) that receives author-operator input via author-operator contact with the display.

A control, according to various aspects of the present invention, is a part of a user interface that provides input to a processor in response to an action by an author-operator. A control may be operated as a consequence of any muscle contraction by the operator. A control may be incorporated into clothing worn by the operator (e.g., gloves, sleeves, shoes). A control may provide analog or binary information to a processor. A control may comprise a detector of a binary condition or a detector of an analog condition. A control may include a portion of a touch-screen display.

For example, controls 343 include a first plurality of touch-screen legends 740 (four legends shown) positioned on display 730 of video monitor 342. Legends may be organized as hierarchical menus. The touch-screen legends of controls 343 may be sized and positioned on the display of handset 132 (700) for operation by the operator's thumbs. Operation (e.g., touching, pressing, selecting) of touch-screen legend 740 selections the function indicated by the legend. Legends 740 may be defined and redefined by processor 340 within any suitable operating context, state, or mode of operation, thus many if not all functions of handset 132 may be operated via legends 740.

Controls 343 may further include dedicated switches that when operated initiate performance of a dedicated function. In one implementation, operation of event switch 750 (630) starts the recording of incident information by handset 132 or 700, operation of privacy switch 760 (640) stops the recording of incident information by handset 700, operation of display switch 770 toggles the operation of display 730 between an on-state and an off-state. While personal hub 600 is coupled to handset 700, an operation of event switch 630 and privacy switch 640 perform the function of event switch 750 and privacy switch 760 respectively.

In another implementation, controls 343 include multiple-function switches. A function performed by multiple-function switch depends upon the operating context of handset 132 or 700. While handset 700 operates to gather original incident information, event switch 750 (630) and privacy switch 760 (640) operate as described above. While handset 700 operates in a review mode in which original information or previously recorded supplemental information is presented on display 730, event switch 750 (630) toggles recording to start and stop recording of supplemental information by handset 132 or 700; and privacy switch 760 (640) initiates presentation by handset 132 or 700 of suggested categories as touch-screen legends 740 to facilitate classification. When a touch screen legend is touched by the operator, handset 132 (700) classifies the selected information by associating the category of the legend to the selected information.

Controls 343 may further include power switch 720 and volume switch 724 (624). An operation of power switch 720 toggles power to handset 700 on and off. An operation volume switch 724 (624) increases or decreases the audio volume provided by handset speaker 722, hub speaker 626, or head speaker 540.

Head speaker 540 may include conventional headphones or ear buds.

An audio-in circuit provides audio information to a processor in a suitable signal format. Signal conditioning, analog to digital conversion, sampling, multiplexing, and filtering may be accomplished by an audio-in circuit. For example, audio-in circuit 345 provides to processor 340 audio information responsive to analog microphones including handset mike 350 (726), hub mike 324 (620), head mike 334 (530), and oriented mike 335 (520). Conversion to MPEG-4 format may be accomplished by processor 340 or audio-in circuit 345.

An audio-out circuit receives audio information from a processor in a signal format suitable for communication or conversion into sound. For example, audio-out circuit 346 in cooperation with processor 340 converts audio information from MPEG-4 format to analog format for use by a conventional speaker (e.g., head speaker 336 (540), hub speaker 325 (626), handset speaker 334 (732)). In another implementation, audio-in circuit 345, processor 340, and audio-out circuit 346 cooperate to provide audio output for use with conventional noise cancellation technologies implemented at hub speaker 326 (626) or head speaker 336 (540). In an implementation, additional microphones are co-located near speakers to provide additional signals to audio-in circuit 345 and processor 340 for performing noise cancellation. Processor 340 and audio-in 345 may include noise cancellation processing circuitry or software.

As used herein, a signal conveys information. A signal may be conveyed on a conductor or recognized as a particular value in a processor (e.g., 340) or memory device (e.g., 341). When a functional block is responsive to information, the circuitry implementing the functional block receives a signal that conveys the information and demodulates, or otherwise, determines the information for performance of a function of the block. Receiving may be continuous or discontinuous. Performing the function may occur whenever sufficient information is received.

Components (e.g., handset 132 (700), personal hub 224 (600), headset 222 (500)) of an incident recorder (e.g., 208, 209) may each include respective device identification functions. A device identification function may be implemented in any conventional manner to identify the component of a primary subsystem to a shift hub as discussed above. The identification may be human readable as well as machine-readable. If a component includes a user interface, the device identification may be entered, edited, augmented, or verified by the operator.

Hub microphone 324 (620) and hub speaker 326 (626) pick up the operator's voice and play audio into the operator's ear respectively. Hub microphone 324 (620) provides an analog signal conveying audio information to audio-in 345. Hub speaker 326 (626) provides audible sound in response to a signal received from audio-out 346. Hub microphone 324 (620) and hub speaker 326 (626) provide redundant functions with head microphone 334 (530) and head speaker 336 (540).

Audio-in 345 receives audio information from hub mike 324, head mike 334, oriented mike 335, and handset mike 347. In suitable relative volumes among these audio sources and at suitable times based on a priority of audio sources, audio-in 345 provides audio information to processor 340.

Audio-out 346 receives audio information from processor 340. In suitable relative volumes among these audio sources and at suitable times based on a priority of audio sources, audio-out 346 provides audio information to handset speaker 344 (722), hub speaker 326 (626), and head speaker 336 (540).

Head microphone 334 (530) and head speaker 336 (540) pick up the operator's voice and play audio into the operator's ear respectively. Head microphone 334 (530) provides an analog signal conveying audio information to audio-in 345. Head speaker 336 (540) makes audible sound in response to a signal received from audio-out 346. Due to the location on the operator's head, head microphone 334 (530) and head speaker 336 (540) may provide more private audio communication with an author-operator than possible with hub microphone 324 (620) and hub speaker 326 (626) or handset microphone 347 (726) and handset speaker 344 (722).

An oriented microphone moves with movement of the author-operator's head to receive sound that approaches the operator's face. An oriented camera moves with movement of the author-operator's head to capture radiant energy (e.g., ambient or illumination of visible or IR light) that approaches the operator's face. Consequently, as an author-operator performs his or her routine, audio and visual information captured for recording generally corresponds to the audio and visual information that reaches the author-operator's senses. Oriented mike 335 (520) may have a relatively narrow field of sensitivity projected in front of the author-operator suitable for capturing speech intended for the author-operator to hear and respond to. Oriented camera 337 (510) may have a relatively wide field of sensitivity to correspond more closely with the field of view of a human author-operator. Oriented microphone 335 (520) may be implemented as an omni-directional microphone or stereo microphone and as such may not be "oriented" in the same manner that oriented camera 337 is oriented.

Figure 4:
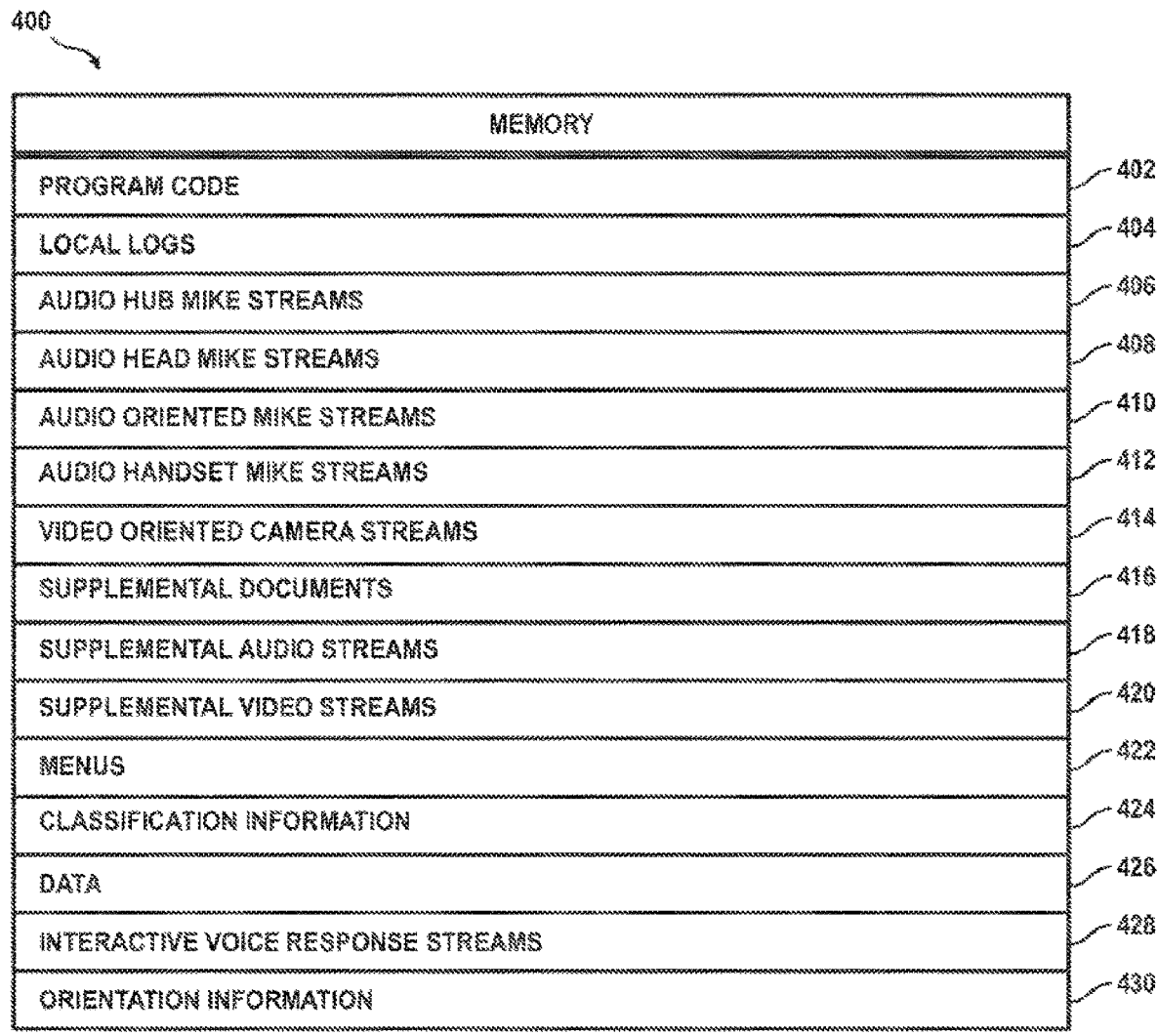
FIG. 4 is a data structure diagram describing the contents of memory in an implementation of the handset of FIGS. 3 and 7.
Figure 5:
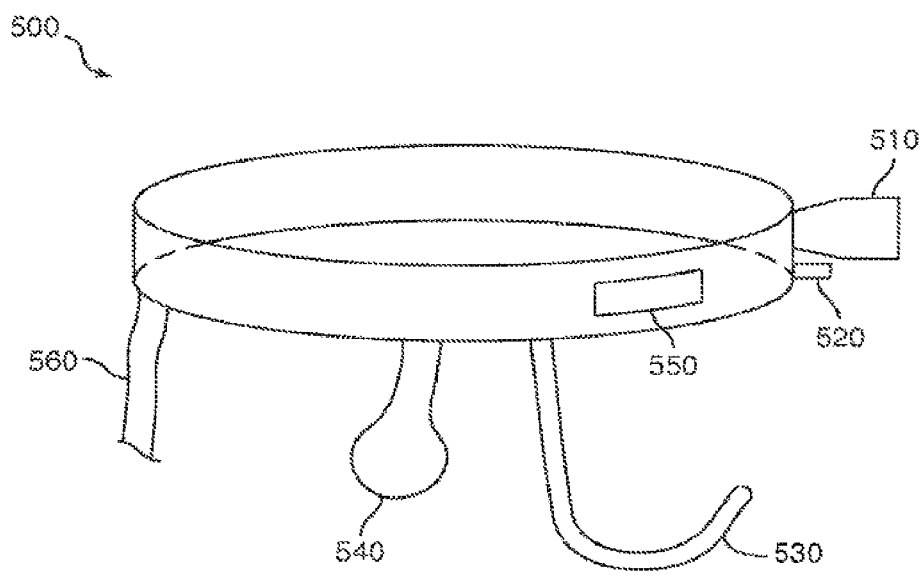
FIG. 5 is a plan view of an implementation of the headset of the incident recorder of FIG. 3.
Figure 6:
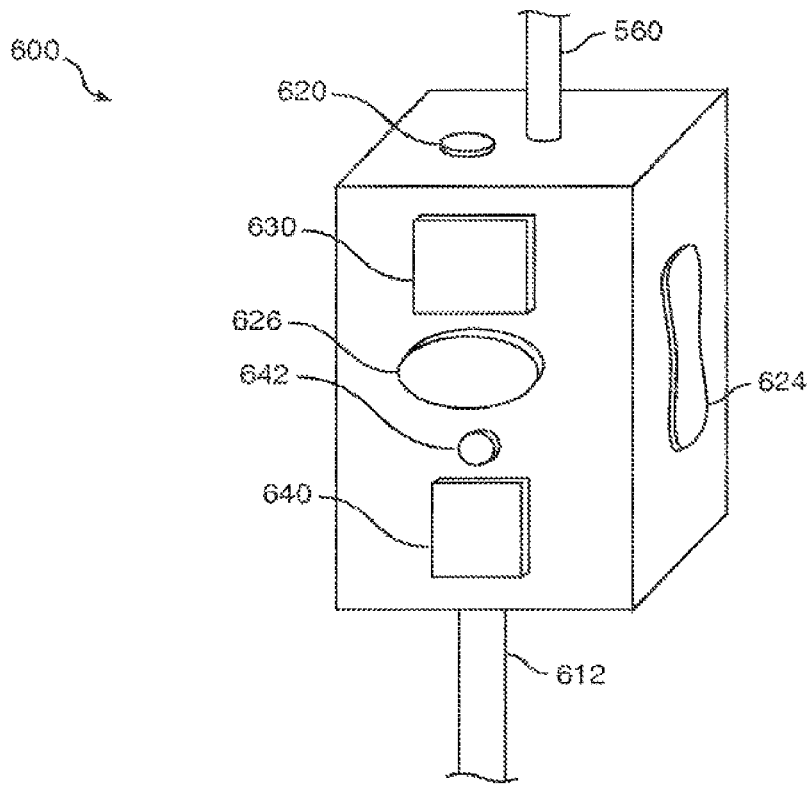
FIG. 6 is a plan view of an implementation of the personal hub of the incident recorder of FIG. 3.

Memory 341 includes data stored in any suitable organization and format. In one implementation, contents of memory 341 include data structures 400 as described below with reference to FIG. 4. Data may be organized for storage in a data structure of any conventional type including value, list, table of records, file, tree, graph, hierarchy of records, or hierarchy of tagged strings consistent with a markup language. Data in any organization and plural organizations may be stored in containers. The description of memory 341 shown in FIG. 4 is more akin to a functional block description than a data structure or container description. Nonetheless, the data stored in memory 341 and the manner in which it is accessed by processor 340 specifies the structure of memory 341.

A wired and/or wireless interface provides communication between handset 132 and shift hub 120. The wired interface enables handset 132 to electrically couple to dock 126 to communicate information between handset 132 and shift hub 120. A wireless interface enables handset 132 to wirelessly communicate with ad hoc transceiver 124 of shift hub 120. In one implementation, handset 700 uses a wired interface to couple both battery charging currents and data communication signals to docks 126 of shift hub 120.

An orientation detector detects an orientation and a change in orientation of an object. An orientation detector may report an orientation or a change in an orientation of an object. An orientation detector may provide an analog or digital signal consistent with an orientation of an object. An orientation detector may detect any physical property (e.g., gravity, inertia, magnetic field, EM waves) or change in a physical property to detect orientation or a change in orientation. In one implementation, orientation detector 338 (550) includes a three-axis gyroscope that detects the orientation and changes in the orientation of headset 222 (500) and thus the orientation of the operators head. The orientation of the operator's head may be recorded with and be correlated to other incident information.

Information provided by an orientation detector may be used for any purpose suitable for incident recording. Orientation information may be used to index incident information for review and searching. For example, handset 132 or 700 may provide a list of locations in original incident information in which the author-operator oriented headset 500 toward himself or herself (e.g., look down, look at feet). Such an orientation may include unintended recording and be suitable for classification as personal-confidential as discussed above by operation of handset 132 (700) without user input for selection of information or identification of a category. Similarly, an automatically prepared index of original or supplemental information formed with respect to headset orientation may be presented as legends to permit a user to search for locations in which headset 222 (500) was oriented at a preprogrammed or user-identified orientation. Orientation for automatic classification may be defined relatively (e.g., to the right) or absolutely (e.g., to the north-west).

Data structures 400 include program code 402, local logs 404, audio hub mike streams 406, audio head mike streams 408, audio oriented mike streams 410, audio handset mike streams 412, video oriented camera streams 414, supplemental documents 416, supplemental audio streams 418, supplemental video streams 420, menus 422, classification information 424, other data 426, interactive-voice-response streams 428, and orientation information 430.

Program code 402 includes instructions performed by processor 340 to accomplish any methods and functions ascribed to processor 340 or handset 132 (700). Program code 402 includes operating systems for processor 340 and application software. Application software includes software for recording audio and video in MPEG-4 format, software for operating a user interface for a handset as discussed herein, software for reviewing recorded information, software for determining revisions in MPEG-4 format, software for classifying incident information, and software for communications.

For improved information gathering and transfer, application software may further include software for noise cancellation, video enhancement (e.g., stabilization, bounce removal, light level compensation), identification of the author-operator of the camera (e.g., during recording) and the handset (e.g., during revising), identification of other components of the incident recorder (e.g., serial numbers, types, manufacturers), interactive voice response, transcription of speech to text, and 3D modeling for graphic presentations including data collection graphics.

Recorded audio and video may be stored for at least two purposes. A pre-event buffer may retain continuously recorded audio and video information in a circular buffer (e.g., 60 seconds duration) so that when the operator indicates a time to begin recording an event (e.g., operation of a control 343 or 328), audio and video from before the operator's indicated time is available, for example, to provide information as to why the user decided to begin recording the event (e.g., incident, revision).

Any number of events may be recorded, preferably one event at a time. The end of each event may be indicated by the author-operator by operation of control 343 or 328. Controls 343 or 328 may include a dedicated switch (e.g., event switch 630 or 750) for indicating a start and an end of an event. Menus may permit the user to actuate legends 740 to indicate the end of an event.

An incident report may include supplemental information as described above. Supplemental information may include portions of logs, interactive voice response streams, data collection forms or overlays, a user provided classification, data collection graphics or overlays whether or not any or all of this information is included in a revision. In a preferred implementation, a revision includes all relevant information including one or more movies, all scene descriptions, portions of logs, interactive voice response streams, classifications, data collection forms or overlays, and data collection graphics or overlays.

Storage of recorded audio or video in a "buffer" as stated herein does not designate a format for storage. A buffer as used herein may hold any audio or video stream in any format (e.g., MPEG-4 format). A pre-event or event stored in a buffer does not designate a contiguous region of memory. Streams that are part of a pre-event may be stored in the same or different buffers. Streams that are part of an event may be stored in the same or different buffers. Streams that are part of supplemental information, a description, or a revision may be stored in the same or different buffers. In one implementation, a buffer is coextensive with an MPEG-4 container.

A log is a list of records each describing a change and noting the time when the change occurred. Local logs 404 are updated on the occurrence of a change in the configuration or operation of incident recorder 208 and handset 132 (700). For example, local logs 404 may include an entry for application of power to handset 132 (700), removal of power from handset 132 (700), switching video monitor 342 on or off, adjustment of a time base used by handset 132 (700) (e.g. synchronization of time of day, date), entry and exit from privacy mode (e.g., a privacy function), and adjusting or establishing parameters that affect recording or revising (e.g., pre-event buffer length, video resolution for pre-event or event, software upgrades).

Audio hub mike streams 406 include buffers for storage of audio for any one or more of pre-events, events, supplemental descriptions, and revisions.

Audio head mike streams 408 include buffers for storage of audio for any one or more of pre-events, events, supplemental descriptions, and revisions.

Audio oriented mike streams 410 include buffers for storage of audio for any one or more of pre-events, events, and revisions.

Audio handset mike streams 412 include buffers for storage of audio for any one or more of pre-events, events, supplemental descriptions, and revisions.

Video oriented camera streams 414 include buffers for storage of video for any one or more of pre-events, events, and revisions.

Supplemental documents 416 include buffers for text entry or scanned paperwork for revisions.

Supplemental audio streams 418 include buffers for supplemental audio from the author-operator (spoken impromptu or in reply to an interactive voice response script) for revisions. Supplemental audio streams 418 may include audios streams for supplement information form all audio sources or from select audio sources. Supplemental audio information may be apportioned for storage in supplemental audio streams 418 and audio hub mike streams 406, audio head mike streams 408, audio oriented mike streams 410, and audio handset mike streams 412.

Supplemental video streams 420 include buffers for supplemental video for revisions. Supplemental video information may be apportioned for storage in supplemental video streams 420 or video oriented camera streams 414.

Menus 422 include legends that are displayed on display 730 of video monitor 342. Legends may be responsive to a mode of operation of handset 132 or 700.

Classification information 424 includes indicia of categories, suggested groups of categories, user defined categories, and associations of categories with information stored in other data structures 400 as discussed above. Classification information may be presented on display 730 (e.g., categories) as legends 740 for selection by a user to classify particular information. Classification information 424 may store one or more associations of categories and information selected by a user or selected and classified automatically as discussed above. Indicia of classification may be included in an incident report or revision. Classification information may be communicated to and/or from shift hub 120.

Data 426 includes all variables and temporary storage required for the performance of the program code 402. Data may further include device identification for the component that stores the data structure (e.g., handset 132 (700)) and for the primary subsystem to which it is a part (e.g., 208) or any or all of its components (e.g., personal hub 224 (600), headset 222 (500)).

Figure 7:
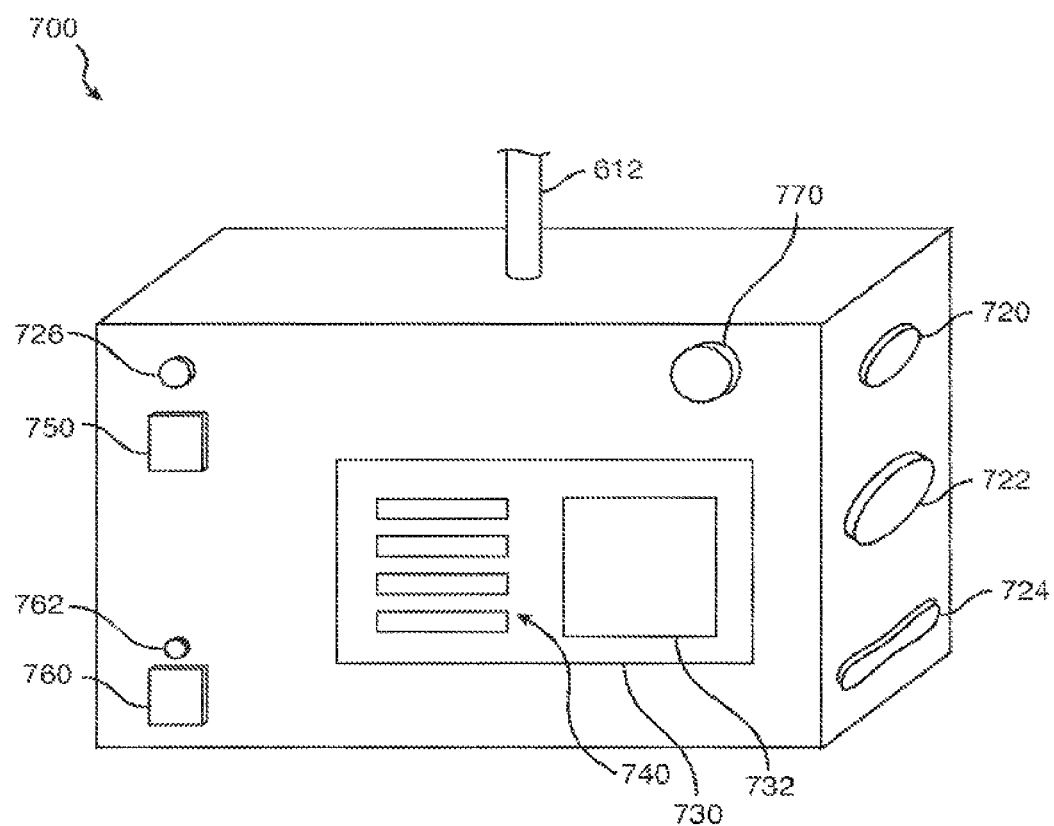
FIG. 7 is a plan view of an implementation of the handset of the incident recorder of FIG. 3.

A handset includes any device that facilitates the capture of original audio and video information, capture of supplemental audio and video information, review of captured information, and classification of information. For example, handset 132 of FIGS. 1, 2, and 3 may be implemented as shown in a perspective view of handset 700 in FIG. 7. The rear side includes terminals for connecting a battery charger of shift hub 120 to the battery (not shown) that is internal to handset 132 (700). Conductor 612 for coupling to headset 500 and hub 600 extends from handset 700. Handset 700 includes dedicated controls (750, 760, 770, 720, 724) and touch-screen legends 740.

A user interface of handset 700 includes event handset mike 726, event switch 750, privacy LED 762, privacy switch 760, touch-screen legends 740 along one edge of display 730, display toggle switch 770, power switch 720, handset speaker 722, and volume switch 724. Display 730 may also present original or supplemental information in a picture-in-picture (PIP) format 732.

The PIP format may be used to review any combination of two video streams or other visual information such as scanned documents. For example, display 730 may present video (e.g., live from camera 510, video oriented camera streams 414) while PIP 732 presents supplemental visual information (e.g., supplemental documents 416, supplemental video streams 420, classification information 424).

Legends may be presented beside the movie or PIP presentation. In another implementation, the entire display area is used for the movie or PIP presentation.

Volume switch 724 operates to increase or decrease a volume of the audio provided by speaker 722.

Cable 612 may be coupled to hub 600 or decoupled from hub 600 for stand-alone operation of handset 700. During stand-alone operation, handset 700 may be used to review original or supplemental information and receive additional supplemental information via handset microphone 726.

Figure 8A:
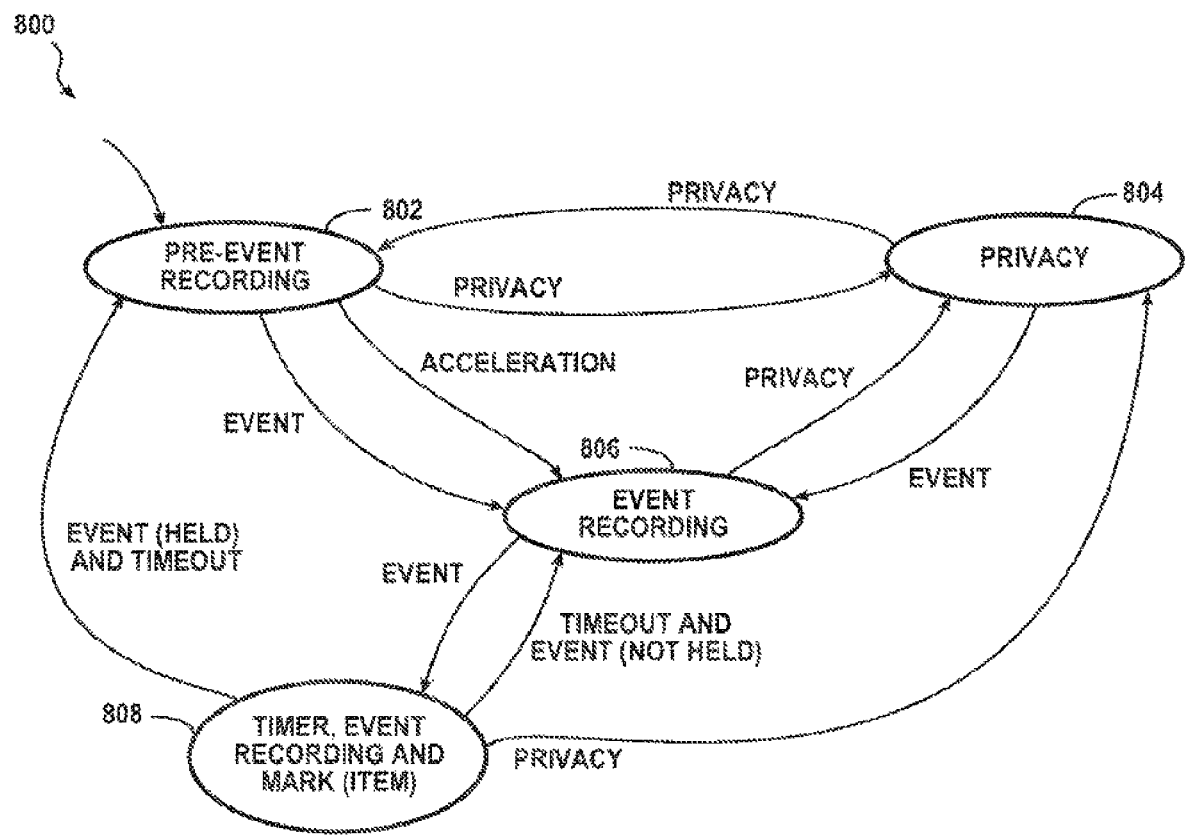
FIGS. 8A and 8B are state change diagrams of states of the handset of FIG. 7 while recording original incident information and controlling the display.
Figure 8B:
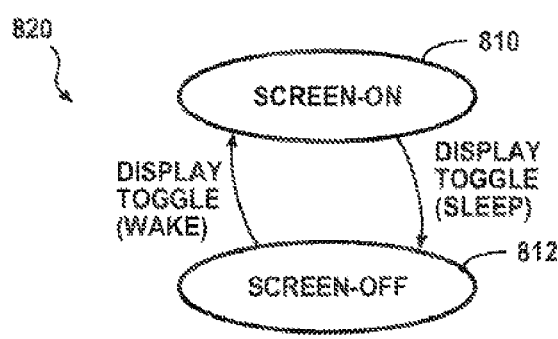

Display toggle switch 770 operates to turn display 730 alternately on and off as shown in state change diagram 820 of FIG. 8B. States of state change diagram 820 include screen-on state 810 and screen-off state 812. While in screen-off state 812, display 730 does not display any information. While in screen-on state 810, display 730 displays information which may include original information, supplemental information, revisions, legends, warnings (e.g., low battery, hub disconnected, headset disconnected), response to an IVR script, and any other information. Successive operations of display toggle switch 770 moves state change diagram 820 between the screen-on state 810 and screen-off state 812.

Processor 340 of a handset 132 or 700 may implement a user interface according to various aspects of the present invention having particular synergies for simplicity of operation. For example, when instructions for performing suitable methods are stored in memory 341 and performed by processor 340, the primary subsystem in which the processor, memory, and user interface is implemented performs state change mechanisms 800 and 900 of FIGS. 8A and 9.

Figure 9:
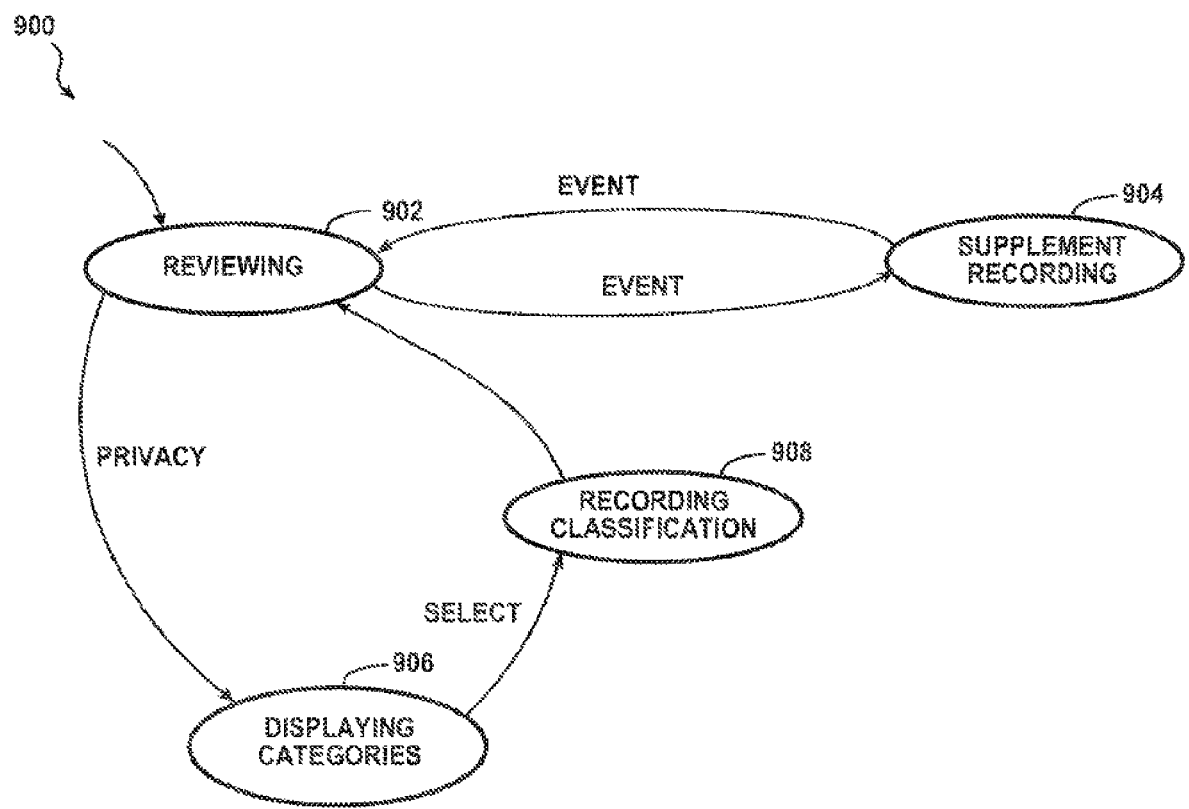
FIG. 9 is a state change diagram of states of the handset of FIG. 7 while reviewing incident information.

The state change logic as indicated in FIGS. 8A and 9 uses conventional symbology: an arrow is followed to change states when the processor detects the signal indicated beside the arrow. A state comprises the performance of the one or more functions described for the state. States and state changes may be implemented with conventional hardware and software (e.g., programming) technologies. Preferably, processor 340 operates in only one state at any instant of time; however, state change mechanisms 800 and 900 may be implemented with additional functions performed in each of the illustrated states. Consequently, a mode of operation may include one state and may further include additional functions performed while in that one state. Additional states may be implemented between the illustrated states without departing from the state change logic as illustrated in FIGS. 8 and 9.

Receipt of a signal may accomplish a transition from one state to another state. A signal may be provided upon operation of a control. For example, an operation of event switch 750 (630) produces EVENT signal and an operation of privacy switch 760 (640) produces PRIVACY signal as shown in FIGS. 8A and 9.

Event switch 750 (630) and privacy switch 760 (640) operate to record original incident information in accordance with state change diagram 800 of FIG. 8A. State change diagram 800 defines states of operation of handset 132 of FIGS. 1-3 and handset 700 of FIG. 7 while recording original information. States include pre-event recording state 802, privacy state 804, event recording state 806, and time, event recording and mark (TEM) state 808. Operation continues in a state until all conditions are met for a state change.

Pre-event recording may also be referred to as pre-recording.

Entry into state 802 may occur on application of primary power (e.g., power switch 720) to the handset or upon detecting that a touch screen icon has been actuated by the user.

While in pre-event recording state 802, handset 132 (700) captures audio and video information into a pre-event circular buffer as described above. The pre-event circular buffer captures information for a period of time before overwriting information previously recorded in the pre-event buffer.

While in pre-event recording state 802, an operation of privacy switch 760 (640) causes a state change to privacy state 804. An subsequent operation of privacy switch 750 (640), prior to operation of any other control, causes a state change back to pre-event recording state 802.

While in pre-event recording state 802, an operation of event switch 750 (630) causes a state change to event recording state 806. A transition from pre-event recording state 802 to event recording state 806 may also occur upon detecting a sudden acceleration of handset 132 (700). Generally, handset 132 (700) is worn or held by a user. Sudden acceleration of handset 132 (700) may indicate that an event has occurred that should be recorded. Events that may produce a sudden acceleration may include the operator rapidly accelerating from a stop and a force applied to the operator (e.g., physical blow, struck by a bullet). A sudden acceleration of the handset may indicate a situation in which the user would like to operate event switch 720 (630), but physically cannot. Acceleration may be detected and reported by accelerometer 348.

While in privacy state 804, handset 132 (700) performs the privacy function and records no audio or video information. Although oriented camera 510 and various microphones (520, 530, 620, 726) may continue to receive video and audio information and provide signals responsive to the video and audio information, no video or audio information is recorded in memory 341. While in privacy state 804, privacy indicator 762 (642) is illuminated (e.g., LED, lamp). In any other mode, privacy indicator 762 (642) is not illuminated.

While in privacy state 804, an operation of privacy switch 760 (640) causes a state change to pre-event recording state 802. While in privacy state 804, an operation of event switch 750 (630) causes a state change to event recording state 806.

While in event recording state 806, handset 132 (700) captures original audio and video information about an incident. Event recording state 806 captures audio information from handset mike 726 or hub mike 620, but preferably from oriented mike 520 and head mike 530. Event recording state 806 captures video information from oriented camera 510. Processor 340 stores captured information in memory 341 in data structures as discussed above.

While in event recording state 806, an operation of privacy switch 760 (640) causes a state change to privacy state 804. While in event recording state 806, an operation of event switch 750 (630) causes a state change to TEM state 808.

While in TEM state 808, handset 132 (700) continues to capture original audio and video information; however, upon entering TEM state 808, processor 340 records a mark in the video and audio streams to indicate that event switch 750

(630) was operated at that time during data collection. An operator may insert a mark into a data stream during recording of the incident as a reminder to provide supplemental information about some aspect of the incident. A mark may be stored within a video or audio stream (e.g., same MPEG-4 container, different container, but related by time) or separately with information to provide a correlation between the mark and the video or audio streams at the time the mark was made.

Each entry into TEM state 808 records a new mark associated with the video and audio data being recorded at the time of entry. While reviewing, marks may be used as an index to the video and audio streams. Marks may be searched, sorted, and/or arranged in any manner to facilitate review. Information presented for review may skip (e.g., fast forward, fast reverse, hypertext link) from a scene of a movie associated with one mark to a scene of a movie associated with another mark to speed access to information.

During review of previously recorded information, a list of recorded marks (with or without descriptions) may be presented to assist in completing a revision. A mark may be annotated to provide descriptive information about the video and audio content at the time of the mark. After adding a description to a mark, a list of recorded marks may be presented with descriptions to assist in reviewing. Descriptions may include conventional thumbnails of the movie.

Upon entering TEM state 808, a timer is started. Operation of handset 132 (700) remains in TEM state 808 for a duration of time (e.g., until expiration of a countdown timer). The state change that occurs after the duration of time depends on whether event switch 750 (630) was held (e.g., presses, activated, selected) for the duration of time or whether switch 750 (630) was operated and released prior to expiration of the duration of time. The duration of time may be for any amount of time, preferably a few seconds (e.g., 2-3).

Event switch 750 (630), privacy switch 760 (640), and the timer in cooperation with event switch 750 (640) operate to cause state changes out of TEM state 808. While in TEM state 808, an operation of privacy switch 760 (640) causes a state change to privacy state 804. While in TEM state 808, operating and holding event switch 750 (630) for the duration of time causes a state change to pre-event recording state 802. Operating but not holding event switch 750 (630) for the duration of time causes a state change to event recording state 806.

The resolution of video information recorded in pre-event recording state 802 may be the same or less than the resolution of the video information recorded in event recording state 806.

Event switch 750 (630) and privacy switch 760 (640) are operated to supplement and classify original information (e.g., while reviewing previously recorded information) in accordance with state change diagram 900 of FIG. 9. State change diagram 900 defines states of operation of handset 132 of FIGS. 1-3 and handset 700 of FIG. 7 while reviewing previously stored information. States include reviewing 902, supplement recording 904, displaying categories 906, and recording classification 908. Operation continues in a state until all conditions are met for a state change.

While in reviewing state 902, handset 132 (700) presents previously recorded information on display 730 for review by the author-operator. Handset 132 (700) may further present marks stored during event recording. Marks may be presented to an author-operator as legends 740 for selection by the operator. While reviewing, handset 132 (700) may further provide audible interactive-voice-response (IVR) prompts and corresponding legends 740 to receive an operator response via selection of one or more legends 740 of display 730. Handset 132 (700) may further present suggested categories as legends during reviewing.

While in reviewing state 902, an operation of event switch 750 (630) causes a state change to supplement recording state 904. A subsequent operation of event switch 750 (630) causes a state change back to reviewing state 902. While in reviewing state 902, an operation of privacy switch 760 (640) causes a state change to displaying categories state 906.

While in supplement recording state 904, handset 132 (700) captures audio and video supplemental information from oriented mike 520, head mike 530, handset mike 726 or hub mike 620 and oriented camera 510. Supplemental information may provide additional information about the original information being reviewed or other descriptive information provided by author-operator as described above. Supplemental information may be information provided responsive to audible IVR prompts. An author-operator may provide a response to an IVR via head speaker 336, hub speaker 326, handset speaker 344, or legends 740 as described above. Supplemental information may include an audio description from the author-operator or activation of a touch-screen legend by the author-operator. Supplemental information is stored in memory 341. Supplemental information may be associated (e.g., same MPEG-4 container, point to an MPEG-4 container) to original information presented for review.

While in supplement recording state 904, an operation of event switch 750 (630) causes a state change to reviewing state 902.

While in displaying categories state 906, handset 132 (700) presents categories for classifying information. Categories may be presented as IVR audio prompts or legends 740. An author-operator may select a category to classify the information being reviewed or in advance of recording supplemental information. Processor 340 stores the category selected by the author-operator in memory 341. Classification information (e.g., indicia of one or more categories and associated information) may be stored in the same MPEG-4 container as the information being classified or in a separate data structure (e.g., 424). Examples of possible categories for classification are provided above.

While displaying categories, any control 343 may be used to select a category. In one embodiment, categories are presented as legends 740 and selection is performed by selecting a legend of legends 740. In another implementation, categories are presented as an audio IVR list of categories and selection is performed by operation of a control 343, such as privacy switch 750 (630).

While in display state 906, selection of a category, whether by legends 740 or operation of privacy switch 750 (630), causes a state change to recording classification state 908.

While in recording classification state 908, processor 340 stores indicia of one or more categories designated by the author-operator. Storing indicia of one or more categories may be accomplished as discussed above and may include encryption of the information associated with the category. Completion of recording the category causes a state change to reviewing state 902.

An incident refers to human or animal activities and to a period of time when these activities take place. Incidents include, for example, formation of agreements, transactions, negotiations, discussions, ceremonies, meetings, crimes, attempted crimes, disagreements, assaults, conflicts, discoveries, research, investigations, and surveillance. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons.

The factual description of an incident may aid others to determine the identity of the property affected, and/or persons injured; identity of witnesses, law enforcement personnel, and anyone contributing to the loss or extent of the loss or the injury or extent of the injury; any change in the property or change in the value of the property; and any change in the condition of an object, person, plant, or animal.

The factual description of an incident may also be used to establish responsibility for loss. For example, whether or not the facts of the incident require payment under an insurance policy may be determined on the basis of the incident report. When a weapon is used in an incident, responsibility for the loss or injury may in part be based on whether the weapon is used within the guidelines of a law enforcement agency, guidelines set forth by a manufacturer of the weapon, or policies and reasonable behavior or negligence as determined by local customs, courts, and educational/training institutions.

A report of an incident in many cases is evidence of facts regarding the incident. Evidence may be needed for proof of performance under an agreement, resolution of failure to perform under an agreement, proof of damage, injury, or loss, or for enforcement of customs, rules, regulations, laws, judicial orders, or directives from superiors such as employers, partners, custodians, guardians, relatives, officials, or higher ranking officers. Foundation and corroboration support the use of a report of an incident in court. Validation of an incident report includes verifying the accuracy and completeness of the foundation and corroboration supporting the incident report.

Accurate and complete reporting of the facts surrounding an incident has great social, economic, and judicial importance. Incident reporting as practiced in the prior art has limitations that adversely affect accuracy and completeness. More accurate and more complete incident reports are needed and are provided by systems and methods according to the present invention.

An incident report, as discussed herein, is a report of fact surrounding an incident. The incident report in a preferred implementation is intended to be admissible as evidence in court. The incident report consists entirely of information stored and communicated in one or more suitable electronic formats. According to various aspects of the present invention, an incident report may include a combination of information (herein called incident information) including audio, photographs, video, forms, text, graphics, scans, detected signals, and electronic documents (e.g., email, word processing, spreadsheets, graphical models, photographs, equipment configuration data, equipment operation event logs). Scans include for example scanned paper documents (e.g., tickets, titles), scanned bar codes (e.g., on products, badges), scanned magnetic stripes (e.g., bank cards, driver's licenses), scanned magnetic media (e.g. tapes, disks), scanned optical media (e.g., CDs, DVDs), and scanned glyphs (e.g., on documents, products, badges). Glyphs include symbol marking and reading technologies (e.g., ECC200 DataMatrix, PDF 417). Detected signals include intercepted remote control signals (e.g., for mechanical and electrical equipment); intercepted communications systems simultaneously operating during the incident such as land line phones, cell phones, pagers, radios, tracking devices, media broadcasting stations, wireless and wired computer network links, and sources of interference with these systems; and measurements (e.g., environmental sensors for temperature, sensors for hazardous conditions, monitors for physical conditions).

Incident information may include descriptions of the persons, animals, and things at an incident including, for example, subsystems brought to the incident by law enforcement officers. These descriptions may be captured in any convenient manner (e.g., recorded speech, video, photographs, scans of markings on things).

After the first incident information is recorded and available for review, an incident report based on the incident information may be developed through selecting, adding, supplementing, organizing, emphasizing, and editing any of which being referred to herein as revising. The result of revising is herein called a revision. Each revision of an incident report may result in the creation of a new version of the incident report. The prior version may be replaced by the new version. Preferably, the original version is retained for comparison and analysis with reference to the latest version. All versions may be retained. The incident information forming the basis for an incident report may be captured by an author who is operating a primary subsystem according to various aspects of the present invention, herein called an author-operator, or simply an operator. A primary subsystem, according to various aspects of the present invention, may facilitate any of the following actions by the author-operator: timely developing one or more incident reports, timely reviewing incident reports, and timely revising of incident reports.

An incident report, in whole or in part, may be presented to a user on a primary subsystem of the present invention that includes a display and/or on a workstation of a secondary subsystem. The secondary subsystem may include an evidence manager. The user of an evidence manager may obtain summaries of numerous incident reports using database query and reporting technologies and may view the results on the workstation. The incident report may be the subject of a predefined work flow. Any conventional work flow management process may be used to complete, validate, and/or authorize use of the incident report. These functions may be accomplished by different individuals along the work flow being managed. Portions of an incident report may be managed in converging work flows that produce a combined incident report in a new version.

Any source of information may contribute to an incident report through operation of a primary subsystem, according to various aspects of the present invention. The incident information (herein also called data) may include what was seen, heard, or understood by the author-operator. Sources of information may include detectors of any of the incident information discussed above.

Recordings from these sources of information, unfortunately, may not capture all of what was seen, heard, or sensed by the author-operator and/or unambiguously show how the author-operator would interpret what happened. Due to the frailties of human memory, the human author-operator in many cases has a diminishing ability over an extended period of time to recognize ambiguity in the recording and/or omissions from the recording and to supply information that would resolve the ambiguity or explain the omission.

To avoid such loss of ability and to improve the accuracy of incident reports, systems and methods of the present invention may provide the capability to the author-operator to review and to supplement what was initially recorded. In other words, systems and methods according to various aspects of the present invention may employ structures and operations that facilitate supplementing recorded information with additional information that is generally recorded at a time soon after the initial incident recording is made. The result of supplementing is also referred to herein as a revision. More complete and more accurate incident reports result.

As discussed herein, recording and supplemental recording may be accomplished with any suitable recording technology or combination of sensing, detecting, formatting, communicating, and recording technologies. As used herein, a first type of presentation of audio and/or video content (herein also referred to as a movie) plays for a duration during which an operator may indicate an instance in time for a second presentation (herein also referred to as an excerpt) of a relatively short duration (herein also referred to as a scene). The short duration may limit the playing of the second presentation to a still photograph from the video content with no audio. The short duration may be somewhat longer but limit the playing of the second presentation to a loop showing one or a few movements. The short duration may be long enough for the operator to perceive from the excerpt of the first presentation some of the audio (e.g., a gunshot, a few words) and some of the motion (e.g., a glance, a facial expression) of the first presentation. By analogy to video information, any other form of incident information may constitute a movie and/or a scene and be supplemented by the author-operator.

The first presentation is discussed herein as consisting of a sequence of scenes, though a scene may have any suitable duration, not necessarily uniform for all scenes throughout the first presentation. And, the second presentation is discussed herein consisting of one scene of any suitable duration, but identified to a particular instance of time. The instance of time may correspond to the beginning of the scene, the end of the scene, or any convenient instance during the relatively short duration of play back of the scene.

In a preferred implementation, recording and supplemental recording produce information that is stored, reviewed, revised (e.g., supplemented), and communicated in accordance with "Coding of Moving Pictures and Audio", an ISO/IEC standard, known as MPEG-4. In accordance with MPEG-4, video information and audio information are stored in a hierarchy of containers. Information recalled from these containers may be used to compose scenes and movies for presentations as discussed herein.

Systems for collecting and managing evidence, according to various aspects of the present invention include subsystems generally used at the time and place of the incident (herein called primary subsystems) and other subsystems that are generally used not at the time or place of the incident (herein called secondary subsystems). These subsystems cooperate as a system for collecting and managing evidence.

Cooperative functions include functions performed by both primary and secondary subsystems in cooperation. Cooperative functions include identifying the author-operators of primary subsystems before evidence is collected, arranging for primary subsystems to cooperate before, during, and/or after incidents, and transferring collected evidence from the primary subsystems to the secondary subsystems.

Primary subsystems may perform any one or more of the following functions in any suitable combination: launching and/or deploying a force (lethal or less lethal) to a distant suspect to attempt to discontinue the present behavior of a person or animal (herein called a target), stimulating the target with an electrical current through tissue of the target to interfere with voluntary use by the target of its skeletal muscles (herein called electrical stimulation), logging events related to launching and/or stimulating, detecting for collecting evidence, recording for collecting evidence, revising recorded evidence, communicating among components identified to the same operator (herein called a personal primary subsystem), communicating among primary subsystems, communicating between a primary subsystem and a secondary subsystem, storing the identity of the operator, storing addresses for communication, receiving software and data from a secondary subsystem, and transmitting status, data, and evidence to a secondary subsystem.

Some primary subsystems have a central function that contributes to a unique name or type (e.g., launcher, projectile, stimulator, data logger, detector, collector, recorder, display, editor, transceiver, hub, store, identifier, reporter). However, combinations may not be amenable to a single name (e.g., combination launcher-stimulator-data logger, combination recorder-editor-transceiver-reporter). Consequently, the term primary subsystem is used herein to describe an apparatus that implements any one function and any apparatus that implements any combination of functions.

A primary subsystem may be packaged in several units (e.g., products individually sold or handled) (herein called components) that cooperate by wired or wireless links to participate in the set of functions of the primary subsystem. A component may be capable of operation for some functions without communication as part of the primary subsystem (e.g., providing a device identity to a device identification detector).

Secondary subsystems may perform any one or more of the following functions in any suitable combination: preparing components of primary subsystems for reassignment and reuse, detecting the identification of a person to be assigned the role of an operator for one or more components of a personal primary subsystem, detecting the identification of components to be part of a personal primary subsystem, transmitting identification information to components of a personal primary subsystem, detecting the identification of additional primary subsystems and associating with each additional primary subsystem an operator identification and/or a personal primary system identification, transmitting identification information to the additional primary subsystems, determining the identification of a primary subsystem for the purpose of receiving evidence from it, receiving evidence, storing evidence, and managing evidence. Suitable groups of these functions may be part of a general provisioning process that includes check-out, and check-in of persons, components, primary subsystems, and incident reports.

Communication, according to various aspects of the present invention, includes communication between the components of a personal primary subsystem, between primary subsystems, and between primary subsystems and secondary subsystems. Communication is discussed herein with reference to a link between communicating subsystems or a link between communicating components of subsystems. The link generally includes a channel and protocol suitable for the information being communicated. The channel may have frequency and/or timing criteria for receiving and/or transmitting. The channel may be wired or wireless. A dedicated wired channel may include receiving without an address and/or transmitting at any time. A shared wired channel may employ channels and protocols similar to a wireless channel. A wireless channel may be dedicated and if so, communication may be analogous to a dedicated wired channel. Otherwise, the protocol organizes competition for use of the channel for transmitting and receiving only according to an address. A subsystem may respond to one address or to several addresses. An address may be unique to one subsystem or general (e.g., group addressing) to several subsystems or to all subsystems. Addressing may include group addresses for example for anonymous transmitting and/or simultaneous receiving of a broadcast to several subsystems. A transmitting protocol may permit transmitting at a random time (beacon), at a random time after receiving (polled), at a prescribed time (dedicated slot), and/or at a prescribed time after receiving (assigned slot). A transmitter of a first subsystem may transmit and a receiver of a second subsystem may receive a command to stop transmitting by the second subsystem for an arbitrary or a predetermined period of time.

An operator may collect evidence single-handedly using his or her personal primary subsystem. For example, an operator may navigate a route and record the status of equipment and security mechanisms such as locked doors and appropriate lighting.

Operators may attend incidents and collect evidence in teams. Each team member may be an operator as to his or her personal primary subsystem and be identified to a suitable extent for operation or coordination with other primary subsystems. For example, each team member may have weapons (primary subsystems) for electrical stimulation as discussed above. Each team member may be associated to other team members' weapons to enable each team member to control the stimulation applied by any other team member's weapon.

A primary subsystem that logs events and/or detects incident information and further communicates directly or indirectly with a secondary subsystem is herein called a data source. A data source in various implementations may also record incident information, revise incident information, communicate between components of the data source using wired or wireless links, and/or communicate with another primary subsystem.

A data source may be located permanently at the location of the incident (e.g., a security camera, an entrance interview microphone, a document scanner, an access control system) and may communicate as discussed above (e.g., via a wired network among data source components). Typical data sources for law enforcement include red light and excess speed traffic monitoring systems. Data sources related to facility security may include badge readers, video surveillance, audio surveillance, biometric identification systems, and detectors of ambient conditions and changes in ambient conditions. For example, ambient conditions may include temperature, vibration, audible and visible indications of status quo in an environment subject to surveillance.

Changes in ambient conditions may include indications of entry by a person or animal trespassing, passersby, and any disruption of normal operation of equipment in the facility or surrounding area. Equipment being monitored by a data source may provide measurements and/or status reporting. A data source adapted to receive information from equipment may receive such information by monitoring observable equipment conditions and electrical communication to and from the equipment. For example, operation of an elevator in the vicinity of an incident may be observed or the signals that operate the elevator may be detected.

Data sources may be brought to the location of an incident by victims, witnesses, accomplices, suspects, and/or law enforcement personnel. Data sources may be overt or covert. Such equipment may include police patrol car on-dash video and audio systems, audio and video equipment worn by personnel, cellular telephones with video recording capability, and conventional crime scene investigation equipment (e.g., forensic data gathering measurement and analysis systems).

A primary subsystem that stimulates tissue of a target and/or launches or deploys a force toward a target is herein called an electrical stimulation device or electronic control device (ECD). An ECD may further include a data source having any suitable combination of capabilities identified above to a data source. Weapons (e.g., ECDs) may be either fixed or portable. Fixed weaponry may include turret-mounted weapons attached to facilities and/or land mines. Portable weaponry may include handguns, rifles, batons, grenades, missiles, electronic control devices, and electrified projectiles (e.g., electronic control devices and electrified projectiles as manufactured, for example, by Taser International, Inc. as models M26, X26, and XREP, the published specifications and user manuals for which are hereby incorporated by this reference without limitation of the present context).

For example, a primary subsystem comprising a weapon and a data source may include a laser target designator or sight, an illuminator to illuminate the target, a video recorder aimed at the target, a microphone aimed at the target, an electrical stimulation circuit, projectiles, and a propellant for deploying projectiles for the electrical stimulation. Such a primary subsystem may be referred to as a weapon due to its central force function. The primary subsystem may transmit status signals and/or log its status and usage information (e.g., store time stamped event records). Consequently, the primary subsystem may transmit and/or record audio of ambient conditions, speech of the target, speech of witnesses and/or weapon operator, and/or video of the target. The primary subsystem may record and/or transmit still photographs. The primary subsystem may record and/or transmit streaming video. For example, video may begin at a time tens of seconds before operation of a trigger of the weapon and extending tens of seconds or a few minutes after operation of the trigger.

A primary subsystem may record and/or transmit the location of the incident. A primary subsystem may detect the Earth's magnetic field (e.g., azimuth), including compass bearing information in or associated with audio and/or video recordings. A primary subsystem may detect orientation in linear or polar coordinate systems (e.g., pitch, roll, velocity, acceleration, momentum, angular momentum). Location may be determined by a detector of the primary subsystem using a global positioning system (GPS). A GPS receiver may be incorporated in a primary subsystem (e.g., a data source, a combined weapon and data source).

A data source may be used for scanning, detecting signals, and for accessing documents, as discussed above. Scanning, detecting, and/or accessing may be for the purpose of including relevant information in an incident report. For example, the contents of a person's wallet may be scanned by a data source for collection of identifying materials. Paperwork related to licensing of a facility or operation of a vehicle may be scanned. The audio and video portion of a telephone or internet communication may be captured. Email, text messages, and audio messages played back from a telephone answering machine may be captured by a data source.

A primary subsystem may include a detector, a recorder, a transceiver, and a user interface for reviewing and revising an incident report. A detector may detect any ambient condition: video, audio, communicated information (e.g., eavesdropping), and/or scanned information. A video detector may include a video camera oriented by the author-operator for recording what is in the field of view of the author-operator.

A primary subsystem may format detected information for the purpose of forming recorded media and/or for communicating recorded information. Preferably, detected information is formatted for supplementing an incident report by the author-operator of the data source (e.g., via MPEG-4 format). The transceiver may receive detected information from the detector for communication in real time. The recorder may supply recorded and/or revised information to the transceiver for communication via a link to other primary subsystems (e.g., for review and revision by a team member) and/or a secondary subsystem. The transceiver may include any conventional radio, telephone, or digital network transceiver. In one implementation, the transceiver supports a link to an ad hoc network for communication with primary and/or secondary subsystems. The user interface may facilitate preparing and/or revising an incident report from the information recorded by the recorder.

The user interface may include a display and controls adjacent to the display. The display may provide legends arranged along an edge of the display. User-operated switches may be arranged along the edge of the display and be identified for the purpose described by the legends. Requested information may include true/false or multiple choice prompts. A reply to such a prompt may be made by the operator by operating a switch on the edge of the display, a voice response by the operator, or operation of a pointer control that is part of the user interface.

A primary subsystem may interact with a human source of information, generally its author-operator. Interaction may include the presentation of questions, suggestions, or requests for narrative. The user interface may present information to the user in visual (on a display) and/or audio form (by Interactive voice response ("IVR")). The author-operator may respond via the user interface (operating controls and/or giving audio and/or video replies) to provide the requested information. Requested information may be organized as a hierarchy of diagnostics. Each diagnostic may be a request for information, a question (e.g., multiple choice or true/false, or a request for specific name, date, age), or a request to confirm information. The sequence of diagnostics may be predetermined by the primary subsystem. A primary subsystem may interpret an answer provided by its author-operator and conditionally determine whether another hierarchy (or sub-hierarchy) of diagnostics is to be presented. The interaction with the operator of a data source may, therefore, be guided by prompts provided by the primary subsystem. The prompts may differ depending on the type of incident being reported, the type of primary subsystem, and/or answers by the operator. Diagnostic hierarchies in one implementation include IVR scripts.

A secondary subsystem includes any computer system (e.g., personal computer, server, network of servers) that receives data from one or more primary subsystems and stores, manipulates, or reports the data use as evidence. A secondary subsystem may receive data as an incident report. A secondary subsystem may store, select, decompose, classify, sort, combine, compare, analyze, adjust, organize, and/or control access to incident reports. A secondary subsystem may comprise a hierarchy of components.

Methods, according to various aspects of the present invention, increase the likelihood that the incident report is complete, accurate, corroborated, verifiable, accessible, integrated with other sources of information, and reliably stored for use as evidence. These functions and advantages may be obtained by virtue of the variety of elements of an incident report (e.g., sounds, movies, forms, text, graphics, signals, documents, scans) and the capability of revising a scene based on any or all of these by the author-operator of the primary subsystem. Each element of incident information in an incident report or revision may be raw or derivative (e.g., presenting valuable selection and organization of clippings, croppings, enhancements, cross-correlations, sequences, sets, chronologies, related opinions, proofs, syllogisms, predictors of outcomes, and logical outcomes).

Generally two elements are associated logically or physically. Two or more elements may be associated. The association may be physical, for example, when reference to elements or elements themselves are stored in the same physical record. Association may be logical when a query of records that meet a given relationship produces a report indicating the relationship holds for the subject elements. An association in the terminology used for database management may be called a tuple. According to various aspects of the present invention, tuples of information provide the solutions to problems and benefits described above. For instance, an incident report may include a tuple of weapon usage information, video information, and responses gathered during an interview with a human source of information. For instance, a video clip may be associated with a date and time of a trigger pull of a weapon (e.g., an electronic control device), and an audio description of the behavior of the target (e.g., a suspect or animal) as provided by a law enforcement officer in response to a prompt to describe the target. As another example, an audio clip may be substituted for the video clip in the previous example. Still another example, a video clip may be associated with an audio supplementary description and a response by an officer describing the behavior of the target. As discussed above, video information, weapon information, and interview responses may be associated in a single primary subsystem, in a primary subsystem operating as a hub or master of primary subsystems reporting to the secondary subsystem, or in a secondary subsystem that receives from individual primary subsystem the individual data items prior to association. The basis for association may be an incident identifier or a consequence of concurrent acquisition of the data at the primary subsystems.

Data structures, according to various aspects of the present invention, may implement tuples, as described above. A data structure may be stored as a record of a database. A data structure may exist temporarily in memory referred to by process performed by a work flow processor. A data structure may include the tuple of elements and other data. The tuple of elements may include, for example, meta-data, time of day, officer identification, weapon identification, identification of other individuals or animals appearing or observable from the audio and/or video data, identification of the camera used to record video, identification of the audio of the microphone used to collect the audio information, identification of the weapon and its configuration which provides weapon usage information, as well as preliminary results of statistical analysis. Preliminary results may include conclusions as to applicable weapon usage policies, applicable guidelines for data collection or for weapon usage, metadata, index ordinals, description of location, descriptions of jurisdiction, and other information that applies to the incident though may not have been readily available in real time or recorded during the period of time covered by the incident.

The data transferred to a secondary subsystem, according to various aspects of the present invention, includes revisions made by an author-operator of the primary subsystem.

Revisions may improve the emphasis or clarity of an incident report. Video images may be cropped, panned, and/or zoomed. Movies may be clipped. Photographs may be cropped and/or scaled. Audio streams may be clipped. Printed information may be amended or partially rewritten for clarity. All of these revisions may occur at the primary subsystem by operation of a user interface. The time the revision was made may also be recorded. The original recordings are preferably retained and the revisions incorporated in a new version of the incident report.

An incident may initially be identified by a date and period of time during which the incident and/or investigation of the incident occurred. Any conventional identification may also be used. Each primary subsystem may be made aware of the incident identifier. For example, primary subsystems with reasonably synchronized date/time clocks may simply add date/time stamps to the information they provide. Primary subsystems having a user interface may accept an incident identifier from a user.

An incident report may be supplemented with a report of all time keeping devices used at the incident and recorded in incident reports. The report of all time keeping devices may be made at one instant of time for comparing relative time discrepancies. The report may be made at several times where each device is compared to a reliable time base. Devices that lack electronic communications may be included with suitable user interface prompts and controls (or recordings). For example, a prompt could ask the operator to verbally recite the time of day on his or her wrist watch.

For indirect transfer of data from a primary subsystem, the primary subsystem may include removable memory (e.g., semiconductor memory, magnetic tape or disk, optical media). A secondary subsystem may include a suitable reader for the removable memory. The primary subsystem may include a wired or wireless communication capability for direct transfer of data from removable or non-removable memory to the secondary subsystem. For example, the system for evidence transfer and management may include a docking station and/or a transceiver each for receiving data from a primary subsystem.

Evidence management may include validation of data received from a primary subsystem (e.g., incident reports and revised incident reports), making further revisions (e.g., creating derivative incident reports), combining portions of two or more incident reports, and comparing incident reports. Any data format may be used for transfer into a secondary subsystem. Any data format may be used for storing data in a secondary subsystem. Particular synergies are realized, according to various aspects of the present invention, when only a few, or one, data format is used for all data transfer and storage functions of the secondary subsystem. Preferably, both transfer and storage use a format having most if not all of the structures and functions of MPEG-4. Combining may be accomplished, for example using MPEG-4 objects, descriptions, and metadata, by including in a revision objects, descriptions, and/or metadata that originate from more than one primary subsystem.

The functions of a secondary subsystem as discussed above may be arranged for convenient use by diverse personnel responsible for different portions of collecting and managing evidence. All functions related to primary subsystems and their operators may be accomplished at a first location and all other functions (e.g., evidence storage and analysis) may be accomplished at a second location. For example, a system for collecting and managing evidence may include any number of station hubs coupled by a network to any number of shift hubs. A station hub provides secure operation of an evidence manager. A network supports data and inter-process communication. Any conventional protocol may be used (e.g., an Internet or intranet protocol stack). A shift hub provides data transfer from a primary subsystem (e.g., incident records and revisions) and may further provide physical storage (e.g., off-shift secure storage for personal items or items controlled by an armory), recharging of rechargeable batteries, and/or data transfer to the primary subsystem (e.g., software upgrades, information regarding tactical tasks, evidence collection tasks, and communication tasks discussed below with reference to FIGS. 16 and 17).

Figure 10:
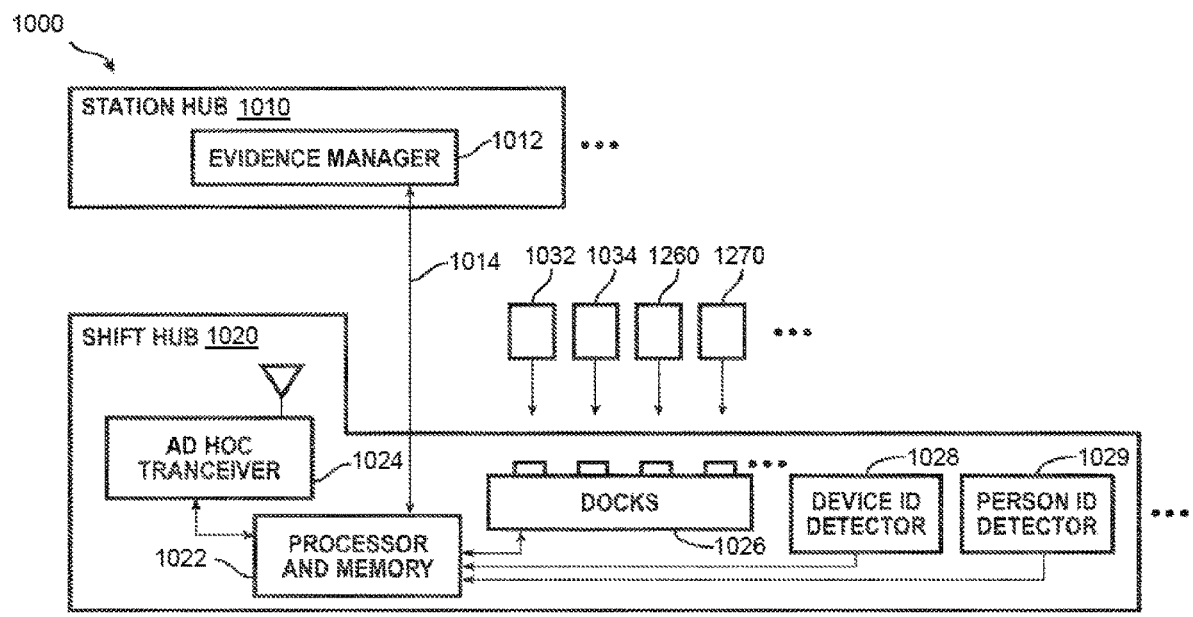
FIG. 10 is a functional block diagram of a secondary subsystem of a system for collecting and managing evidence, according to various aspects of the present invention.

For example, a system for collecting and managing evidence 1000 of FIG. 10 includes station hub 1010 coupled by network 1014 to shift hub 1020. Station hub 1010 hosts evidence manager 1012 (e.g., a database manager adapted in a conventional manner for managing evidence as discussed herein). Hosting includes a conventional secure computing environment (e.g., physical security, communication security, access controls, encryption). Network 1014 provides secure communication between any number of station hubs 1010 and shift hubs 1020. Shift hub 1020 includes a processor 1020, an ad hoc transceiver 1024 for wireless communication with any suitable number of primary subsystems equipped for wireless data transfer, docks 1026 for wired connection to any suitable number of primary subsystems, a device identification detector 1028, and a person identification detector 1029.

Processor 1022 via ad hoc transceiver 1024 and/or docks 1026 may poll primary subsystems (and/or components) that are within range for maintaining among them an ad hoc network based on one or more suitable communication channels (e.g., conventional IR, radio, or wireless network channels) and based one or more suitable communication protocols (e.g., conventional IEEE 1702). Such a network is "ad hoc" because candidates of the network may enter and members of the network may exit the zone of communication (e.g., moved by humans) without advance notice to processor 1022. Processor 1022 recognizes entries and exits and maintains the ad hoc network with as many members as practical for the capability of processor 1022.

An ad hoc transceiver may participate in different ad hoc networks at different times. For instance, an ad hoc transceiver not at an incident may join an ad hoc network for transfer of incident reports to a secondary system (e.g., 1032 in FIG. 10). The ad hoc transceiver may, at another time, join an ad hoc network for recording incident information (e.g., 1032 in FIG. 11). The ad hoc transceiver may, an another time, join an ad hoc network for directing tasks to other primary subsystems (e.g., 1260 and 1109 of FIG. 16). In other implementations different transceivers may be used for some or all of these types of communications to accommodate differences in channels and/or protocols.

A device identification detector detects an identification of a component to a primary subsystem or of an entire primary subsystem (e.g., a personal primary subsystem). For example, on check-in to shift hub 1020 (e.g., docking or local ad hoc communication) of a component of or for a primary subsystem, suitable components of the primary subsystem that are plugged into docks 1026 may be identified by device identification detector 1028 to the incident reports transferred from the components for purposes of evidence validation. On check-out from shift hub 1020 (e.g., undocking) of a component for a primary subsystem removed from docks 1026, the component that is removed from docks 1026 may be identified to the primary subsystem (e.g., in the same or another component) so that incident reports are recorded in association with that component's identification, again for purposes of evidence validation.

A person identification detector detects an identification of a person associated or to be associated with a primary subsystem. For example, on check-in to shift hub 1020 (e.g., docking or local ad hoc communication) of a primary subsystem, the person that plugs suitable components of the primary subsystem into docks 1026 may be identified by person identification detector 1029 to the incident reports transferred from the primary subsystem for purposes of evidence validation. On check-out from shift hub 1020 (e.g., undocking) of a primary subsystem from docks 1026, the person that removes components of a primary subsystem from docks 1026 may be identified to the primary subsystem so that incident reports are recorded in association with that person's identification, again for purposes of evidence validation.

As discussed below with reference to FIGS. 16 and 17, activators 1260 and electronic control devices 1270 may be plugged into docks 1026 or communicate via ad hoc transceiver 1024 to exchange addresses for addressable stimulus control. Processor 1022 may read such addresses stored in a first activator and write those addresses into a second activator. Processor 1022 may receive addresses for stimulus control via network 1014.

Device identification detector 1028 may detect an identification for obtaining addresses for addressable stimulus control, discussed below with reference to FIGS. 16 and 17. For example, weapons that respond to signals for addressable stimulus control (e.g., electrified projectiles) may be identified to identification detector 1028 by bar codes, glyphs, or radio frequency identification (RFID) technologies. The weapon identification may directly or indirectly determine addresses needed for transfer into an activator. As another example, persons (e.g., operators) intended to use an activator with particular weapons that respond to signals for addressable stimulus control may be identified to person identification detector 1029 in any conventional manner (e.g., badge reader, biometric detection). Addresses for stimulus control may be associated with an intended operator identification.

The association of an intended operator identification with one or more such addresses may be accomplished by a user interface of shift hub 1020 (not shown) or by a user interface coupled to network 1014 (not shown) for example used by an armory when dispensing electrified projectiles having addresses for stimulus control. The armory may specify addresses for stimulus control of those electrified projectiles being dispensed in association with an identification of an activator and/or in association with an identification of a person chosen to use an activator. As part of check-out of an activator (undocking) to an identified person, the activator may receive (prior to undocking or by ad hoc communication) addresses for stimulus control suitable for the identified person.

Docks 1026 accept, by plug-in to a wired network, any suitable number of primary subsystems and/or components thereof. Docks may also provide a location (e.g., a bin) within range of ad hoc transceiver 1024 for communication between processor 1022 via transceiver 1024 and any number of primary subsystems and/or components thereof placed at the location (e.g., in the bin). The location may be suitable for detecting device identification by device identification detector 1028. For example, hand sets 1032 and 1034, activator 1260 and ECDs 1110 may be plugged into docks 1026. Head sets 1122, personal hubs 1124, and ECD projectiles 1270 may be located in a bin (not shown) for scanning and/or programming by device identification detector 1028.

Docks 1026 locates and/or links for communication components and primary subsystems for data transfer to secondary subsystem 1010 as coordinated by processor 1022 and evidence manager 1012. Data transfer may include incident reports and/or usage logs. If other components and/or primary subsystems are nearby but not plugged into docks 1026, data transfer may occur via ad hoc transceiver 1024 as controlled by processor 1022 for communication with those other components and primary subsystems.

Components and primary subsystems may be recharged via docks 1026. For example, hand sets 1032 and 1034, activator 1260 and ECD 1270 may be plugged into docks 1026 for recharging of their internal batteries as controlled by processor 1022. Processor 1022 may notify an operator of system 1000 of undocked components and primary subsystems that may benefit from docking (e.g., higher reliable data transfer rate, recharging).

Each primary subsystem (e.g., hand set, activator, ECD projectile) that cooperates with shift hub 1020 may receive from shift hub 1020 data identifying an intended operator for the primary subsystem (e.g., from person identification detector 1029). Identification of the intended operator may then be added to data recorded by the primary subsystem (e.g., identifying the author-operator) for purposes of laying a foundation for the incident record as evidence. Any or all components of a primary subsystem may be identified to any or all of the other components of the primary subsystem (e.g., using a unique primary subsystem identifier and/or a unique ad hoc address for the primary subsystem).

The functions of a shift hub may be reduced to cooperate with another secondary subsystem component (not shown) herein called a locker dock. For example, the reduced shift hub includes one or more ad hoc transceivers 1024, and processor 1022 and omits docks 1026, device identification detector 1028, and person identification detector 1029. Numerous locker docks (not shown) are connected by network 1014 to one or more reduced shift hubs. Each reduced shift hub connects by network 1014 to station hub 1010. Each locker dock is located in an identified person's locker generally used for personal effects when the person is on duty. The locker dock includes processor 1022, docks 1026, and device identification detector 1028. Those devices that cannot be identified by plugging into docks 1026 are identified by device identification detector 1028.

A device identification detector may scan (e.g., optical reader, magnetic reader) or receive (e.g., radio link, IR link) from a device an identification. A device identification detector may change or supplement the identification of a device. For example, the device identification may be replaced, added to, or revised by any manner suitable for human and machine readable identification (e.g., mark, print, erase, magnetize, re-magnetize, transmit into). The identification from or to the device may include a unique address, a group address, or any combination of one or more of these addresses.

Figure 11:
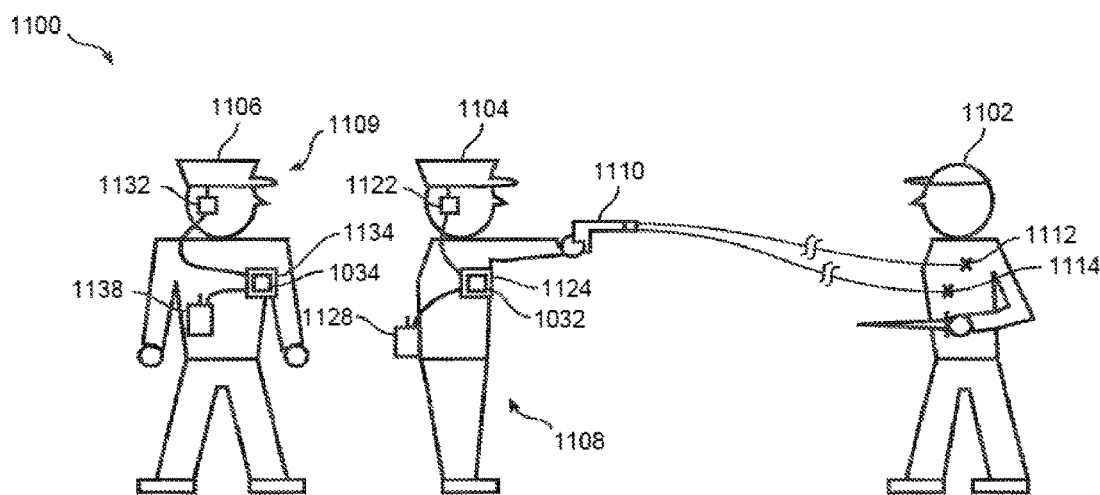
FIG. 11 is a pictorial representation of a hypothetical incident involving two law enforcement officers apprehending a suspect while each officer is operating a respective primary subsystem of a system for collecting and managing evidence, according to various aspects of the present invention.

A hypothetical incident and application of systems and methods according to various aspects of the present invention is illustrated in FIG. 11. FIG. 11 is a pictorial representation of a hypothetical incident involving two law enforcement officers 1106 and 1104 apprehending a suspect 1102 while each officer is operating a respective primary subsystem, herein called a system for incident recording 1109, 1108 (also called an incident recorder), according to various aspects of the present invention. Officer 1104 operates an electronic control device 1110 (e.g., a TASER International model M26 or X26) that deploys two wire-tethered darts that hit the suspect 1102 at contact points 1112 and 1114. Current generated by the electronic control device flows through the wires, darts, and tissue of the suspect to cause involuntary muscle contractions, halting locomotion by the suspect and facilitating arrest of the suspect. System for incident recording 1108 worn by officer 1104 records a movie (e.g., audio and video) during the confrontation. System for incident recording 1109 worn by officer 1106 also records a movie during the confrontation, from a different point of view. Systems 1108 and 1109 are identical; each includes a head set 1122 (1132), personal hub 1124 (1134), hand set 1032 (1034), and on-duty transceiver 1128 (1138). Each headset 1122 (1132) includes a camera and microphone oriented away from the officer toward the field of view of the officer's eyes. Soon after suspect 1102 is arrested (e.g., hand cuffed, shackled, confined), officer 1104 (1106) may independently review the movie that was recorded and add descriptions to any scenes. Reviewing is accomplished by removing the hand set from the personal hub and watching the movie on a display of the hand set. Adding a description is accomplished, among other things, by identifying a scene, and adding audio (e.g., talking about the scene into a microphone of the head set or personal hub), adding video (e.g., removing the camera from the headset and orienting it toward anything of interest), and/or adding graphical information (e.g., describing in a standardized way where on the body of the suspect contact points 1112 and 1114 occurred). While the hand set is apart from the personal hub, the officer may use a microphone and speaker of the personal hub for communication via the on-duty transceiver, for example to a dispatch agent.

Figure 12A:
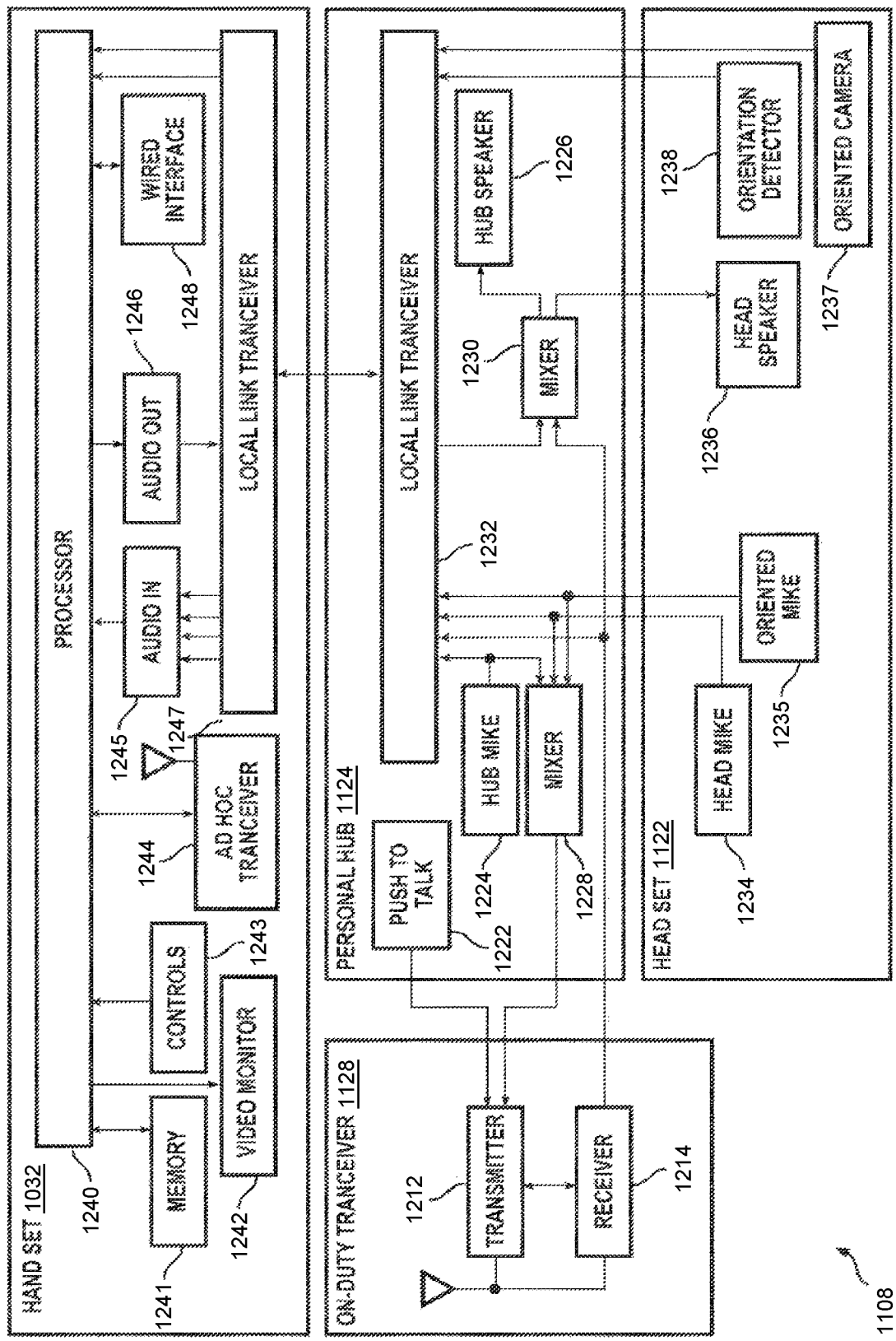
FIG. 12A is a functional block diagram of an implementation of one of the primary subsystems, also herein called an incident recorder, of FIG. 11.
Figure 12B:
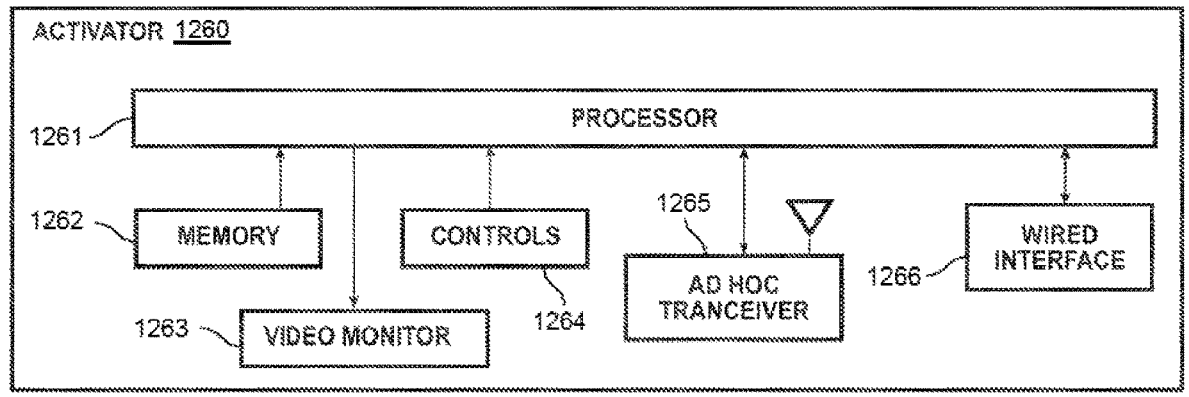
FIG. 12B is a functional block diagram of an implementation of another primary subsystem, also herein called an activator, of a system for collecting and managing evidence, according to various aspects of the present invention.
Figure 12C:
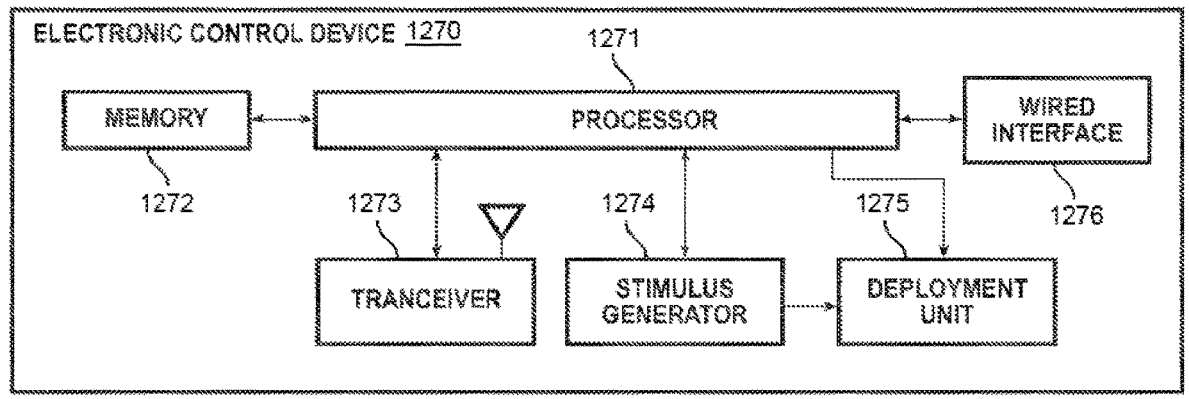
FIG. 12C is a functional block diagram of an implementation of another primary subsystem, also herein called an electronic control device, of a system for collecting and managing evidence, according to various aspects of the present invention.

In an exemplary implementation, a system for incident recording (herein also called a primary subsystem, a personal primary system, or an incident recorder) 1108 of FIG. 12 includes hand set 1032, on-duty transceiver 1128, personal hub 1124, and head set 1122. Handset 1032 includes processor 1240, memory 1241, video monitor (also herein called a display) 1242, controls 1243, ad hoc transceiver 1244, audio in circuit 1245, audio out circuit 1246, and local link transceiver 1247. On-duty transceiver 1128 includes transmitter 1212 and receiver 1214. Personal hub 1124 includes push-to-talk circuit 1222, hub microphone 1224, hub speaker 1226, mixer 1228, mixer 1230, and local link transceiver 1232. Head set 1122 includes head microphone 1234, head speaker 1236, oriented microphone 1235, oriented camera 1237, and orientation detector 1238. The functions and functional cooperation of these components are discussed below.

A hand set, according to various aspects of the present invention, provides a display and provides controls sized and positioned for operation by a user's fingers and/or thumbs and operates to supplement recorded information with a description determined (e.g., created, defined, selected, specified) by the user. The description (also herein referred to as a supplement, supplemental information, and/or a revision) may include additional video information, audio information, graphics information, text, status, logs, measurements, calculations, documents, and/or data. A hand set may further include the structures and perform the functions of a data source as described herein. A hand set may record information. A hand set may receive information to be recorded by the hand set. A hand set may communicate recorded information and/or supplemental recorded information to other portions of an incident recorder and/or to a system for evidence transfer and management system. For example, hand set 1032 receives from personal hub 1124 signals that convey audio and video information and records the audio and video information in MPEG-4 format in memory 1241. In another implementation, personal hub 1124 and on-duty transceiver 1128 are omitted and hand set 1032 cooperates directly with head set 1122 through a wired or wireless interface. In another implementation, head set 1122 is omitted and hand set 1032 includes a microphone and speaker for use by the author-operator of the hand set and an oriented microphone and oriented camera that are oriented by the author-operator of the hand set.

An on-duty transceiver provides inter-personal communication. An on-duty transceiver may provide coordinated communication among persons working together to collect evidence. An on-duty transceiver may support coordinated communication among persons for surveillance and security, law enforcement, and/or military operations. Communication may be in any suitable conventional form. An on-duty transceiver may provide 2-way half duplex audio communication via radio. In another implementation, an on-duty transceiver provides in addition to radio or in place of radio, full duplex cellular telephone communication. In another implementation, an on-duty transceiver provides audio and or video communication via wireless computer network technologies. For example, on-duty transceiver 1128 includes 2-way half duplex audio communication via radio on dedicated emergency response and police channels.

A personal hub, according to various aspects of the present invention, couples one or more of an on-duty transceiver and a head set to a hand set. A personal hub may cooperate with an on-duty transceiver to provide audio input and output transducers located for convenience near the author-operator's mouth and ears. A personal hub may include a wired interface or a wireless interface to a head set. A personal hub may provide a wired interface or a wireless interface to a hand set. For example, personal hub 1124 provides a wired interface to on-duty transceiver 1128, provides a push-to-talk switch for use with on-duty transceiver 1128, supports a microphone and speaker in the personal hub for use with on-duty transceiver 1128, provides a wired interface to head set 1122, and provides a wireless interface to hand set 1032. In another implementation, personal hub 1124 includes one or more detectors and/or one or more recorders as discussed above with reference to a data source.

A head set, according to various aspects of the present invention, supports an oriented detector for orientation (e.g., movement) by the author-operator to detect from the same direction from which the author-operator's senses detect. A head set for a human author operator and for at least one of audio and/or video detecting is sized for being worn by the author-operator on his or her head. A head set may include, as an oriented detector, a microphone for detecting sound coming toward the author-operator. A head set may include, as an oriented detector, a camera for detecting radiant energy in any suitable channel or spectrum. A head set may include a source of radiant energy and a detector of radiant energy from the source that is reflected back toward the head set. A head set may include a laser for identifying a reference location and/or for use as a designator for focusing data sources and/or targeting weapons. For example, head set 1122 is designed to be worn on a human operator's head. Head set 1122 includes an oriented microphone and an oriented camera for continuously detecting audio and visual (or infrared) information from the direction the operator turns his or her face. Head set 1122 includes an orientation detector for reporting to the hand set absolute or relative changes in orientation of the oriented microphone and oriented camera. Head set 1122 further includes a microphone and a speaker located proximate to the mouth and ear of the human operator for review of recorded information and for determining descriptions of recorded information.

A processor includes any circuitry or subsystem that performs a stored program. A processor may include a dedicated digital signal processor, a microcontroller, a microprocessor, an application specific integrated circuit, logic circuitry, signal conditioning circuitry, communication circuitry, a computer, a radio, a network appliance, combinations thereof in any quantity suitable for accomplishing one or more stored programs. For example, processor 1240 includes a digital signal processor for digitizing audio signals, a microcontroller for supporting video display and user interface controls, a digital signal processor for supporting an ad hoc transceiver, a network controller for supporting a wireless link to personal hub 1124, and a microcomputer with operating system and application software for performing all other functions of hand set 1032. In another implementation, greater signal processing throughput is supported with additional parallel processing circuits and technologies. In another implementation for a different data source application, fewer dedicated circuits are used in favor of one or a few general purpose processing circuits suitable for the throughput of the different detecting and recording functions of the different data source.

A memory includes any semiconductor, magnetic, or optical technology or combination for storing information. All or a portion of memory may be on removable media removed from hand set 1032 for transferring data out of hand set 1032 or for introducing data into hand set 1032 (e.g., software upgrade, addresses for stimulus control, replacement information for any information described with reference to FIG. 13). For example, memory 1241, stores information as described with reference to FIG. 13 using non-removable semiconductor technology. A portion of memory 1241 is maintained in nonvolatile memory to avoid data loss in the event of failure or removal of battery power to handset 1032.

A video monitor provides a display. The display may present legends for controls of a user interface. The display may present video information for review. The display may present video information for determining a description. A video monitor may include a processor or circuitry for supporting the display. A video monitor may employ any display technology suitable for the environment where hand set 1032 is used. For example, video monitor 1242 includes a conventional LCD display that presents video in shades of green for visibility outdoors. In an alternate implementation, video monitor 1242 is included in head set 1122 and the correlation of legends on the display with controls of the user interface does not require the trained user to view his or her hands when operating the controls.

A control, according to various aspects of the present invention, is a part of a user interface that provides input to a processor in response to an action by an operator. A control may be operated as a consequence of any muscle contraction by the operator. A control may be incorporated into clothing worn by the operator (e.g., gloves, sleeves, shoes). A control may provide analog or binary information to a processor. A control may comprise a detector of a binary condition or a detector of an analog condition. A control may include a pointer control. A pointer control provides to the processor an indication of the operator's intent to have a pointer that is superimposed on a presentation of the display move in a particular direction to another point of the presentation. The pointer may be any symbol or icon. Directions may including up, down, left, and right. Directions may further include arbitrary bearings from the current pointer position. A pointer control may further provide to the processor a binary indication of the operator's intent to have the processor "accept" or act with reference to that portion of the presentation that the pointer currently identifies. For example, controls 1243 include a first plurality of multipurpose binary switches arranged along an edge of the display of video monitor 1242 and a conventional pointer control providing to the processor directions including up, down, left, right, and "accept". The switches of controls 1243 are sized and positioned on hand set 1032 for operation by the operator's fingers and/or thumbs. The switches of controls 1243 are also positioned to correlate with legends presented on the display of video monitor 1242. Consequently, the functions of the plurality of switches may be defined and redefined by the processor within any suitable operating context, state, or mode of operation. Controls 1243 may further include dedicated switches (e.g., a switch indicating a time of interest during recording, a switch operated to control the stimulus of any weapon, a switch to toggle recording on/off for author-operator privacy) and dedicated analog controls (e.g. display brightness, audio playback volume).

An ad hoc transceiver supports communication by a candidate for or a member of an ad hoc network. Any suitable communication technologies may be combined to implement an ad hoc transceiver limited to accomplish reliable performance in the presence of sources of noise and an expected number of candidates and members of the ad hoc network. Transmitting by candidates may be subject to garbling due to simultaneous transmissions on the same channel. Coordination of the transmissions of members may be accomplished using any suitable conventional protocol and/or channel assignment technique. An ad hoc transceiver may use any suitable secure communication technology. For example, ad hoc transceiver 1244 provides relatively short range (less than 5000 meters) communication at relatively low power (e.g., less than one milliwatt) in frequency channels between 700 and 1200 MHz. Transmissions by members employ spread spectrum techniques.

An audio in circuit provides audio information to a processor in a suitable signal format. Signal conditioning, analog to digital conversion, sampling, multiplexing, and/or filtering may be accomplished by an audio in circuit. For example, audio in circuit 1245 provides to processor 1240 audio information responsive to analog microphones including hub mike 1224, receiver 1214, head mike 1234, and oriented mike 1235. Conversion to MPEG-4 format may be accomplished by processor 1240 and/or audio in circuit 1245.

An audio out circuit provides audio information from a processor in a signal format suitable for communication and/or for conversion into sound. For example, audio out circuit 1246 in cooperation with processor 1240 converts audio information from MPEG-4 format to analog format for use by a conventional speaker (e.g., a head phone speaker). In another implementation, audio in circuit 1245, processor 1240, and audio out circuit 1246 cooperate to provide audio output for use with conventional noise cancellation technologies implemented at hub speaker 1226 and or head speaker 1236. For example, additional microphones are co-located near speakers to provide additional signals to audio in circuit 1245) and processor 1240 includes noise cancellation processing circuitry and/or software.

A local link transceiver provides point to point communication to one other local link transceiver. A local link transceiver may include multiplexing and demultiplexing for the communication of information of several formats. A local link transceiver may use any suitable secure communication technology. For example local link transceivers 1247 and 1232 cooperate to replace a wired interface between personal hub 1124 and hand set 1032 with a secure wireless interface.

A transceiver includes a transmitter and a receiver. When the transmitter and receiver share one communication channel, the transmitter and receiver cooperate to use one antenna. A transceiver may use any number of channels in sequence (e.g., for spread spectrum communication) or simultaneously (e.g., for acting as a network node performing repeating and routing functions for all messages received whether or not addressed for local processing). Transceivers 1244, 1247, and 1232 include transmitters and receivers. Transmitter 1212 responds to push-to-talk circuit 1222 of personal hub 1124 and transmits information in response to mixer 1228. Receiver 1214 provides audio information to mixer 1230.

As used herein, a signal conveys information. When a functional block is responsive to information, the circuitry implementing the functional block receives a signal that conveys the information and demodulates or otherwise determines the information to perform the function of the block. Receiving may be continuous or discontinuous. Performing the function may occur whenever sufficient information is received.

Components (e.g., hand set 1032, personal hub 1124, head set 1122) of a primary subsystem (e.g., 1108) may each include respective device identification functions. A device identification function may be implemented in any conventional manner to identify the component or primary subsystem to a shift hub as discussed above. The identification may be human readable as well as machine readable. If the component includes a user interface, the device identification may be entered or edited by the operator.

A push-to-talk circuit provides a transmit enable signal to a transmitter. A push-to-talk circuit may include a user interface with a conventional push to talk switch. An operator actuates the push to talk switch to begin transmitting. For example, push to talk circuit 1222 includes a manual binary switch sized and positioned to be operated by one of the author-operator's thumbs. In another implementation, a conventional voice operated switch (VOX) replaces or cooperates with a push to talk switch.

Hub microphone 1224 and hub speaker 1226 pick up the operator's voice and play audio into the operator's ear. Hub microphone 1234 provides an analog signal conveying audio information to mixer 1228 and to local link transceiver 1232. Hub speaker 1226 makes audible sound in response to a signal received from mixer 1230. Hub microphone 1224 and hub speaker 1226 provide redundant functions with head microphone 1234 and head speaker 1236.

Mixer 1228 receives audio information from hub mike 1224, head mike 1234, and oriented mike 1235. In suitable relative volumes among these audio sources and at suitable times based on priority of audio sources, mixer 1228 provides audio information to transmitter 1212.

Mixer 1230 receives audio information from receiver 1214 and audio out circuit 1246 via local link transceivers 1247 and 1232. In suitable relative volumes among these audio sources and at suitable times based on priority of audio sources, mixer 1230 provides audio information to hub speaker 1226.

Head microphone 1234 and head speaker 1236 pick up the operator's voice and play audio into the operator's ear. Head microphone 1234 provides an analog signal conveying audio information to mixer 1228 and to local link transceiver 1232. Head speaker 1236 makes audible sound in response to a signal received from mixer 1230. Due to the location on the operator's head, head microphone 1234 and head speaker 1236 provide more private audio communication with the operator than possible from hub microphone 1224 and hub speaker 1226.

An oriented microphone is moved by the author-operator to receive sound that approaches the operator's face. An oriented camera is moved by the author-operator to capture radiant energy (e.g., ambient or illumination of visible or IR light) that approaches the operator's face. Consequently, as an author-operator performs his or her routine, audio and video information are captured for recording. Oriented mike 1246 may have a relatively narrow field of sensitivity projected in front of the author-operator suitable for capturing speech intended for the author-operator to hear and respond to. Oriented camera 1248 may have a relatively wide field of sensitivity to correspond more closely with the field of view of a human author-operator. Oriented microphone 1246 may be implemented as an omnidirectional microphone or stereo microphone and as such may not be "oriented" in the same manner that oriented camera 1248 is oriented.

An orientation detector provides information regarding the orientation of oriented camera 1237. An orientation detector may further provide information regarding the orientation of oriented microphone 1235. An orientation detector may further provide information as to position of the author-operator (e.g., longitude and latitude coordinates from a global positioning system (GPS) receiver). In other implementations, information as to position is determined for processor 1264 by the location of a GPS receiver (not shown) in on-duty transceiver 1128, personal hub 1124, or hand set 1032. Information regarding position and orientation includes azimuth (e.g., cardinal direction toward which the author-operator is facing) and elevation (e.g., whether the author-operator is facing perpendicular to gravity, looking up to an extent, or looking down to an extent).

Figure 13:
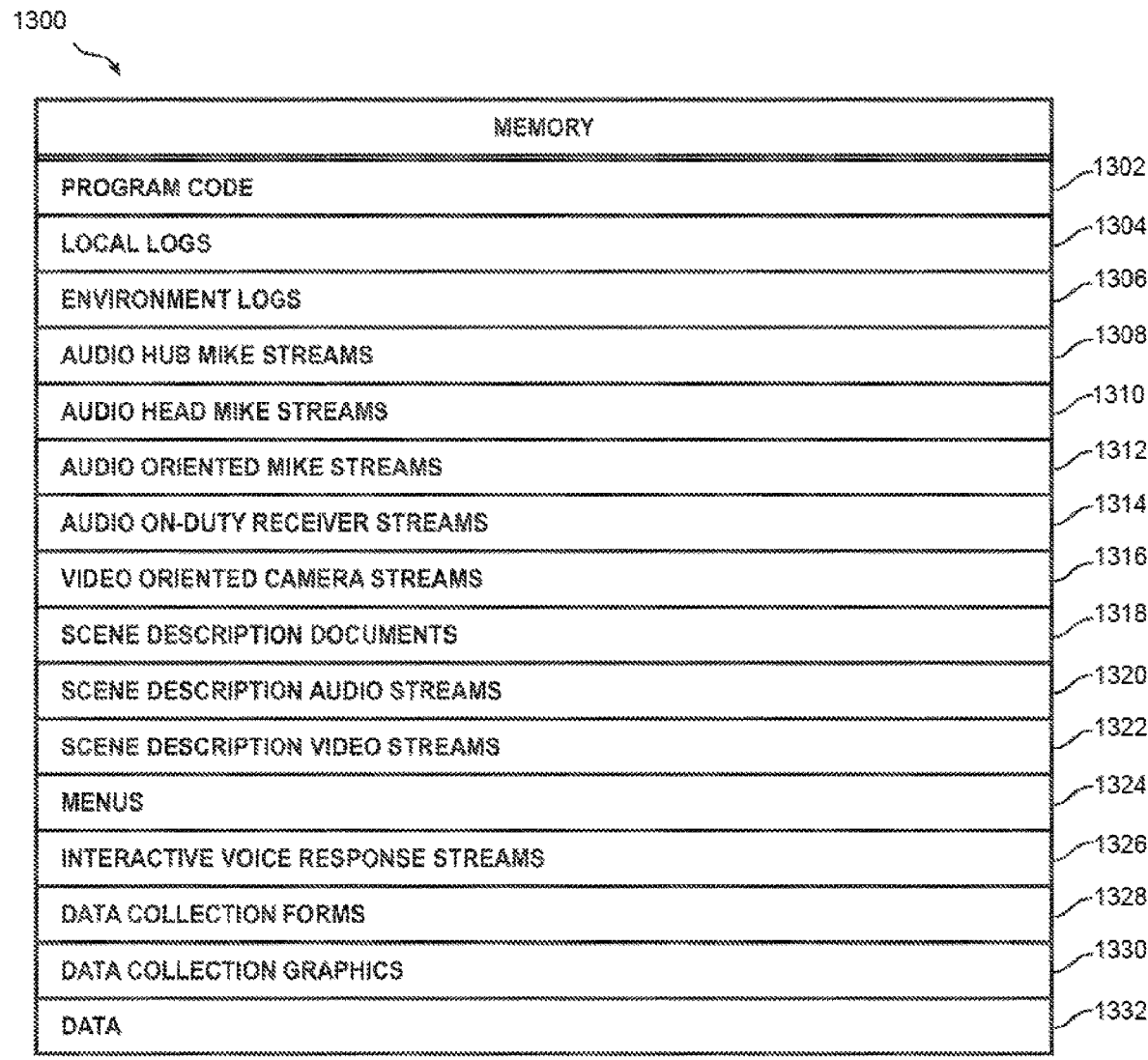
FIG. 13 is a data structure diagram describing the contents of memory in an exemplary implementation of the hand set of FIG. 12A.

Memory 1241 includes data stored in any suitable organization and format. Contents of memory 1241 in one implementation includes data structures 1300 as described below with reference to FIG. 13. Data may be organized for storage in a data structure of any conventional type including value, list, table of records, file, tree, graph, hierarchy of records, or hierarchy of tagged strings consistent with a markup language. Data in any organization and plural organizations may be stored in containers. The description of memory 1241 shown in FIG. 13 is more akin to a functional block description than a data structure or container description. Nonetheless, the data stored in memory 1241 and the manner in which it is accessible by processor 1240 specifies the structure of memory 1241.

Data structures 1300 include program code 1302, local logs 1304, environment logs 1306, audio hub mike streams 1308, audio head mike streams 1310, audio oriented mike streams 1312, audio on-duty receiver streams 1314, video oriented camera streams 1316, scene description documents 1318, scene description audio streams 1320, scene description video streams 1322, menus 424, interactive voice response streams 426, data collection forms 428, data collection graphics 430, and other data 432.

Program code 1302 includes instructions performed by processor 1264 to accomplish any methods and functions ascribed to processor 1240 or hand set 1032. Program code 1302 includes operating systems for processor 1264 and application software. Application software includes software for recording audio and video in MPEG-4 format, software for operating a user interface for the hand set as discussed herein, software for review of recorded information, software for determining revisions in MPEG-4 format, and software for communications. For improved evidence gathering and transfer, application software may further include software for noise cancellation, determination of position of the incident recorder (e.g., global position), identification of the author-operator of the camera (during recording) and the handset (during revising), identification of other parts of the incident recorder (e.g., serial numbers, types, manufacturers), interactive voice response, transcription of speech to text, and 3D modeling for graphic presentations including data collection graphics.

Recorded audio and video may be stored for at least two purposes. A pre-movie buffer may retain continuously recorded audio and video information in a circular buffer (e.g., 60 seconds duration) so that when the operator indicates a time to begin recording a movie (e.g., operation of a control 1243), audio and video from before the operator's indicated time is available, for example, to help explain why the user decided to begin recording the movie. Any number of movies may be recorded, preferably one movie at a time. The end of each movie may be indicated by the operator by operation of any control 1243 or by cooperation with interactive voice response after lapse of a period of time. Controls 1243 may include a dedicated switch for indicating an end of a movie. Menus may permit the user to actuate a general purpose switch to indicate the end of a movie. An incident report may consist of a revised movie. An incident report may comprise a revised movie together with portions of logs, interactive voice response streams, data collection forms or overlays, data collection graphics or overlays whether or not any or all of this information is included in a revised movie. In a preferred implementation, a revised movie includes all relevant information including one or more movies, all scene descriptions, portions of logs, interactive voice response streams, data collection forms or overlays, and data collection graphics or overlays.

Storage of recorded audio or video in a "buffer" as stated herein does not designate a format for storage. In other words, a buffer as used herein may hold any audio or video stream in any format (e.g., an MPEG-4 format). A pre-movie or movie stored in a buffer does not designate a contiguous region of memory. Streams that are part of a pre-movie may be stored in the same or different buffers. Streams that are part of a movie may be stored in the same or different buffers. Streams that are part of a description or of a revised movie may be stored in the same or different buffers. In one implementation a buffer is coextensive with an MPEG-4 container.

A log is a list of records each describing a change and noting the time when the change occurred. Local logs 1304 are updated on the occurrence of a change in the configuration or operation of incident recorder 1108 and hand set 1032. For example, local logs 1304 may include an entry for application of power to hand set 1032, removal of power from hand set 1032, adjustment of a time base used by hand set 1032 (e.g. synchronization of time of day, date), entry and exit from privacy mode (e.g., no recording of audio or video for pre-movie, movie, or revision), and adjusting or establishing parameters that affect recording or revising (e.g., pre-movie buffer length, video resolution for pre-movie and/or movie, IVR script changes, software upgrades).

Environment logs 1306 are updated on the occurrence of a change in the environment where incident recorder 1108 is being used. For example, environment logs 1306 may be updated in response to notice of a candidate beacon message received, a message indicating the incident recorder is part of an ad hoc network, notice of change in membership or substantial change of GPS location of members of an ad hoc network, identification of a weapon proximate to the incident recorder 1108, notice of change in the identity of the author-operator, weapon activation message sent (what address or group address was sent), stimulus control message sent (intended type of electronic control device, control information sent, address or group address it was sent to), directive received for coordinated evidence collection (from what type and identity of device, what directive required of this incident recorder or operator), and notice that reorientation in accordance with a directive was accomplished.

Audio hub mike streams 1308 include buffers for storage of audio for any one or more of pre-movies, movies, scene descriptions, interactive voice response answers by the operator, and revised movies.

Audio head mike streams 1310 include buffers for storage of audio for any one or more of pre-movies, movies, scene descriptions, interactive voice response answers by the operator, and revised movies.

Audio oriented mike streams 1312 include buffers for storage of audio for any one or more of pre-movies, movies, and revised movies.

Audio on-duty receiver streams 1314 include buffers for storage of audio for any one or more of pre-movies, movies, and revised movies.

Video oriented camera streams 1316 include buffers for storage of video for any one or more of pre-movies, movies, and revised movies.

Scene description documents 1318 include buffers for text entry or scanned paperwork for revisions and revised movies.

Scene description audio streams 1320 include buffers for supplemental audio from the author-operator (spoken impromptu or in reply to an interactive voice response script) for revisions and revised movies.

Scene description video streams 1322 include buffers for supplemental video for revisions and revised movies.

Menus 1324 include legends as described below with reference to Table 1.

Interactive voice response (IVR) streams 1326 include audio streams used to prompt the author-operator and streams used to recognize the spoken reply of the author-operator to an IVR prompt.

Data collection forms 1328 include blank forms and filled in forms. Forms include parameter names and storage for the selected value if a selection list of values is part of the form and/or storage for free form values (e.g., audio streams, video streams, transcribed text, text from speech recognition or IVR functions).

Data collection graphics 1330 include blank graphics and marked graphics. Marks may be indicated by operation of any of controls 1270 (e.g., a pointer control) and/or audio streams (e.g., spoken impromptu or in reply to an interactive voice response script).

Data 1332 includes all variables and temporary storage required for the performance of the program code 1302. Data may further include device identification for the component that stores the data structure (e.g., hand set 1032) and/or for the primary subsystem to which it is a part (e.g., 1108) and/or any or all of its components (e.g., personal hub 1124, head set 1122, on-duty transceiver 1128).

A hand set includes any device that facilitates the review and description of recorded audio and/or video. For example, hand set 1032 of FIGS. 10, 11, 12A, and 14 may be implemented as shown in a front view, FIG. 14. As shown, the top side, right side, and bottom side are blank. The rear side includes terminals for connecting a battery charger of shift hub 1020 to the battery that is internal to hand set 1032. Antennas for the ad hoc transceiver and the local link transceiver are not shown. Hand set 1032, as shown, includes both dedicated controls (1432, 1434, and 1436) and general purpose controls (1404, and 1408). The general purpose controls are adjacent a display. All controls are sized an positioned for operation by the author-operator's fingers or thumbs. For example, when hand set 1032 is attached to personal hub 1124 (FIG. 11), only controls 1432, 1434, and 1436 are accessible and operated by the operator's fingers. When hand set 1032 is removed from personal hub 1124, all controls are accessible, sized, and positioned to be operated by the operator's thumbs. The operator's fingers are used to hold and maintain the hand set generally between the operator's palms.

User interface 1400, shows by way of example, a front view of hand set 1032 including an enclosure 1402, display 1406, a column of buttons 1404 along one edge of display 1406, a pointer control 1408, a stimulus control button 1432, a mark button 1434, and a privacy button 1436. Display 1406 is shown providing a presentation of legends 1412, a presentation of data collection graphics 1422, and a presentation of original video 1424 in a picture-in-picture (PIP) format of a scene presently being described by the author-operator.

Enclosure 1402 comprises high impact plastic. Enclosure 1402 may be water resistant to protect all functions of hand set 1032 from damage during rainy weather or accidental submersion. Enclosure 1402 may be water resistant for incident recording under water.

Display 1406 is part of video monitor, discussed above.

The column of buttons 1404 along one edge of display 1406 provides controls for a multi-purpose user interface. Each legend 1412 (five legends shown) describes the present function for the respective button. Legends may be organized in hierarchical menus.

Pointer control 1408 facilitates entry of cursor directions up, down, right, and left. A center "accept" function is also provided. The pointer control may rock slightly about its center in a conventional manner.

A stimulus control button 1432 allows the operator to initiate or modify a stimulus control function of an electronic control device (or any function of a suitable data source or weapon) that is addressable and within communication range (e.g., within range of ad hoc transceiver).

When recording a pre-movie, operation of mark button 1434 allows the operator to begin recording a movie. The resolution of audio and/or video recording may be changed to correspond to the configuration for movie recording (e.g., preferably a higher resolution than pre-movie recording). When recording a movie, operation of mark button 1424 designates a time (e.g., the present time of day) as a time when a description may be added upon review of the movie. During recording, hand set 1032 may log the operation of button 1434 (e.g., in a general or special purpose log of local logs 1304). Each operation of button 1434 during recording a movie is herein referred to as making a mark, recording a mark, or designating a scene for review or description. During review of a movie, a list of logged times when button 1434 was actuated may be used (e.g., in a manner analogous to hypertext links) to quickly navigate to respective scenes. The log may also track whether or not a description has been made for each recorded mark. During review of a movie, a list of recorded marks without descriptions may be presented to assist in completing a revision. During review of a movie, a list of recorded marks with descriptions may be presented to assist in reviewing descriptions.

A privacy button 1436 stops audio and video recording. When actuated by the user during pre-movie recording, actuation stops pre-movie recording. When actuated during movie recording, actuation stops movie and pre-movie recording.

Figure 14:
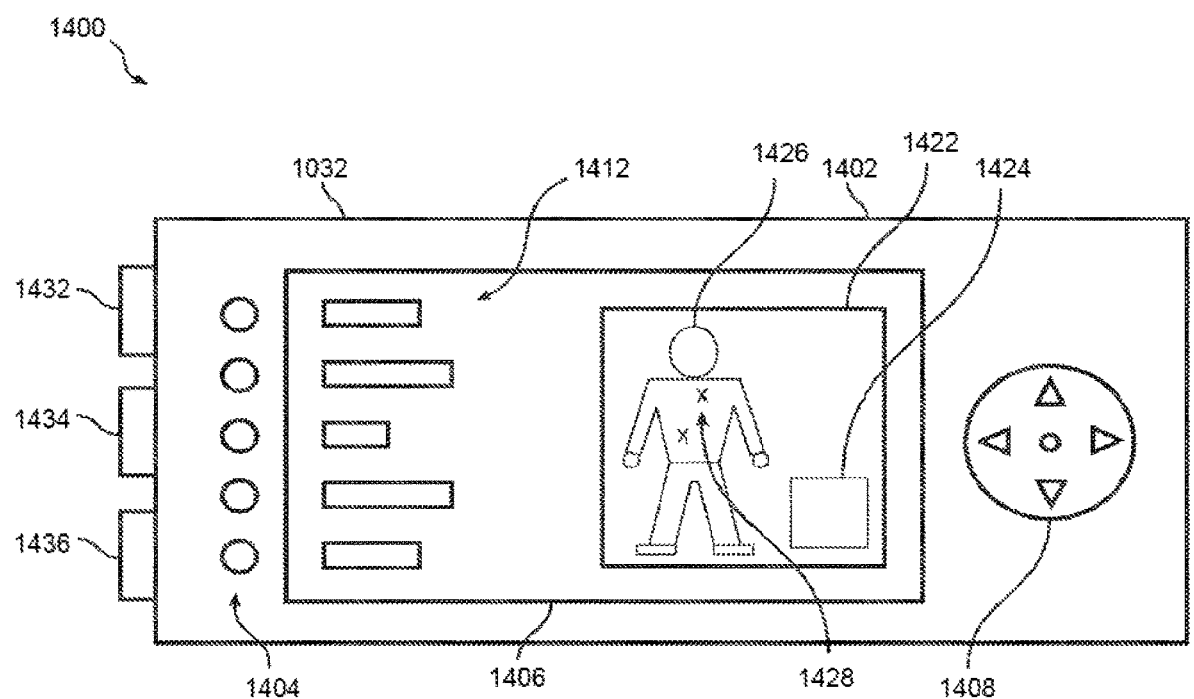
FIG. 14 is a diagram of a user interface having controls and a display in an exemplary implementation of the hand set of FIG. 12A.

The picture-in-picture format may be used to review and combination of two video streams of the same or different types discussed with reference to FIG. 13. As shown in FIG. 14, a scene (1424) is being described by entries of cursor locations on a data collection graphic 1422. Data collection graphic 1422 portrays a human front view for collecting a description of where on the suspect (1102) the electronic weapon's tethered darts made impact (1112, and 1114). Although this information may be clearly visible from the video, making an entry on a form may facilitate statistical analysis. The author-operator may operate pointer control 1408 to locate the cursor over a point of graphic 1422 that corresponds to a contact point (e.g., 1112) and actuate the "accept" function of pointer control 1408, as discussed above. The author-operator may repeat this step for the second contact point (e.g., 1114). Completion of data collection with reference to graphic 1422 may be indicated by operator actuation of a suitable button 1404 in accordance with its legend (see menus discussed below with reference to Table 1).

Figure 15:
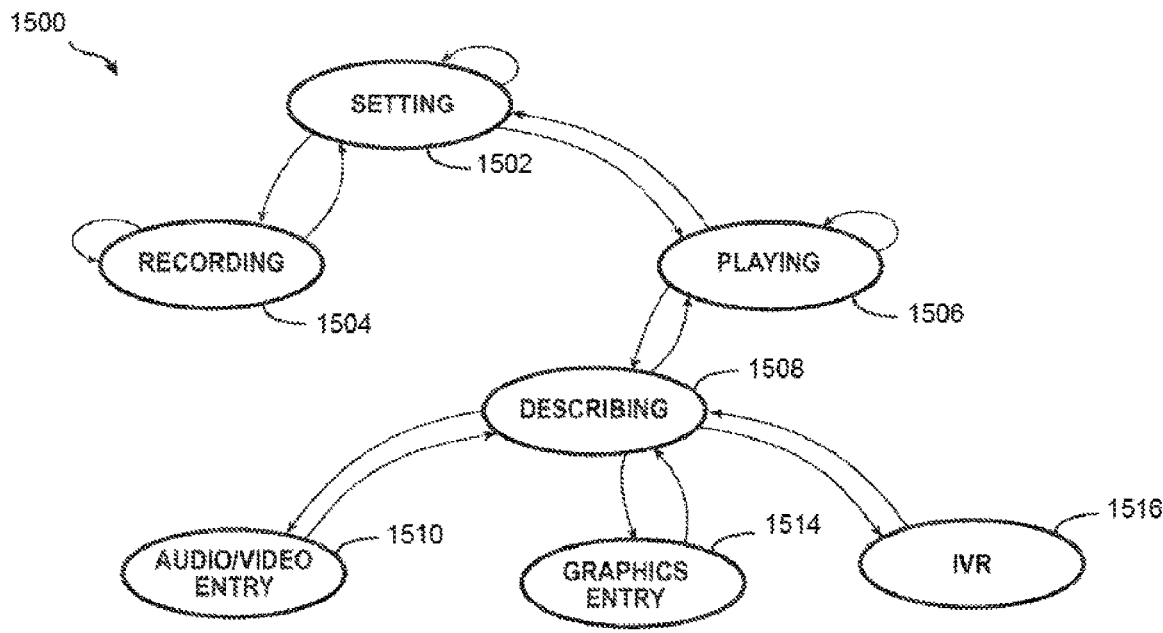
FIG. 15 is a state change diagram of states of the user interface of FIG. 14.

FIG. 15 is a state change diagram of states that define a user interface in an implementation of hand set 1032 of FIGS. 10, 11, 12 and 14. States include setting state 1502, recording state 1504, playing state 1506, describing state 1508, audio/video entry state 1510, graphics entry state 1514, and interactive voice response state 1516. Operation continues in a state until all conditions are met for a state change. Table 1 describes legends and a next state entered after operation of a switch corresponding to a legend. The numbered legends in Table 1 correspond to the column of switches 1404 of FIG. 14 numbered from top to bottom. Not all switches are used in each state.

TABLE 1

| State | Legends | Next State |
| --- | --- | --- |
| Setting | 1 Record | 1 Recording |
| | 2 Play | 2 Playing |
| | 3 Device | 3 Setting |
| | 4 Personal | 4 Setting |
| | 5 Agency | 5 Setting |
| Recording | 1 Privacy Toggle | 1 Setting |
| | 2 Monitor Toggle | 2 Recording |
| | 3 Setting | 3 Setting |

TABLE 1-continued

| State | Legends | Next State |
|---|---|---|
| Playing | 1 Rate/Skip | 1 Playing |
| | 2 Raw/Described | 2 Playing |
| | 3 Mark | 3 Describing |
| | 4 Setting | 4 Setting |
| Describing | 1 Add Graphic | 1 Graphic Entry |
| | 2 Add Audio/Video | 2 Audio/Video Entry |
| | 3 Add IVR | 3 IVR |
| | 4 Play | 4 Playing |
| Graphics Entry | N/A | Describing |
| Audio/Video Entry | N/A | Describing |
| IVR | N/A | Describing |

Table 2 describes the functions of the pointer control 1408 in each state. In Recording state 1504, the pointer control has no functions unless recording is being monitored. In Playing state 1506, the functions of the pointer control depend on whether a movie is being played without descriptions (raw) or with descriptions (described).

TABLE 2

| State | Pointer Control Functions | |
|---|---|---|
| Setting | ↑ Highlight parameter row above present row | |
| | ↓ Highlight parameter row below present row | |
| | → Highlight alternative right of present, or scroll to increasing values | |
| | ← Highlight alternative left of present, or scroll to decreasing values | |
| | ● Accept newly specified entry | |
| Recording | If monitoring on the display of live recording is enabled: | |
| | ↑ Increase brightness of display | |
| | ↓ Decrease brightness of display | |
| | → Increase volume | |
| | ← monitor decrease volume | |
| | ● n/a | |
| Playing | Rate | Skip |
| | ↑ Faster | First Mark |
| | ↓ Slower | Last Mark |
| | → Forward | Next Mark |
| | ← Reverse | Previous Mark |
| | ● Pause Toggle | Pause Toggle |
| Describing | N/A | |
| Graphic Entry | ↑ Move cursor up | |
| | ↓ Move cursor down | |
| | → Move cursor right | |
| | ← Move cursor left | |
| | ● Accept Position | |
| Audio/Video Entry | N/A | |
| IVR | N/A | |

All states are available when the hand set is removed from personal hub 1124. Operation begins in Setting state 1502 when power is initially applied to hand set 1032. Unless not permitted by the Privacy function, pre-movie recording begins or continues in Setting state 1502 whether or not hand set 1032 is attached to personal hub 1124. In response to operation of mark button 1432, pre-movie recording is stopped and movie recording is started. Depending on memory size and intended use of hand set 1032, recording of a movie preferably continues for several hours (e.g., 4 hours). During movie recording, marks are recorded to simplify later making revisions. After movie recording is stopped, review and revisions may be made.

In Setting state 1502, 5 legends identify 5 submenus for setting the configuration of hand set 1032. See Table 3 for a description of the submenus that apply in the settings state. In each submenu, a presentation of a list of parameters is displayed. A parameter to set is listed on a row of the display.

The current setting for alternative values may be highlighted; and the current value for numeric and date values may be shown. For a new alternative value, the desired alternative may be highlighted and "accepted" by operation of pointer control 1408 as described for Setting state 1502 in Table 2. For a new numeric or date value, pointer control 1408 may be used to "scroll" to an appropriate value. An IVR script may be used to specify a desired value. The IVR script may be accompanied a presentation of written alternatives. After specification of a value for a Setting submenu of Table 3, the Setting main menu of Table 1 is again presented.

TABLE 3

| Setting State Submenu | Parameter | Alternative Values |
|---|---|---|
| Record | Mode | A/V, V Only, A Only, Privacy |
| | Resolution | Limited, Full |
| | Monitor | A/V, V Only, A Only, None |
| Playback | Date | Jan. 1, 2008 |
| | Time | 21:35:02 |
| | Content | Raw, Described |
| Device | Volume | 4 |
| | Brightness | 5 |
| | Ad Hoc Channel | A, B, C, D, E |
| | Ad Hoc Power | Off, Limited, Full |
| | Roles | Lead only, Lead and Follow, Follow only, None |
| Personal | Name | (Agency List) |
| | Voice Sample | Jan 30, 2008, New |
| | Photo Sample | Jan 30, 2008, New |
| Agency | Movie duration | Full Shift, Limited Shift |
| | Pre-movie | Video & Audio, Video Only Stimulus Ctrl1 Group-Address1 Stimulus Ctrl2 Unit-Address1 |
| | Stimulus Devices | Projectiles, Cuffs, Clothing |

In the Record submenu, recording can be audio and video, or limited to video only, or audio only. Video resolution may be set to a standard resolution (full) or a prescribed lower resolution (limited) for conserving memory in hand set 1032. Display 1406 may be actively monitoring the oriented camera or blank. Audio output may monitor the oriented microphone or be silent.

In the Playback submenu, content of the playback may be selected as the original movie (raw) or the latest revised movie (described). During the playback of a revised movie, playback stops at each recorded mark and the description, if any, is played. When playback of the description is finished, the movie plays until the next recorded mark. During playback audio information is composed to produce sound on head speaker 1244 and hub speaker 1226 while video information is composed to produce a presentation on display 1406.

In the Device submenu, channels and power level for communication (via ad hoc transceiver) may be specified. Hand set 1032 may be authorized to accept and delegate support tasks (lead), accept support tasks (follow), or neither accept nor delegate support tasks. Support tasks may relate to tactics (e.g., act as an actuator for stimulus control), communication (e.g., serve as ad hoc network node with routing capability), and/or evidence (e.g., directives to reorient the oriented microphone or oriented camera for additional evidence gathering for an incident in process or prior to an action regarding an incident).

In the Personal submenu, audio and video recordings made by author-operator of himself or herself may be made. To avoid text entry errors, the correct spelling of all possible users names may be provided as a list from which the operator selects his or her own name.

In the Agency submenu, the amount of recording may be limited to less than an 8 hour period as desired. By limiting the recording, additional memory may be available for descriptions and revisions. Pre-movie recording may omit audio recording. For tactical tasks (e.g., stimulus control), addresses may be specified as unit addresses (e.g., a list or range or list of ranges) used for example for reactivating a single round electrified projectile. Further, addresses may be specified as group addresses used for example for reactivating any round having an address within the group.

An electronic control device (e.g., an electrified projectile) may have any number of addresses for particular stimulus control functions. For example, an electrified projectile may have only one stimulus control function, that is to reactivate the stimulus to restrain the suspect after an initial stimulus duration has lapsed. Other stimulus control functions may include specifying any parameter of the stimulus signal (e.g., charge per pulse, pulse repetition rate, pulses per pulse group, pulse duration, energy available per pulse, pulse amplitude). For example, a single round electrified projectile may have a group address (e.g., 1010) and a unit address e.g., (265). The group address may be applied to all projectiles used by a particular agency. The unit address may fall within the definition of a group address when the group address is understood to indicate a range (e.g., group address 200 includes all unit addresses between 201 and 299, including 265).

In Recording state 1504, pre-movie recording stops and movie recording begins. The transition from setting state 1502 to recording state 1504 may be accomplished by operation of a dedicated control (e.g., 1434). In one implementation, exit from recording state 1504 to return to setting state 1502 is responsive to the operator holding a dedicated control for at least a minimum duration (e.g., 1434 for 3 seconds). In Recording state 1504 the display may be active, static, or blank. If the Privacy function is active, display 1406 presents a static banner (e.g., "Privacy"). If the Privacy function is not active and the Monitoring function is active, then display 1406 presents a live video oriented camera stream 1316. If the Privacy function is not active and the Monitoring function is not active, display 1406 is blank.

In Recording state 1504, the Privacy Toggle functions like the privacy button 1436. The Monitor Toggle function may be used to activate the display and at least one speaker for a live presentation of the movie being recorded.

Prior to transition to playing state 1506, a presentation of a list of movies and revised movies (e.g., identified by start time and date) may be offered to the operator for selection. The list and its controls may be similar to parameters listed in Setting mode 1502, as described with reference to Table 2. While in Playing state 1506, a transition to Describing state 1508 may be made by operation of Mark button 1434. The Rate/Skip function allows operator control of playback speed and direction using pointer control 1408 with one of two sets of capabilities. In Skip mode, control of playback using pointer control 1408 refers to recorded marks. In Rate mode, control of playback does not refer to recorded marks. The Raw/Described function specifies whether the playback ignores descriptions (raw mode) or stops at each recorded mark and plays the description (descripted mode). When playing with descriptions, the presentation on display 1406 may include a thumbnail of the scene being described in a picture-in-picture format while playing the description. Other information along the top and bottom edges of the display may include any of the following: location (e.g., GPS) of the incident recorder when the recording was made, orientation described by the orientation detector 350 (e.g., azimuth and elevation), whether a description is available for the scene being played (e.g., only in raw mode), the date and time of day when the recording was made or when the description was made, the time of the presently playing scene with reference to duration of the entire movie or revised movie. During a playback (raw or described) the Mark function allows the operator to immediately transition to Describing state 1508 to enter a new description whether or not a recorded mark exists at this time in the movie.

In Describing state 1508, a recorded mark is made in association with the present scene identified for description. Three functions are available for adding three types of descriptions: graphics, audio and/or video recording, and a guided discussion involving an Interactive Voice Response script. During entry of a description, a thumbnail of the scene being described may be shown on the display in a picture-in-picture format. The Add Graphic function transitions to Graphics Entry state 1514 where, after selection of a suitable data collection graphic 430, the author-operator may mark the graphic form and add it to the revised movie in association with the recorded mark or identified scene. The Add Audio/Video function transitions to Audio/Video Entry state 1510 where recording from oriented camera and head microphone begins immediately. The recorded information is added to the revised movie in association with the recorded mark or identified to the scene. The Add IVR function transitions to IVR state 1516 where an IVR script is begun to gather audio information from the author-operator. A PIP presentation may in addition present written prompts during the IVR script.

Legends may be presented beside the movie or PIP presentation. In another implementation, the entire display area is used for the movie or PIP presentation.

An incident recorder, according to various aspects of the present invention, may periodically transmit its unique communication address and its location (e.g., GPS coordinates). For example, when an incident recorder as discussed above is configured to Lead it responds to other incident recorders that have locations proximate to a location of interest. A location of interest may be a location of an electronic control device (e.g., 1270) that is subject to addressable stimulus control. A location of interest may be a location of a human or animal (herein called a target) (e.g., 1610) planned to be hit by such an electronic control device (e.g., a wireless electrified projectile).

The Lead incident recorder may request any of several support tasks be accepted by other subsystems configured to Follow. Tactical support tasks may be requested. Tactical support tasks may include any task related to apprehension of a suspect. Tactical support tasks may include transmitting a stimulus control signal to an electronic control device that is capable of addressable stimulus control. Communication support tasks may be requested. Communication support tasks may include any tasks for enhancing communication in an ad hoc network (e.g., accepting new members into the network, routing traffic to or through nodes of the network, discovering routes, informing other nodes of members and appropriate routes, extending the range of the network). Collection support tasks may be requested. Collection support tasks may include any directives for operation of an incident recorder. For example, asking a Follower to turn and record a movie facing the likely location of a suspect. Assistance with gathering evidence may be facilitated.

Assistance with stimulus control may be facilitated. Assistance with communication among incident recorders may be facilitated.

A subsystem suitable for performing a Follow role as to addressable stimulus control, is herein called an activator. An activator may comprise a hand set (though memory for software for recording may be omitted with commensurate simplifications of processor and local link transceiver); a head set (though an oriented mike, oriented camera, and orientation detector may be omitted); a personal hub (though support for omitted functions of the hand set and head set may be omitted); and an on-duty transceiver. These components, except for omitted functions, may include the structures and functions as discussed above. For example, activator 1260 of FIG. 12B includes processor 1261, memory 1262, video monitor 1263, controls 1264, ad hoc transceiver 1265, and wired interface 1266. Processor 1261 is analogous to processor 1240 with commensurate simplifications due to the reduced set of functions and the special functions of an activator as compared to a hand set. Memory 1262 may include the data structures 1300 discussed above with simplifications commensurate with the functions of processor 1261. Video monitor 1263 and controls 1264 may be simplified in comparison to counterparts in hand set 1032 when operation with a video camera is not required. The menus for the user interface (1263, 1264) of an activator may be simplified in accordance with the functions of processor 1261. Ad hoc transceiver 1265 is compatible with ad hoc communications discussed above with shift hub 1020, handset 1032 and ECD 1270. Wired interface 1266 facilitates docking in docks 1026 but may be omitted when ad hoc transceiver 1265 performs necessary configuration (e.g., addresses) and data transfer functions (e.g., logs).

An electronic control device includes any apparatus having a circuit for electrical stimulation as discussed above. A primary subsystem may consist of an ECD. An ECD may be packaged as a hand gun (launching projectiles as in FIG. 11), stun baton, or wireless electrified projectile (propelled from a launcher as in FIG. 16). One or more ECD circuits may be packaged as a mine, grenade, check-point turret, or an area denial installation. One or more ECD circuits may be incorporated into clothing, hand cuffs, shackles, shields, or nets. For example, ECD 1270 of FIG. 12C includes processor 1271, memory 1272, transceiver 1273, stimulus generator 1274, deployment unit 1275, and wired interface 1276. These functions are described in the US patents incorporated herein by reference.

Transceiver 1273 is a reduced capability transceiver when all the functions of an ad hoc transceiver are not required. Transceiver 1273 may be replaced by a receiver when no transmit functions are desired.

Wired interface 1276 may be omitted when not required for writing an address into the ECD and recharging an internal battery.

Deployment unit 1275 may deploy probes (as in ECD 1110 or as in projectile electrode deployment). Deployment unit 1275 may propel wire tethered probes (not shown) from the ECD (e.g., ECD is a launcher), or deploy electrodes (not shown) into position for contacting a target (e.g., ECD itself is a wireless electrified projectile). Deployment unit 1275 may be omitted for example if the ECD itself is launched by an external propellant toward the target and no further deployment of electrodes is needed.

In shift hub 1020, hand set 1032, activator 1260, and ECD 1270, the ad hoc transceiver, memory, and processor may cooperate according to applicable commands of Table 4. Transmitting may include transmitting an address for further communication. Transmitting may include transmitting an acknowledgement and/or reply to a command received. Receiving may include receiving and taking suitable action. SS stands for secondary subsystem and includes shift hubs (SH) (e.g., 1020) and locker docks (LD). PS stands for primary subsystem and includes incident recorders (INR) (e.g., 1108), activators (AVR) (e.g., 1260), and electronic control devices (ECD) (e.g., 1270).

TABLE 4

| Sources of Command –> Command description | Receivers of Command :: Effect |
|---|---|
| SS, INR –> Begin beacon of identification. Beacon timing may be specified. | PS :: begins transmitting its unique address to be used in further communication and its location (if available) |
| SS –> Synchronize time base. Current or future time may be specified. | PS :: sets its date and time of day time base (e.g., used for logs) |
| SS, INR –> Stop beacon of identification. Quiet period may be specified. | PS :: transmits no beacon messages during a default period of the specified period. |
| SS, LD, INR –> Report configuration. | PS :: transmits its make, model number, location, identification, and the same for its components; ECD :: may further transmit its capabilities (e.g., loaded, safety off, battery capacity, number of rounds remaining, number of rounds launched, history of stimulations) and configuration settings (e.g., electrical stimulus charge, energy, timing). INR :: may further transmit its capabilities (e.g., storage space available for further recording) and its orientation. |
| SS, PS –> Change configuration as specified. | ECD adjusts any parameter of the stimulation current (e.g., pulse width, pulse repetition rate, amplitude, charge per pulse). |
| AVR –> Control stimulation. Launch, Start, Stop, and/or Repeat may be commanded. Any stimulation circuit parameter or output signal parameter may be affected. The parameter to | ECD :: performs the command immediately but within its capabilities. For example, a launch command is more suitable for a launcher than for the |

TABLE 4-continued

| Sources of Command -> Command description | Receivers of Command :: Effect |
|---|---|
| affect and the new value may be specified. Start/Stop/Repeat magnitudes and timing may be specified. | projectile being launched. If the ECD in addition has a manual trigger, the Start function may enable operation of the electrical stimulation circuit in response to a next operation of the trigger (e.g., by an operator or by the target). |
| SS -> Accept new identification. Deletion of prior identification may also be commanded. | PS :: accepts and stores a group address or unique address for use in future receiving and/or transmitting. |
| SS -> Transfer an incident report. Date and time identifying the report may be specified. | PS :: transmits its log of events; INR :: further transmits stored incident information as a created and/or revised incident report. |
| PS -> New incident identifier. May specify start time and location of the suspect. May specify start time in the past. May indicate incident has not yet started. | PS :: transmits an acknowledgement and associates the new incident identifier with the current or next incident. |
| PS -> Reorient to face new location, elevation. May specify azimuth if receiver's location is known and receiver cannot determine new location. May specify time when action must be completed. | INR :: notifies operator to orient toward new location (or azimuth) and elevation. |
| PS -> transmit at a particular time for purposes of determining distance from commanding PS to responding PS (range). | PS :: transmits at designated time enabling time of flight ranging, triangulation ranging when one subsystem is moving with respect to another, and/or triangulation ranging by two subsystems near an ECD. |
| SS, PS -> Enable/Disable stimulation capability | ECD :: for an operator triggered ECD (e.g., hand gun, grenade, area denial system), when enabled, an operator pulling the trigger will activate a launch projectiles and/or start of electrical stimulus; for a target triggered ECD (e.g., cuffs, clothing, mine, area denial system), the trigger operated by the target is effective to launch projectiles and/or start an electrical stimulus. |

Figure 16:
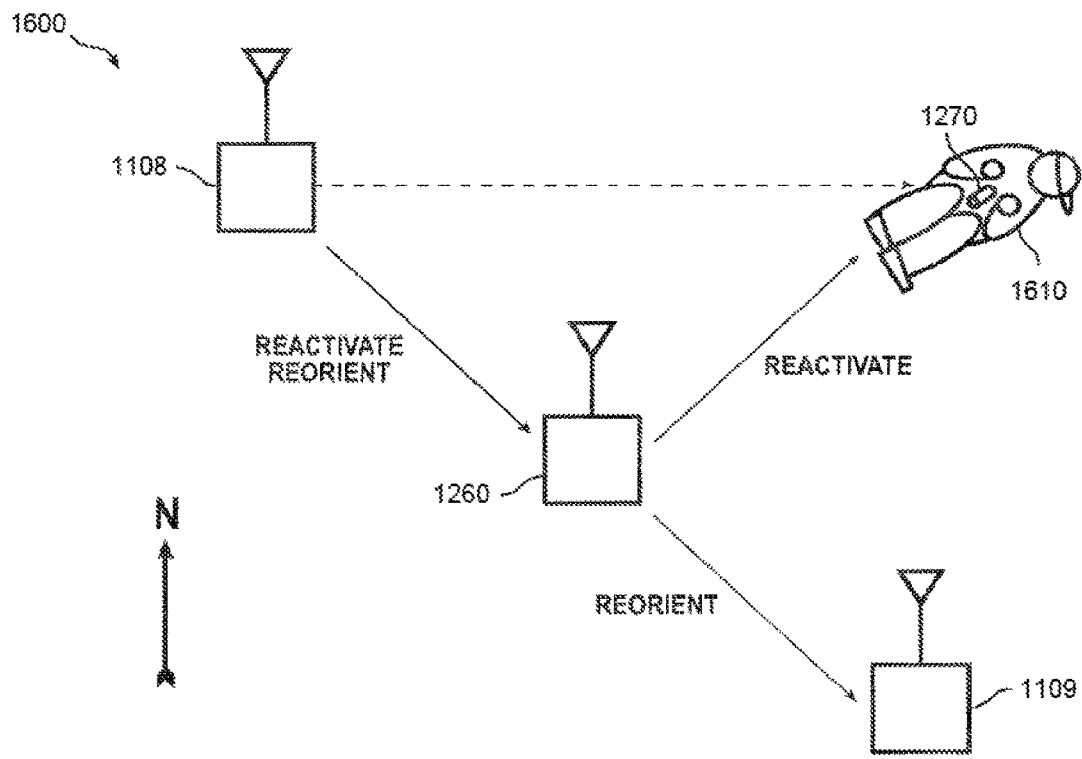
FIG. 16 is a plan view of another hypothetical incident involving three law enforcement officers apprehending a suspect while each officer operates a primary subsystem and the suspect comes in contact with a primary subsystem of a system for collecting and managing evidence, according to various aspects of the present invention.

FIG. 16 is a plan view of another hypothetical incident involving three law enforcement officers apprehending a suspect while each officer is operating a respective primary subsystem of the present invention. These subsystems are being worn by officers at different locations. Subsystem 1108 is northwest of subsystem 1260, which is northwest of subsystem 1109. Suspect 1610 will be hit by a wireless electrified projectile type ECD 1270 both being northeast of subsystem 1260. An exemplary sequence of communication among subsystems 1108, 1260, 1109, and projectile 1270 is described in FIG. 17.

In incident 1600, incident recorder 1108 is configured to Lead, activator 1260 is configured to Follow. And, incident recorder 1109 is configured to Follow. For simplicity of this discussion, the roles Lead, Lead and Follow, and Follow are general as to all authorizations related to stimulus control, and all directives as to evidence gathering and communication. In another implementation, these roles may be further limited to particular functions in each of the categories of stimulus control, evidence gathering, and communication. Configuration may also be expanded to permit several roles of any type to be set for a single incident recorder as may be suitable for a particular expected security, law enforcement, or military incident.

Communications between incident recorders, activators, and electronic control devices for stimulus control functions may be accomplished with one ad hoc transceiver in each subsystem. In another implementation, different transceivers are used for different communication links. Use of one ad hoc transceiver is appropriate where all communication uses one communication channel and protocol. If greater communication capabilities are required by the expected environment in which communication is to be reliable, different channels may be used and different transceivers may be used for each type of device: incident recorder, activator, electronic control device.

Figure 17:
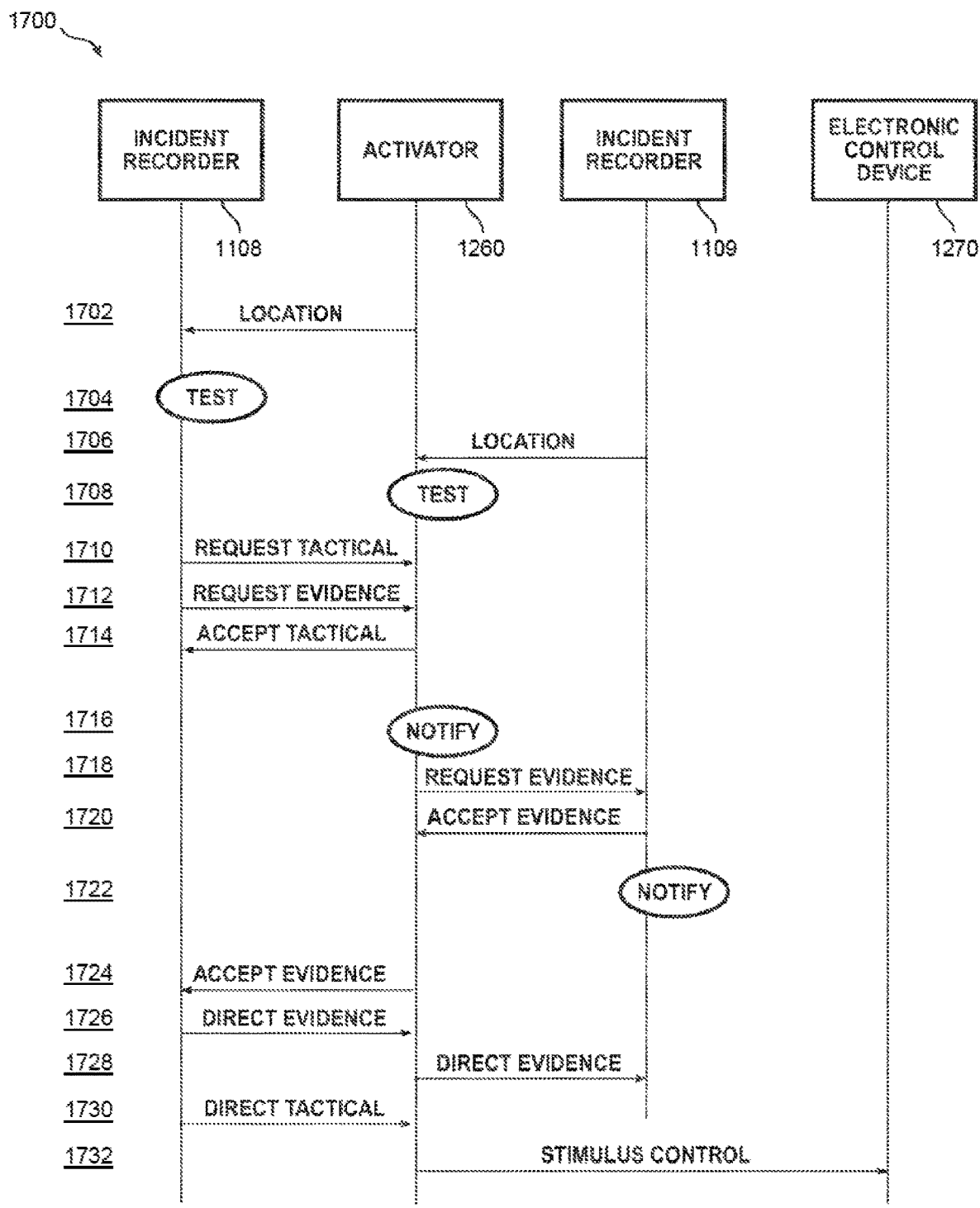
FIG. 17 is a communication sequence diagram for communication, according to various aspects of the present invention, between the primary subsystems of FIG. 16.

The sequence 1700 of communications described in FIG. 17 accomplishes communication support, tactical support, and recording support in an exemplary implementation applied to a hypothetical incident.

At time 1702 activator 1260 of its own initiative transmits its location and unique address omnidirectionally (e.g., a beacon) or fortuitously in the direction of incident recorder 1108. For example, activator 1260 may transmit periodically in a sequence of directions. The period may be random to reduce interference from other beacon broadcasts. At time 1702 incident recorder 1108 receives the transmission from activator 1260. In another implementation, activator 1260 further transmits its configuration (e.g., an activator make T, model xyz) according to a known list of types of systems that communicate for any of the purposes described above.

At time 1704 incident recorder 1108 tests the proximity of activator 1260 to a suspect 1610. The location of suspect 1610 was determined by incident recorder 1108 by using a measure of azimuth and range finding as discussed above. The location of activator 1260 is apparent from the message received from activator 1260. The test passes because the distance between activator 1260 and suspect 1610 is less than a limit (e.g., closer than incident recorder 1108 is to suspect 1610).

At time 1706 incident recorder 1109 transmits its location, unique address and may also transmit its configuration in a manner analogous to the message at time 1702. At time 1706 activator 1260 receives the transmission from incident recorder 1109.

At time 1708 activator 1260 tests the proximity of itself to incident recorder 1109 in a manner analogous to the proximity test at time 1702. The test passes.

At time 1710 incident recorder 1108 transmits a tactical support request addressed to activator 1260 that authorizes an addressable stimulus control to be initiated by the operator of activator 1260 for an address of electronic control device (e.g., the projectile 1270) having a reactivate capability and having a matching address. The address for ECD 1270 may be a unique address or may be a group address (e.g., all ECDs checked-out to the operator of incident recorder 1108, all ECDs echecked-out to a team, all ECDs checked-out on a particular date, all ECDs of a particular configuration). The location of suspect 1610 is included with the request. The fact that the projectile has not yet been launched is included with the request.

At time 1712 incident recorder 1108 transmits a recording support request that asks for assistance for gathering evidence. The request is addressed to activator 1260. Both requests at time 1710 and time 1712 may be accompanied by information for activator 1260 to determine whether accepting these tasks is within its available resources.

At time 1714 activator 1260 transmits an acceptance of the delegated tactical task received at time 1710.

At time 1716 activator 1260 notifies its operator that he or she is authorized to reactivate a stimulus function for a projectile at the location of the suspect 1610. The notice includes the fact of authorization implied from the receipt of a valid address for activator 1260. The notice further includes identification of a particular type of stimulus control (reactivation) for a particular type of electronic control device (projectile) derived from the request. The notice still further includes the azimuth to the projectile derived from the position of the projectile provided in the request. The operator now knows that a user interface control (e.g., button 1432) is enabled to perform the reactivation whenever he or she deems reactivation is necessary. The notice may be made by synthesized voice delivered to a speaker (e.g., head speaker 1244) or by a presentation on a display (e.g., 1406) accompanied by an alert to review the display for a message.

At time 1718 activator 1260 transmits a recording support request addressed to incident recorder 1109 that asks for a reorientation of the incident recorder toward location 1610.

At time 1720 incident recorder 1109 transmits an acceptance of the recording support task. The transmission is addressed to activator 1260.

At time 1722 incident recorder 1109 notifies its operator to be ready to turn his or her oriented microphone and oriented camera. In another implementation, the operator of incident recorder 1109 is notified and must approve the request before the task is accepted.

At time 1724 activator 1260 transmits an acceptance of the recording support task. The transmission is addressed to incident recorder 1108.

At time 1726 incident recorder 1108 addresses a transmission to activator 1260 with information intended for incident recorder 1109 with respect to the recording support task at time 1712. Incident recorder 1109 may be out of range from incident recorder 1108.

At time 1728, in response, activator 1260 addresses a transmission to incident recorder 1109 and transmits (e.g., forwards) a copy of the information activator 1260 just received. By forwarding the information, activator 1260 is performing a communication support task. Other communication support tasks (e.g., to become a master of the network for purposes of creating and managing a routing table for supporting central review of multiple video streams) may be requested, evaluated as to sufficiency of resources to accomplish the task, and accepted using similar request/accept communications not shown. On receiving the forwarded information, incident recorder 1109 notifies its operator to reorient according to the forwarded information, that is toward location 1610. An audible and/or visible indication of the present orientation error measured between present orientation and desired orientation may be generated (e.g., by the parts of incident recorder 1109 corresponding to orientation detector 1238, transceivers 1232, 1247, processor 1240, audio out circuit 1246, mixer 1230 and head speaker 1236) and continued until null. The audible and/or visible indication of error may vary (e.g., pitch, pulse rate, color, brightness) with efforts to reorient until proper orientation is achieved.

At time 1730 the operator of incident recorder 1108 also operates a launcher that launches ECD 1270 (a wireless electrified projectile) toward target 1610. Projectile 1270 hits target 1610 and begins a 30-second cycle that includes electrical stimulation that interferes with the skeletal muscles of target 1610. Target 1610's ambulation is stopped because all skeletal muscles in his or her legs contract continuously for the 30-second cycle. Incident recorder 1108 may also address a transmission to activator 1260 with information supporting the tactical task that was delegated and accepted. This message may be omitted if all necessary information was already transmitted with the request.

At time 1732 the operator of activator 1260 decides, according to his or her training and judgment, to reactivate the electrical stimulus generating function of ECD 1270. Reactivating may provide the operator of activator 1260 sufficient time to arrive at the suspect's location and complete an arrest (e.g., place hand cuffs (not shown) on the suspect). This operator actuates a control 1264 of the user interface of activator 1260 (e.g., analogous to button 1432 of hand set 1032). In response to actuation, activator 1260 addresses a transmission to ECD 1270 and transmits a stimulus control command.

At time 1732, ECD 1270 reactivates its signal generator 1274. The effect of reactivating may extend the 30-second cycle for an additional 30 seconds (e.g., stretch it up to 59 seconds), or schedule a break between cycles (e.g., 3 seconds) and then perform a second 30-second cycle similar in all respects to the first 30-second cycle. In another implementation, reactivation results in an adjusted electrical stimulus current that may be in accordance with information transmitted from incident recorder 1108 at time 1730.

The following patents and patent applications are incorporated herein by this reference in their entirety for any purpose without being limited by the context of this statement.

TABLE 5

| Patent or Patent Application Title | Status | Ser. No. |
|---|---|---|
| Less Lethal Weapons and Methods for Halting Locomotion | Issued | 10/673,901 |
| Systems and Methods for Immobilizing Using Plural Energy Stores | Issued | 10/364,164 |
| Systems And Methods For Managing Battery Power In An Electronic Disabling Device . . . | Issued | 10/447,447 |

TABLE 5-continued

| Patent or Patent Application Title | Status | Ser. No. |
|---|---|---|
| Systems And Methods Using An Electrified Projectile | Issued | 10/714,572 |
| Systems and Methods For Signal Generation Using Limited Power | Issued | 10/949,828 |
| Systems and Methods for Illuminating a Spark Gap in an Electric Discharge Weapon | Issued | 10/957,315 |
| Systems And Methods for Immobilization | Issued | 10/750,374 |
| Systems and Methods for Immobilization Using Selected Electrodes | Issued | 10/750,551 |
| Electric Discharge Weapon | Issued | 10/893,467 |
| Safe And Efficient Electrically Based Intentional Incapacitation Device Comprising . . . | Issued | 10/631,683 |
| Electrical Weapon Having Controller for Timed Current Through Target and Date/Tine Recording | Issued | 11/164,710 |
| Less Lethal Weapons for Multiple Shots | Issued | 11/164,764 |
| Systems and Methods for Electronic Weaponry Having Audio and/or Video Recording . . . | Issued | 11/270,989 |
| Systems and Methods for Target Impact | Issued | 11/457,046 |
| Handheld Stun Gun for Incapacitating A Human Target | Issued | 10/016,082 |
| Systems And Methods For Incapacitation Using Biofeedback | Issued | 10/971,983 |
| Dual Operating Mode Electronic Disabling Device | Allowed | 11/457,549 |
| Systems and Methods having a Power Supply in Place of a Round of Ammunition | Pending | 10/892,083 |
| Systems and Methods for Electronic Weaponry with Deployment Unit Detection. | Pending | 11/530,996 |
| Systems and Methods for Modular Electronic Weaponry | Pending | 11/428,760 |
| Systems And Methods For A User Interface For Electronic Weaponry | Pending | 11/428,892 |
| Systems and Methods for Propelling an Electrode | Pending | 11/428,801 |
| Systems and Methods for Local and Remote Stun Functions in Electronic Weaponry. | Pending | 11/307,408 |
| Systems And Methods For Activating A Propellant For An Electronic Weapon | Pending | 11/307,569 |
| Systems And Methods For Describing A Deployment Unit For An Electronic Weapon | Pending | 11/307,572 |
| Systems And Methods For Immobilization Using A Compliance Signal Group | Pending | 12/024,891 |
| Systems and Methods for Electrode Drag Compensation | Pending | 11/462,945 |
| Systems and Methods for Collecting use of Force Information | Pending | 11/428,881 |
| Systems And Methods For Deploying Electrodes For Electronic Weaponry | Pending | 11/307,304 |
| Systems and Methods For Arc Energy Regulation | Pending | 11/381,454 |
| Systems And Methods For Predicting Remaining Battery Capacity | Pending | 11/285,945 |
| Systems and Methods for Immobilization Using Charge Delivery | Pending | 11/307,789 |
| Systems and Methods For Immobilization With Repetition Rate Control | Pending | 11/965,638 |
| Systems And Methods For Immobilization With Time Monitoring | Pending | 11/965,923 |
| Systems And Methods Using Waveform Shaping | Pending | 11/566,481 |
| Systems and Methods for Qualified Registration | Pending | 11/419,796 |
| Systems And Methods For An Electronic Control Device With Date And Time Recording. | Pending | 11/966,511 |
| Systems and Methods for Halting Locomotion | Pending | 11/510,755 |
| Systems and Methods For Halting Locomotion Using Damped Waveform | Pending | 11/966,829 |
| Systems and Methods For Immobilization With Selected Delivered Power | Pending | 11/963,950 |
| Projectile With Selected Delivered Power | Pending | 11/966,728 |
| Systems and Methods for Pulse Delivery | Pending | 11/737,374 |
| Systems And Methods For A Projectile Having A Stabilizer For Spin Stabilization | Pending | 11/771,126 |
| Deployment Unit For Electronic Weaponry With Independent Propellant | Pending | 11/696,613 |
| Systems And Methods For Immobilizing with Change of Impedance | Pending | 11/566,506 |
| Systems And Methods For Immobilization Using Charge Delivered In Plural Directions . . . | Pending | 11/769,593 |
| Systems And Methods For Area Denial | Pending | 11/868,512 |
| Systems and Methods for Deploying An Electrode Using Torsion | Pending | 11/771,240 |
| Systems and Methods For A Rear Anchored Projectile | Pending | 11/771,956 |
| Systems And Methods For Unfastening A Film Of An Electrified Projectile | Pending | 11/771,548 |
| Systems And Methods For Arc Energy Regulation And Pulse Delivery | Pending | 11/943,467 |

The foregoing description discusses preferred embodiments of the present invention, which may be changed or modified without departing from the scope of the present invention as defined in the claims. The examples listed in parentheses may be alternative or combined in any manner. The invention includes any practical combination of the structures and method steps disclosed. The words "and" and "or" as used herein shall be construed both conjunctively and disjunctively and each shall include the other (e.g., and/or) whenever practical unless expressly stated otherwise. While for the sake of clarity of description several specifics embodiments of the invention have been described, the scope of the invention is intended to be measured by the claims as set forth below.

What is claimed is:

1. A system for storing and communicating data related to an incident using multiple incident recorders, the system comprising:
   a first incident recorder configured to be worn by an officer, including:
      a first video camera;
      a first pre-event buffer;
      a first memory;
      a first user-operated control;
      a first rechargeable battery; and
      a first short range wireless transceiver, wherein the first incident recorder is configured to:
         capture first video information from the first video camera into the first pre-event buffer for a first period of time before overwriting information previously recorded in the first pre-event buffer, the first information captured prior to a first operation of the first user-operated control;

capture second video information about the incident from the first video camera upon the first operation of the first user-operated control and store the second video information in the first memory;

record a mark in a video stream of the second video information upon a second operation of the first user-operated control while the second video information is being captured from the first video camera, the mark indicating a time during the capture of the second video information at which the first user-operated control was operated;

discontinue capture of the second video information and capture third video information from the first video camera in the first pre-event buffer upon third operation of the first user-operated control while the second video information is being captured;

transmit a recording support request via the first short range wireless transceiver while at the incident; and transmit a new incident identifier via the first short range wireless transceiver; and a second incident recorder configured to record the incident, including:
a second video camera;
a second pre-event buffer;
a second memory; and
a second short range wireless transceiver, wherein the second incident recorder is configured to:
capture fourth video information from the second video camera into the second pre-event buffer for a second period of time before overwriting information previously recorded in the second pre-event buffer;
capture fifth video information about the incident from the second video camera and store the fifth video information in the second memory;
receive the recording support request via the second short range wireless transceiver while at the incident;
receive the new incident identifier via the second short range wireless transceiver; and
associate the new incident identifier with the incident.

2. The system of claim 1, wherein the recording support request includes a request to record the incident.

3. The system of claim 2, wherein the second incident recorder is further configured to receive the request to record the incident and notify an operator of the second incident recorder of the request.

4. The system of claim 1, comprising a secondary subsystem configured to receive the second video information from the first incident recorder and the fifth video information from the second incident recorder.

5. The system of claim 4, wherein the secondary subsystem comprises a shift hub, the shift hub including a processor and docks configured to accept the first incident recorder and the second incident recorder via plug-in to a wired network.

6. The system of claim 5, wherein:
the second incident recorder is configured to be worn by a second officer;
the second incident recorder includes a second rechargeable battery; and
the shift hub is configured to:
provide data transfer from the first incident recorder;
provide data transfer from the second incident recorder;
recharge the first rechargeable battery of the first incident recorder; and
recharge the second rechargeable battery of the second incident recorder.

7. The system of claim 6, wherein the data transfer from the first incident recorder includes the second video information and first usage logs from the first incident recorder; and
the data transfer from the second incident recorder includes the fifth video information and second usage logs from the second incident recorder.

8. The system of claim 7, wherein the first usage logs from the first incident recorder include first environment logs updated in response to first notice of a candidate beacon received; and
the second usage logs from the second incident recorder include second environment logs updated in response to second notice of the candidate beacon received.

9. The system of claim 7, wherein the second usage logs from the second incident recorder include second environment logs updated in response to a directive received for coordinated evidence collection from the first incident recorder.

10. The system of claim 9, wherein the updated second environment logs include a record of a type of first incident recorder from which the directive was received and a record of what the directive required of the second incident recorder.

11. The system of claim 4, wherein the first incident recorder is configured to store a first identity of an operator of the first incident recorder; and
the second incident recorder is configured to store a second identity of an operator of the second incident recorder.

12. The system of claim 11, wherein the secondary subsystem is configured to transmit the first identity of the operator of the first incident recorder to the first incident recorder and transmit the second identity of the operator of the second incident recorder to the second incident recorder.

13. The system of claim 4, wherein the secondary subsystem is configured to:
receive the new incident identifier from the first incident recorder;
receive the new incident identifier from the second incident recorder; and
associate the second video information and the fifth video information based on the new incident identifier.

14. The system of claim 1, comprising a primary subsystem separate from the first incident recorder and the second incident recorder, the primary subsystem including a processor and a third short range wireless transceiver and further configured to receive the recording support request from the first incident recorder via the third short range wireless transceiver and transmit the recording support request to the second incident recorder via the third short range wireless transceiver to the second incident recorder.

15. The system of claim 14, wherein the primary subsystem is configured to:
receive a second transmission from the first incident recorder, the second transmission comprising information intended for the second incident recorder with respect to the recording support request; and
forward a copy of the information intended for the second incident recorder with respect to the recording support request to the second incident recorder, wherein the second transmission is received after the recording support request is received by a secondary subsystem.

16. The system of claim 1, wherein the second incident recorder is configured to transmit an acknowledgement of the new incident identifier received from the first incident recorder.

17. The system of claim 1, wherein the first incident recorder is configured to transmit a beacon of identification; and the second incident recorder is configured to transmit a unique address of the second incident recorder in response to receiving the beacon of identification from the first incident recorder.

18. The system of claim 1, wherein transmitting the new incident identifier via the first short range wireless transceiver includes transmitting a specified past start time prior to a third time at which the new incident identifier is transmitted by the first incident recorder.

19. A computer-implemented method performed by incident recorders for storing and communicating data related to a current or next incident, the method comprising:

capturing, by a first incident recorder, first video information from a first video camera of the first incident recorder into a first pre-event buffer of the first incident recorder for a period of time before overwriting information previously recorded in the first pre-event buffer, the first video information captured prior to a first operation of a user-operated control of the first incident recorder;

capturing, by the first incident recorder, second video information about the incident from the first video camera upon the first operation of the user-operated control and store the second video information in a first memory of the incident recorder;

recording, by the first incident recorder, a mark in a video stream of the second video information upon a second operation of the user-operated control while the second video information is being captured in the first memory, the mark indicating a time during the capture of the second video information at which the user-operated control was operated;

discontinuing, by the first incident recorder, capture of the second video information and capturing third video information from the first video camera in the first pre-event buffer upon third operation of the user-operated control while the second video information is being captured;

receiving, by the first incident recorder, a recording support request from an other incident recorder at the incident via a first short range wireless transceiver of the first incident recorder;

receiving, by the first incident recorder, a new incident identifier from the other incident recorder at the incident via the first short range wireless transceiver;

associating, by the first incident recorder, the new incident identifier with the incident;

notifying, by the first incident recorder, an operator of the first incident recorder of the received recording support request, wherein the recording support request includes a request to record the incident and the first incident recorder is configured to be worn by a law enforcement officer at the incident;

capturing, by the other incident recorder, fourth video information from a second video camera of the other incident recorder into a second pre-event buffer of the other incident recorder for a second period of time before overwriting information previously recorded in the second pre-event buffer;

capturing, by the other incident recorder, fifth video information about the incident from the second video camera and storing the fifth video information in a second memory of the other incident recorder;

transmitting, by the other incident recorder, the recording support request via a second short range wireless transceiver of the other incident recorder while at the incident; and transmitting, by the other incident recorder, the new incident identifier via the second short range wireless transceiver.

20. The method of claim 19, further comprising:

transferring, by the first incident recorder, the second video information from the first incident recorder via a first dock of a shift hub;

transferring, by the second incident recorder, the fifth video information from the second incident recorder via a second dock of the shift hub;

recharging, by the first incident recorder, a first rechargeable battery of the first incident recorder via the first dock; and recharging, by the second incident recorder, a second rechargeable battery of the second incident recorder via the second dock.

* * * * *